(12) United States Patent
Rohs et al.

(10) Patent No.: US 9,638,295 B2
(45) Date of Patent: May 2, 2017

(54) FRICTION-RING TRANSMISSION HAVING TWO ROLLER BODIES SPACED APART FROM ONE ANOTHER BY A GAP

(71) Applicant: Ulrich Rohs, Dueren (DE)

(72) Inventors: Ulrich Rohs, Dueren (DE); Christoph Draeger, Inden (DE); Werner Brandwitte, Langerwehe (DE)

(73) Assignee: Ulrich Rohs, Dueren (DE)

( * ) Notice: Subject to any disclaimer, the term of this patent is extended or adjusted under 35 U.S.C. 154(b) by 541 days.

(21) Appl. No.: 14/091,721

(22) Filed: Nov. 27, 2013

(65) Prior Publication Data

US 2014/0087915 A1    Mar. 27, 2014

Related U.S. Application Data

(62) Division of application No. 11/922,375, filed as application No. PCT/DE2005/001391 on Aug. 5, 2005, now Pat. No. 9,316,293.

(30) Foreign Application Priority Data

| Aug. 6, 2004 | (DE) | 10 2004 038 585 |
| Aug. 6, 2004 | (DE) | 10 2004 038 586 |
| Oct. 18, 2004 | (DE) | 10 2004 050 855 |

(51) Int. Cl.
F16H 15/42        (2006.01)
(52) U.S. Cl.
CPC .................... F16H 15/42 (2013.01)
(58) Field of Classification Search
CPC .......................................... F16H 15/42
USPC ...................................... 476/52, 53
See application file for complete search history.

(56) References Cited

U.S. PATENT DOCUMENTS

| 374,296 A | 12/1887 | Evans |
| 742,977 A | 11/1903 | Evans |
| 1,362,655 A | 12/1920 | West |
| 1,637,664 A * | 8/1927 | Stoeckicht ............. F16H 15/42 476/53 |
| 1,709,346 A | 4/1929 | Garrard |
| 2,239,983 A | 4/1941 | Bade |
| 2,701,478 A * | 2/1955 | Riess ..................... B64C 25/20 464/35 |
| 2,807,171 A | 9/1957 | Wyckoff |

(Continued)

FOREIGN PATENT DOCUMENTS

| CH | 405 856 A | 1/1966 |
| EP | 0 878 641 A1 | 11/1988 |

(Continued)

OTHER PUBLICATIONS

International Search Report of PCT/DE2005/001391, Mar. 15, 2006.

(Continued)

*Primary Examiner* — William C Joyce
(74) *Attorney, Agent, or Firm* — Collard & Roe, P.C.

(57) ABSTRACT

A friction ring-type transmission includes two roller bodies which are arranged at a distance from each other about a gap, which correspond to each other via the friction ring and which rotate (5) on axial roller body axes. The friction ring is arranged in an adjusting bridge in such a manner that it can be axially displaced about an adjusting path along the gap and the adjusting bridge is mounted by an individual, axial guiding device.

13 Claims, 36 Drawing Sheets

(56) References Cited

U.S. PATENT DOCUMENTS

| | | | |
|---|---|---|---|
| 3,257,857 A | 6/1966 | Davin et al. | |
| 4,625,758 A * | 12/1986 | Murray | F16K 31/502 |
| | | | 74/89.37 |
| 4,637,738 A | 1/1987 | Barkley | |
| 5,924,953 A * | 7/1999 | Rohs | F16H 15/42 |
| | | | 476/52 |
| 6,093,131 A | 7/2000 | Rohs | |
| 6,277,048 B1 | 8/2001 | Rohs | |
| 6,471,618 B2 | 10/2002 | Pavlov et al. | |
| 6,969,199 B2 | 11/2005 | Moshammer | |
| 2003/0125159 A1 * | 7/2003 | Cesaroni | F16H 61/6648 |
| | | | 476/1 |
| 2006/0194667 A1 | 8/2006 | Rohs et al. | |

FOREIGN PATENT DOCUMENTS

| | | |
|---|---|---|
| EP | 0 878 641 A1 | 11/1998 |
| EP | 0 980 993 A2 | 2/2000 |
| EP | 1 429 051 | 6/2004 |
| GB | 08 908 A | 0/1914 |
| GB | 343 225 A | 2/1931 |
| WO | WO 2004/033934 A2 | 4/2004 |
| WO | WO 2004/061336 A | 7/2004 |
| WO | WO 2004/061336 A1 | 7/2004 |

OTHER PUBLICATIONS

International Preliminary Report on Patentability and Written Opinion of the International Searching Authority of PCT/DE2005/001391, mailed Mar. 1, 2007.
Supplemental European Search Report of European Patent Application No. 13002565.3, mailed Feb. 10, 2015.
European Office Action dated Sep. 9, 2014 in European Application No. 13002596.8 with English Translation.
European Patent Office Examination Report of Application No. 13002617 with English translation of relevant parts, mailed Jul. 10, 2015.

* cited by examiner

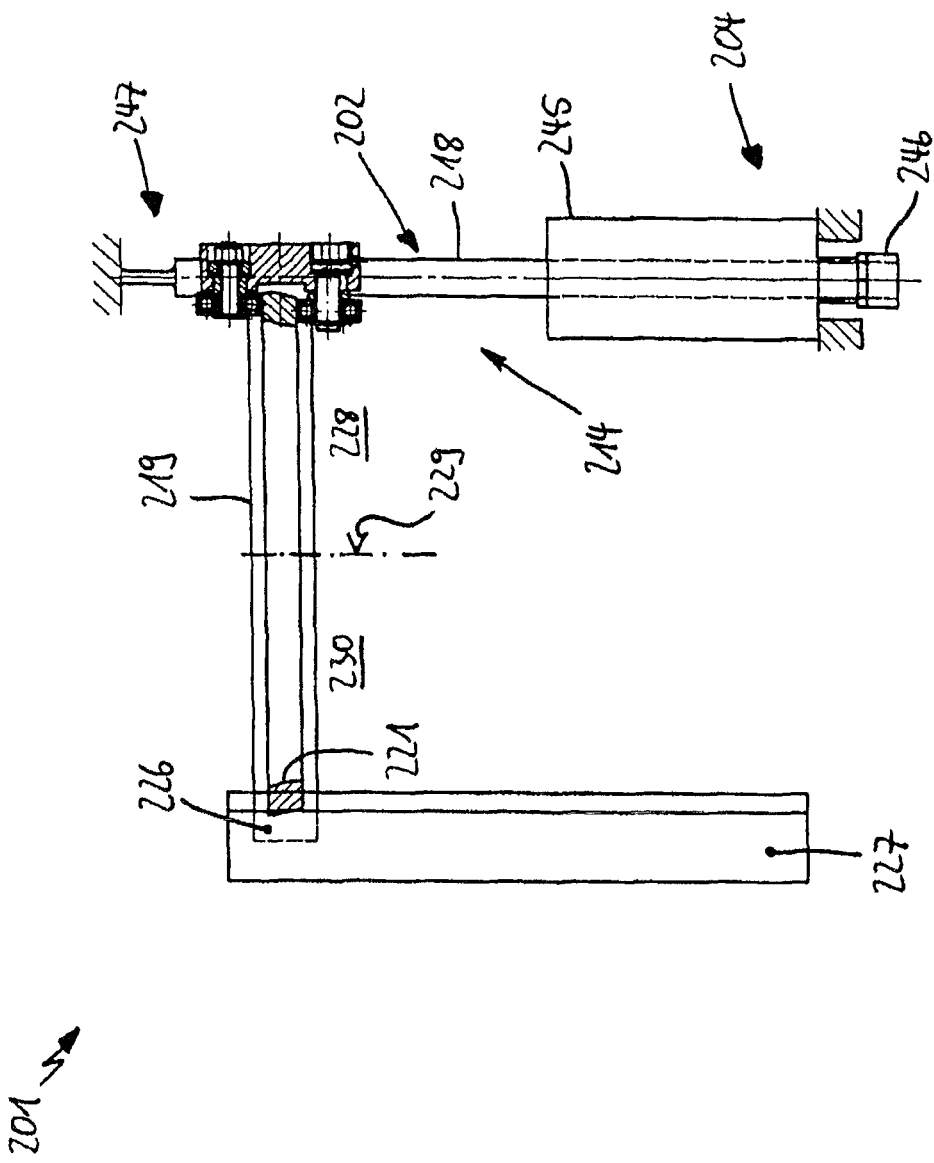

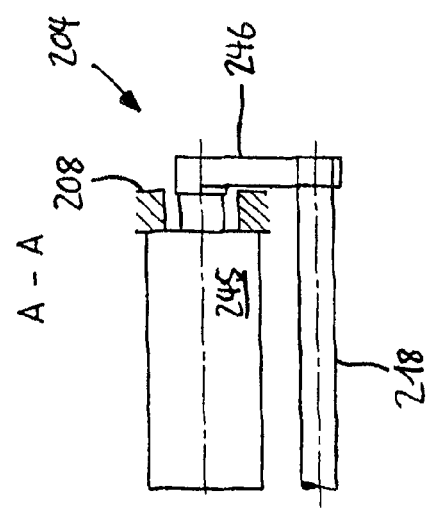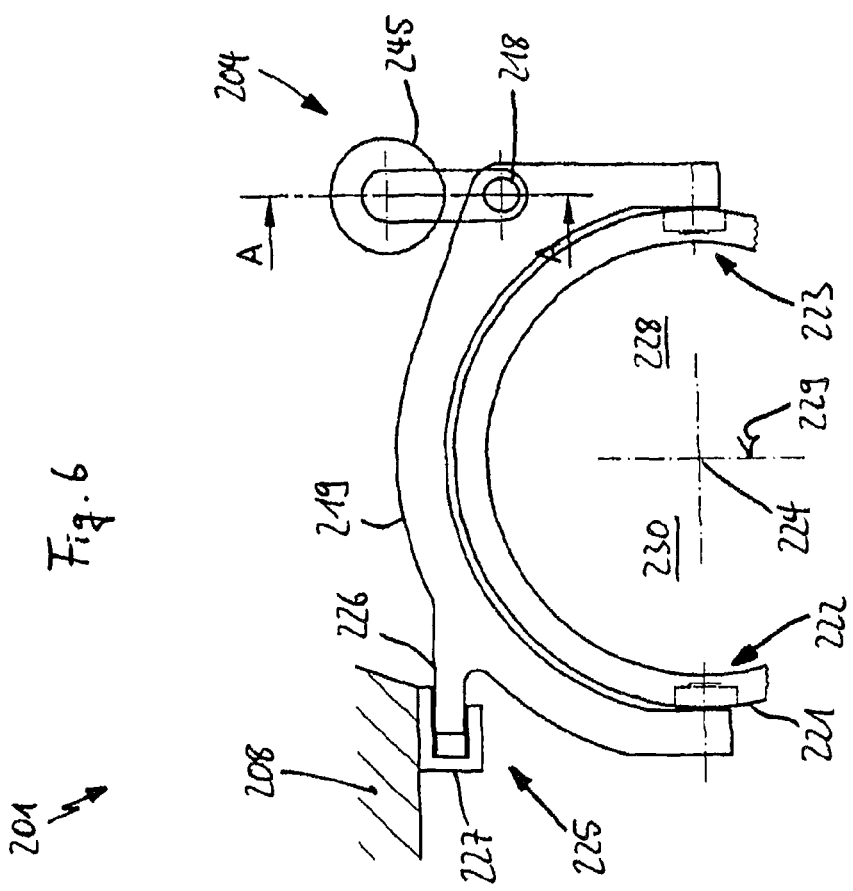

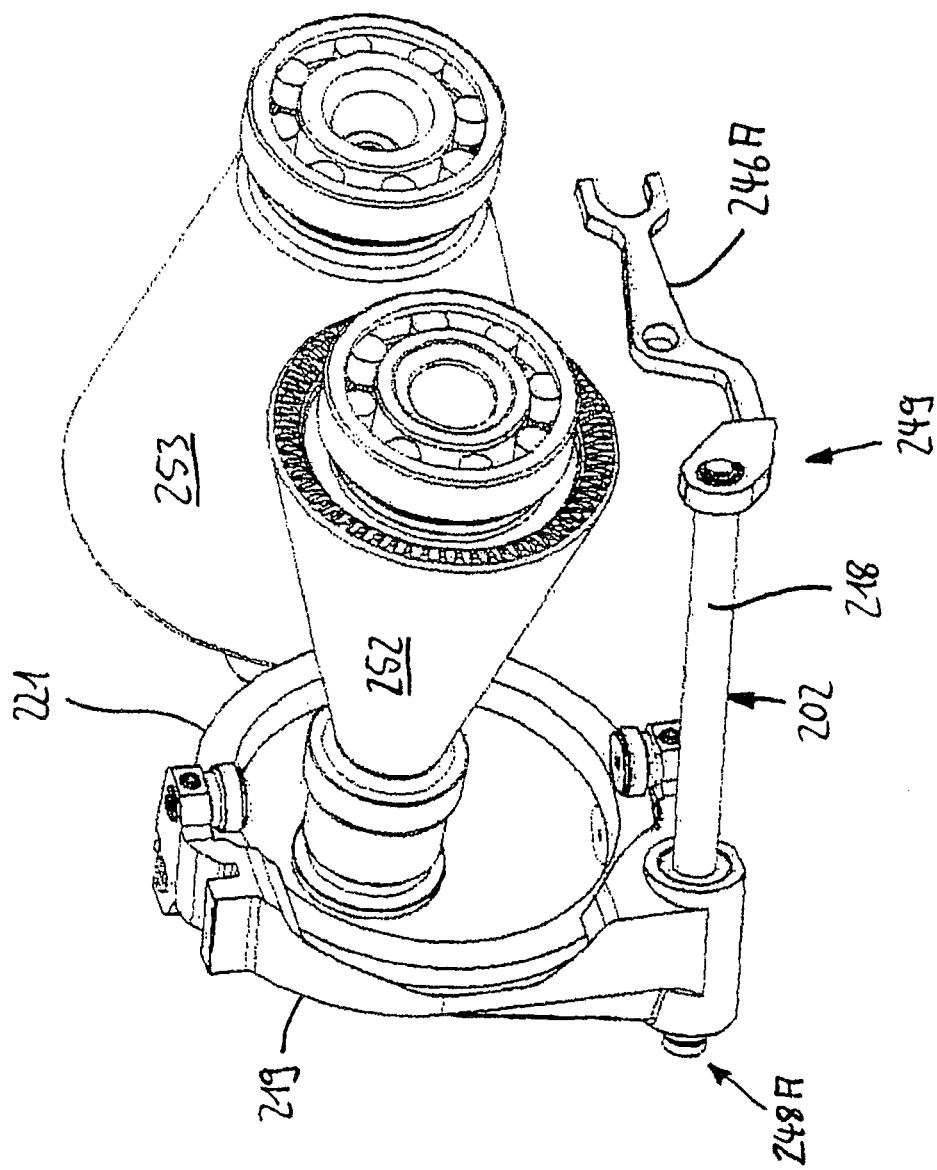

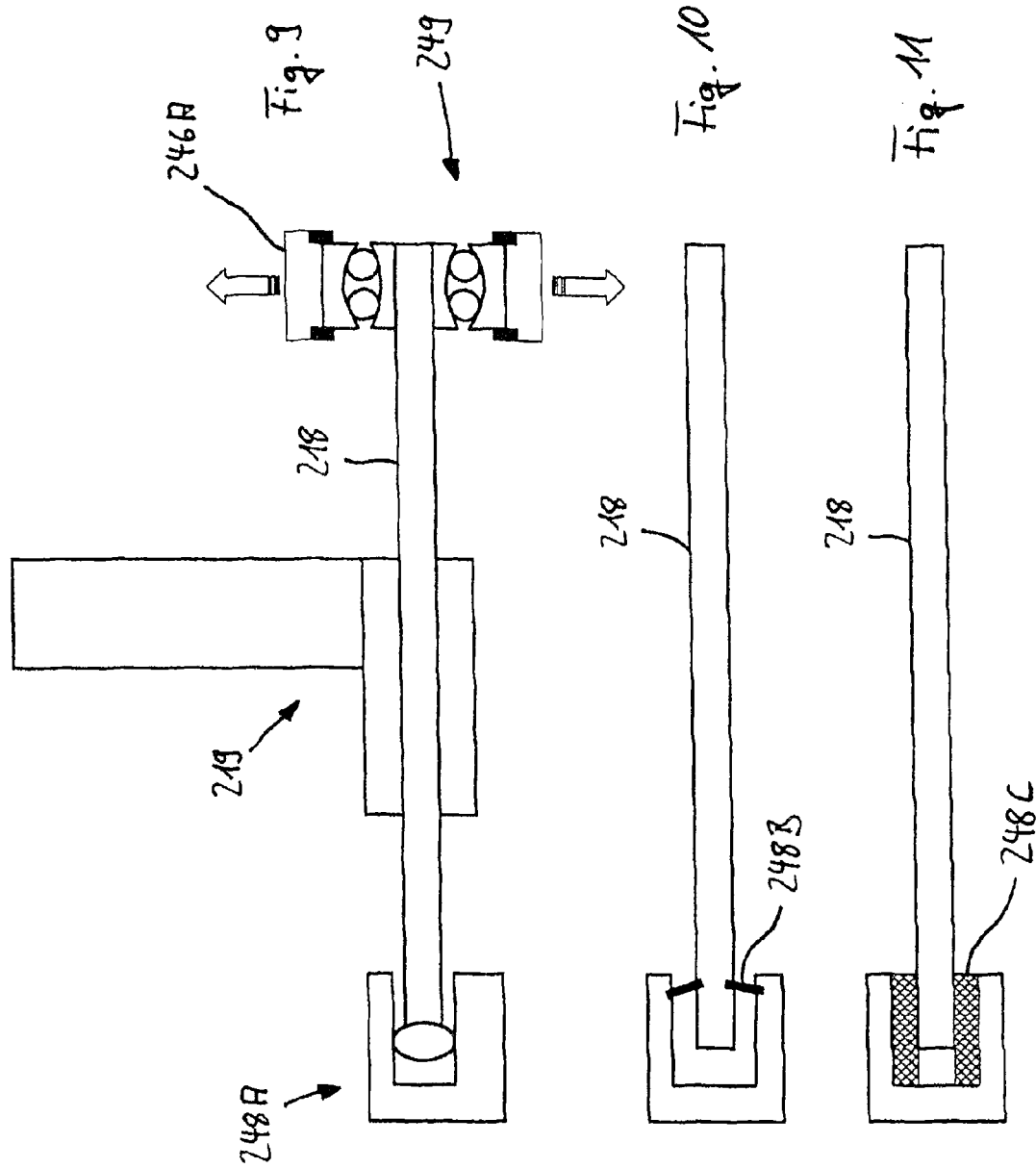

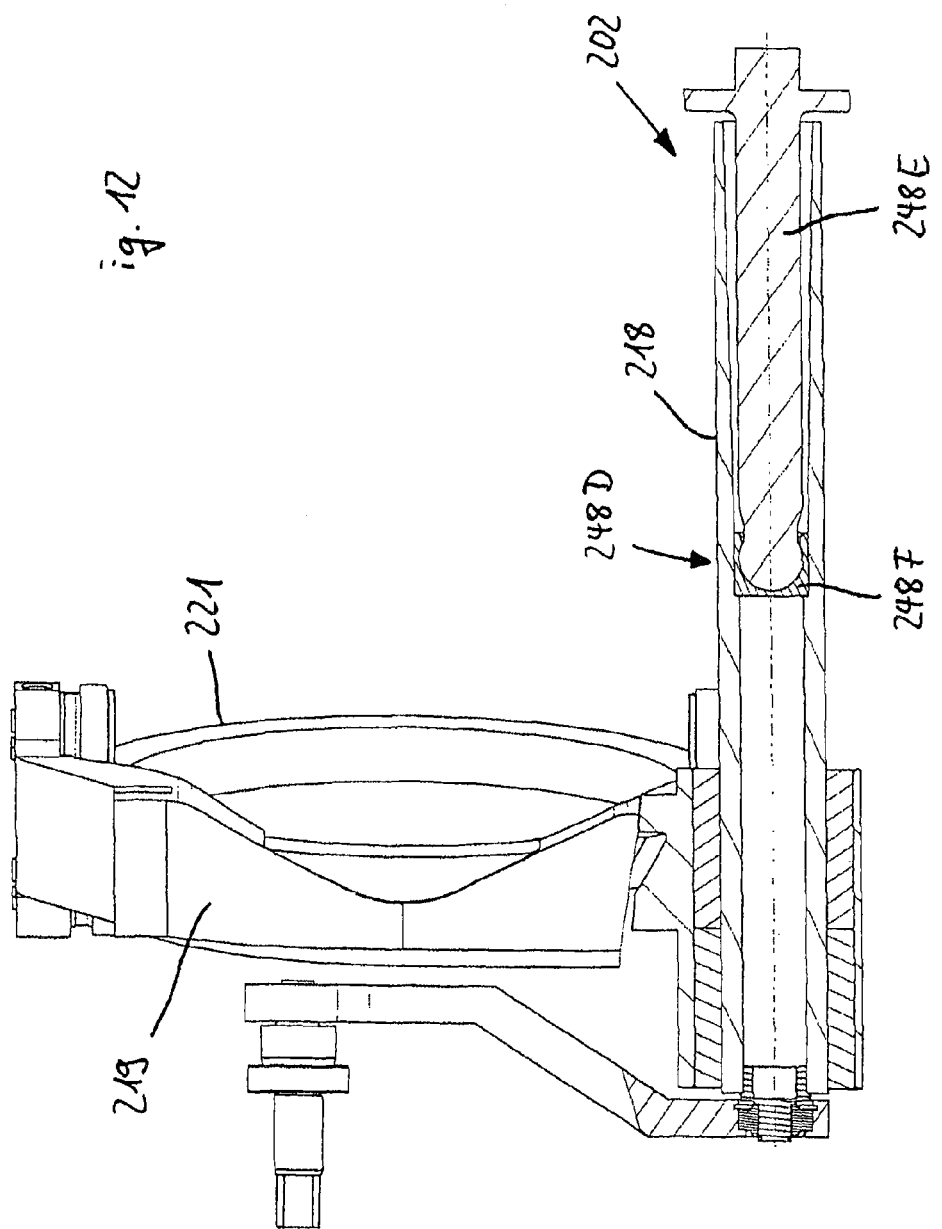

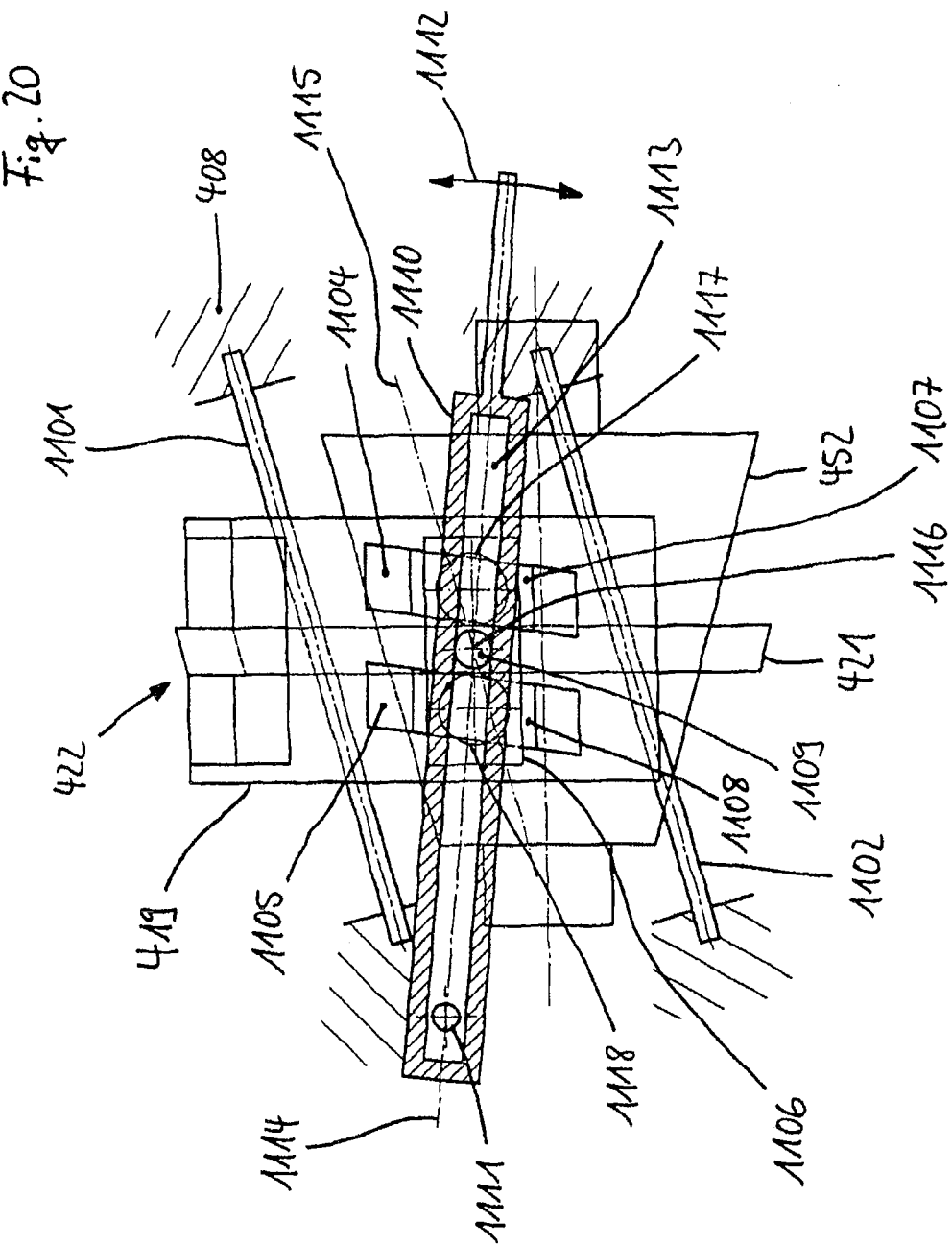

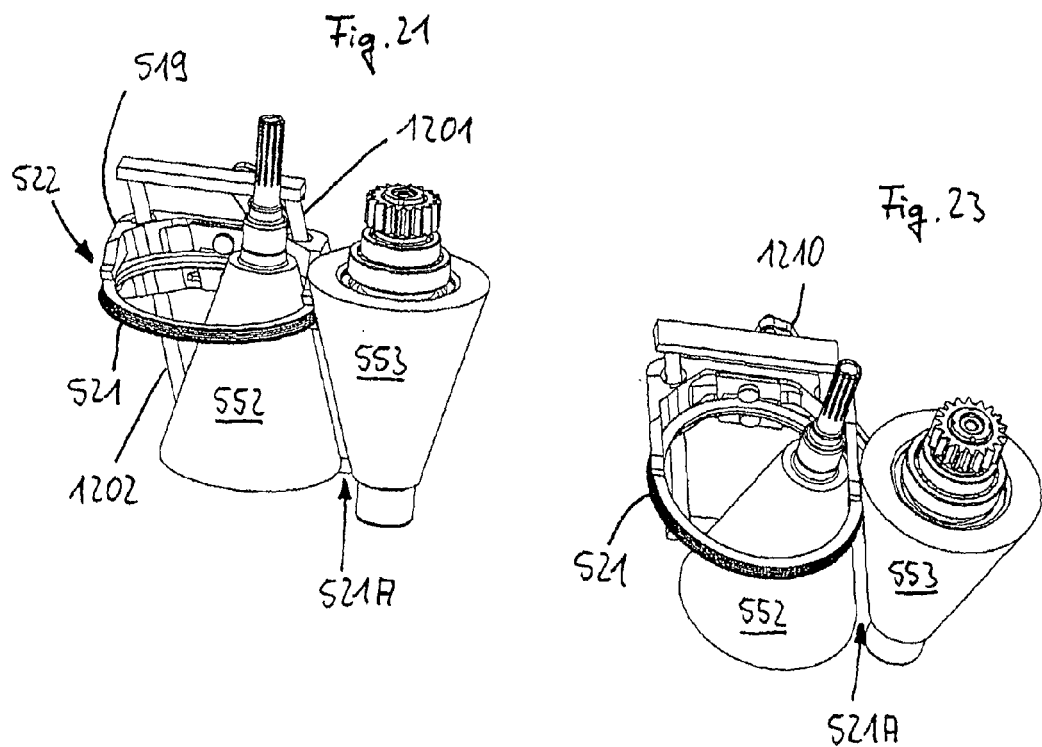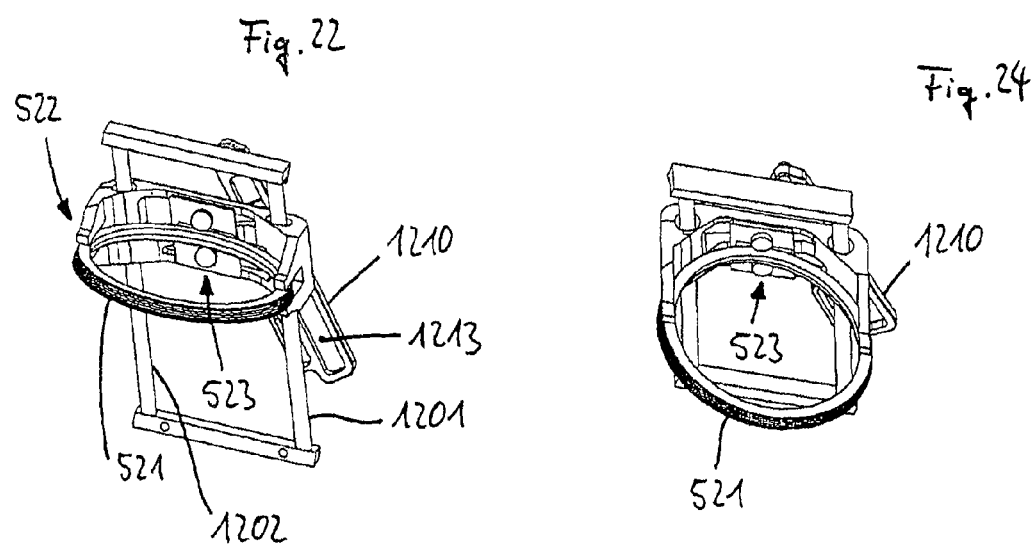

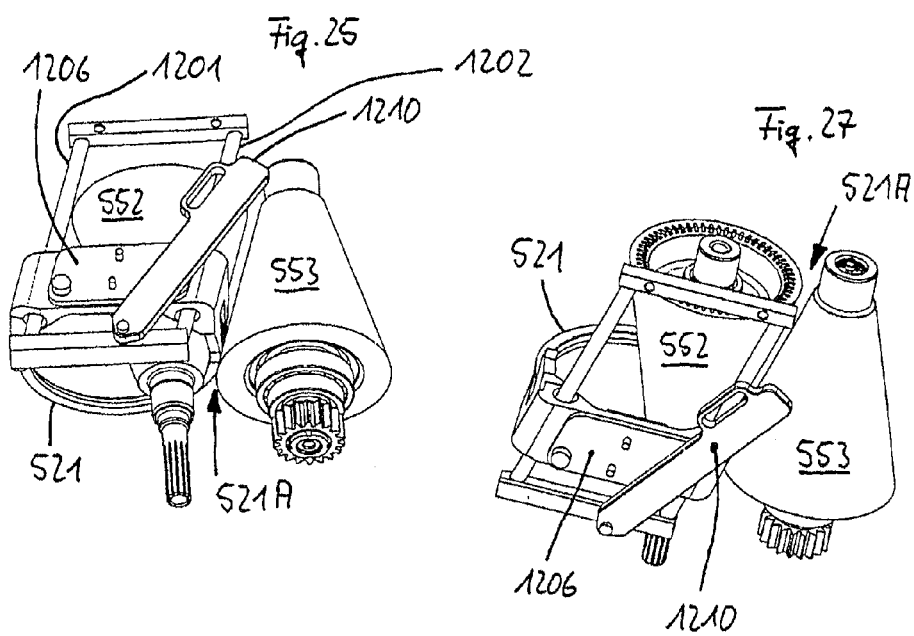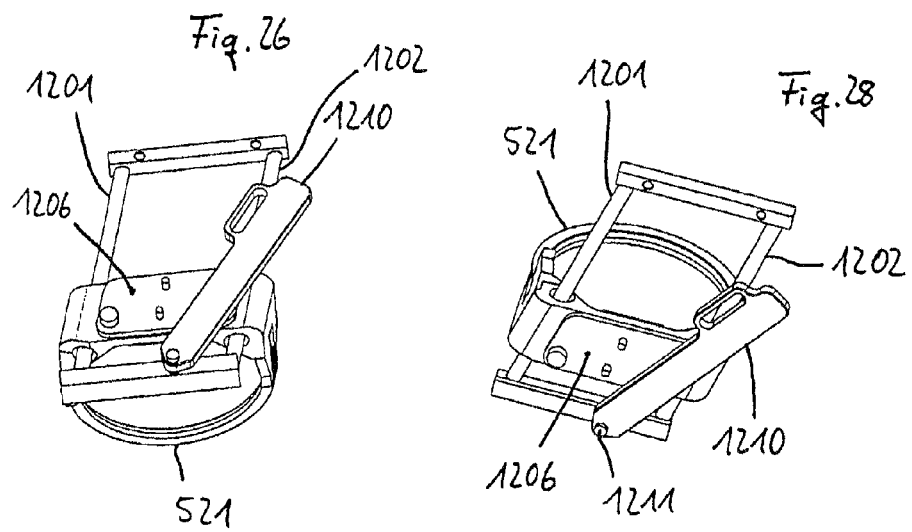

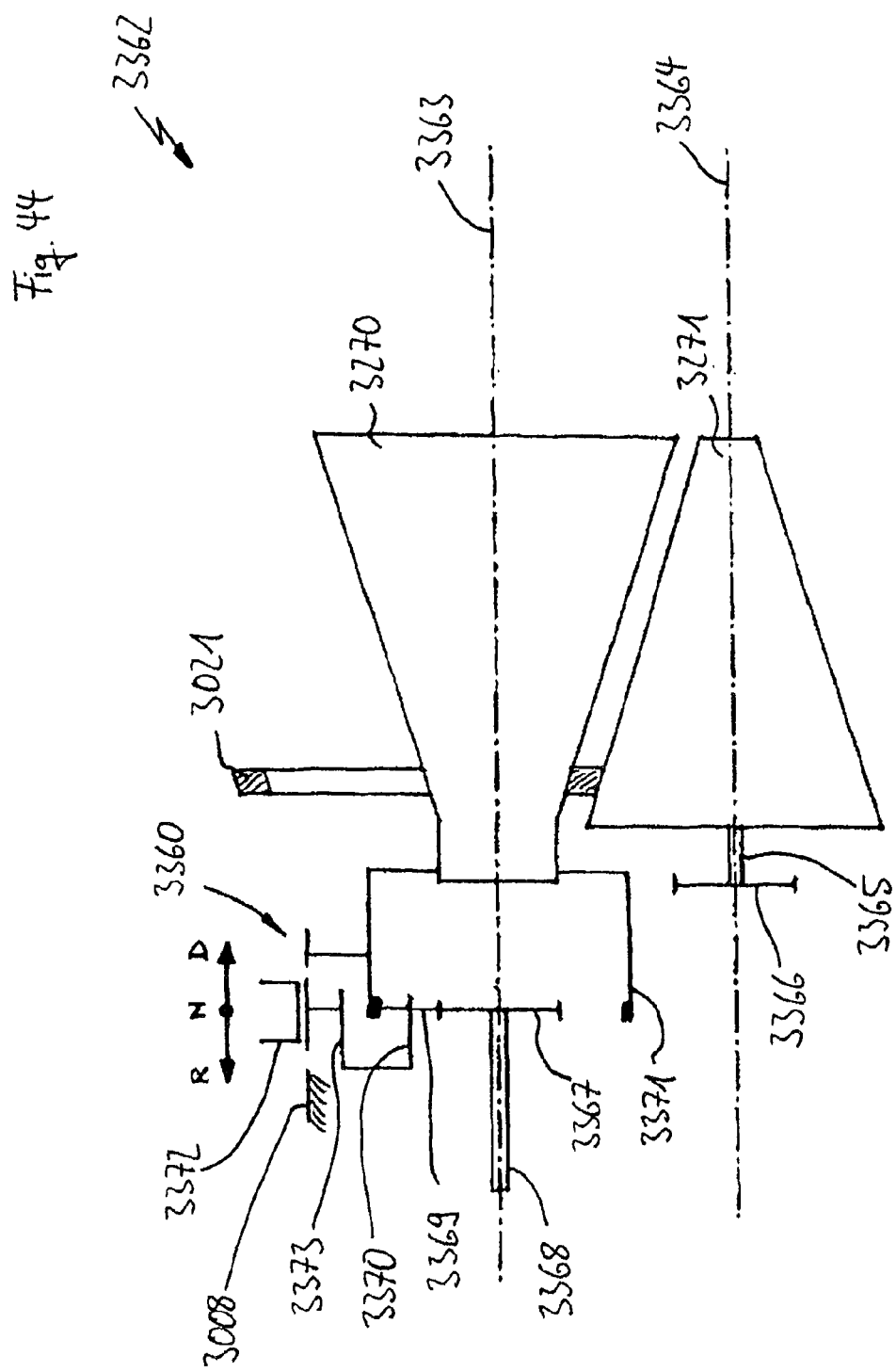

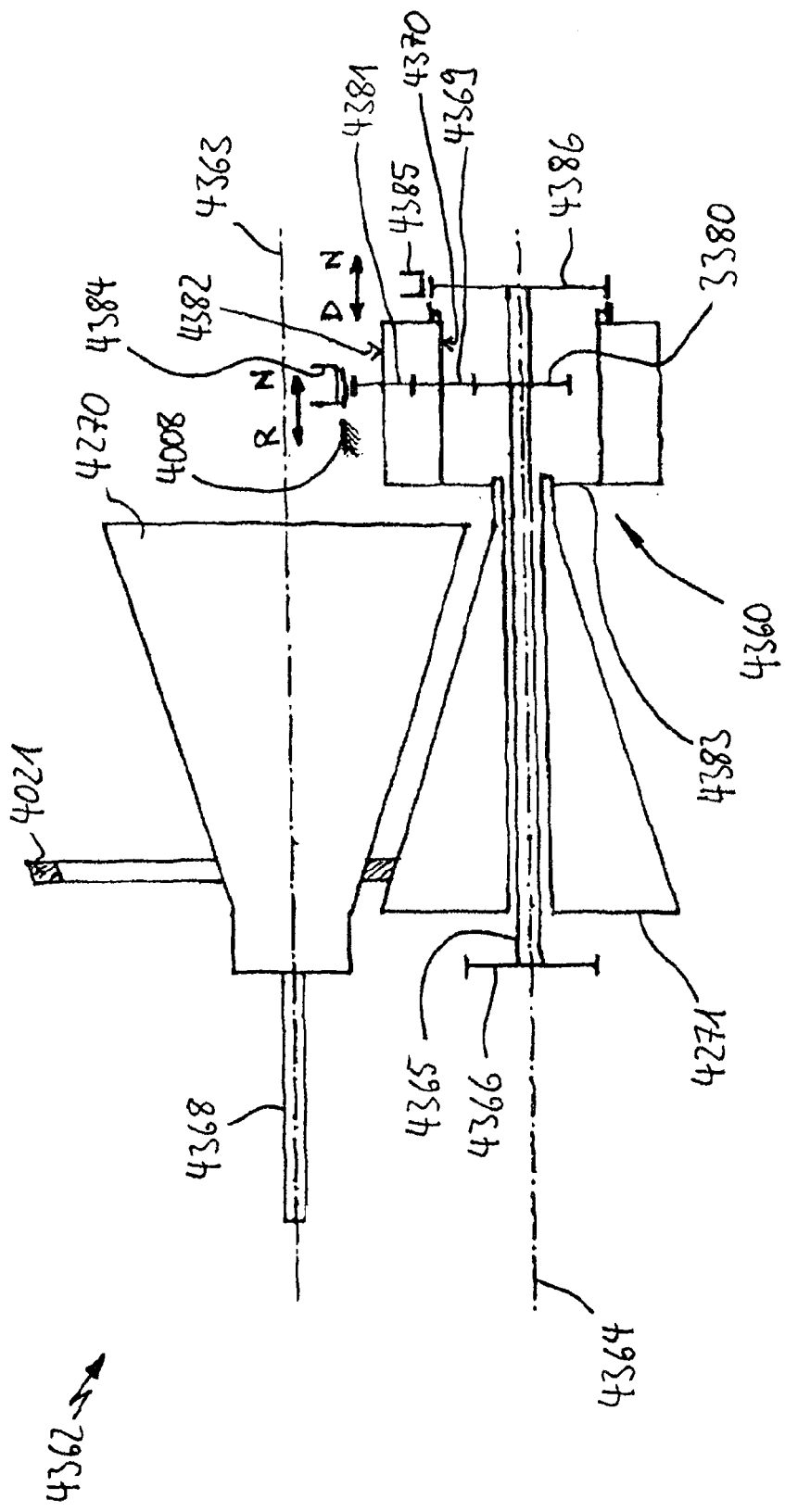

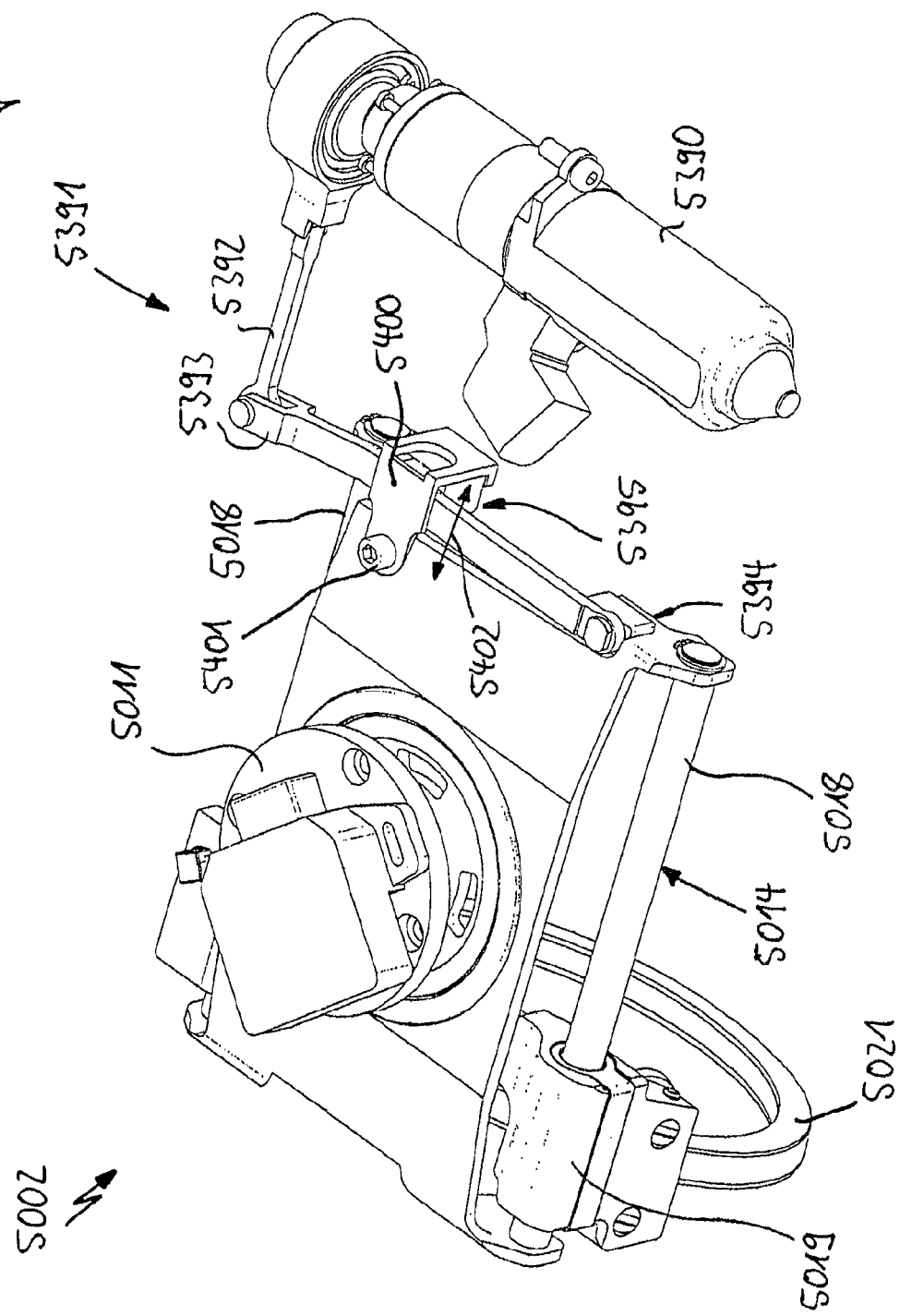

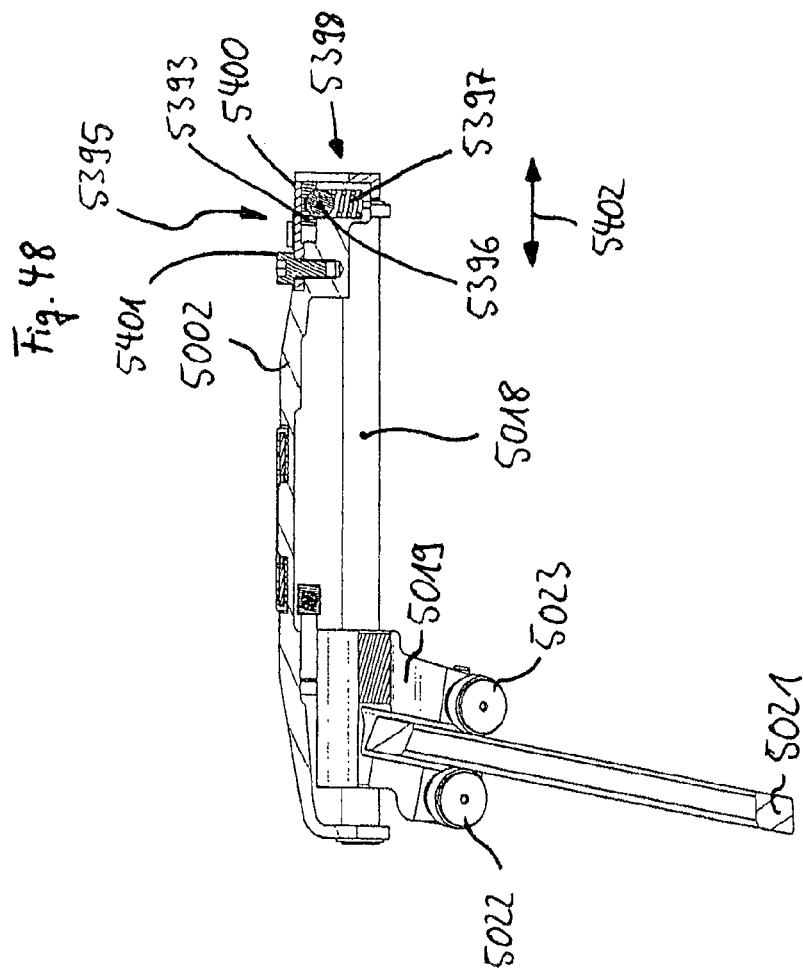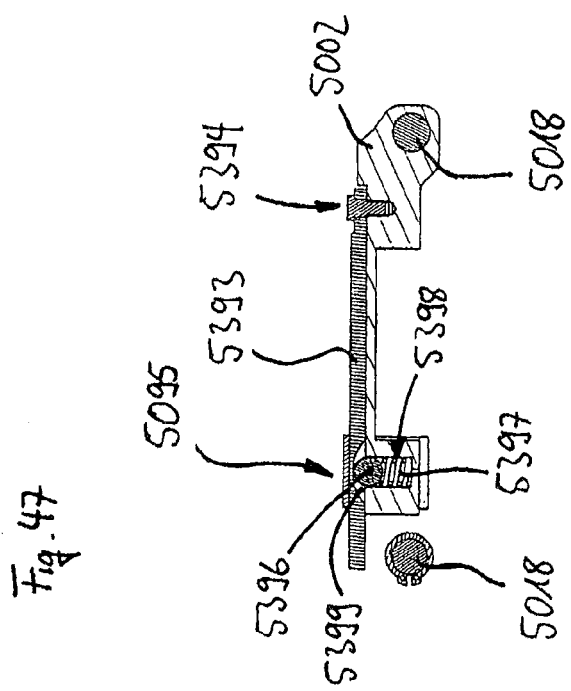

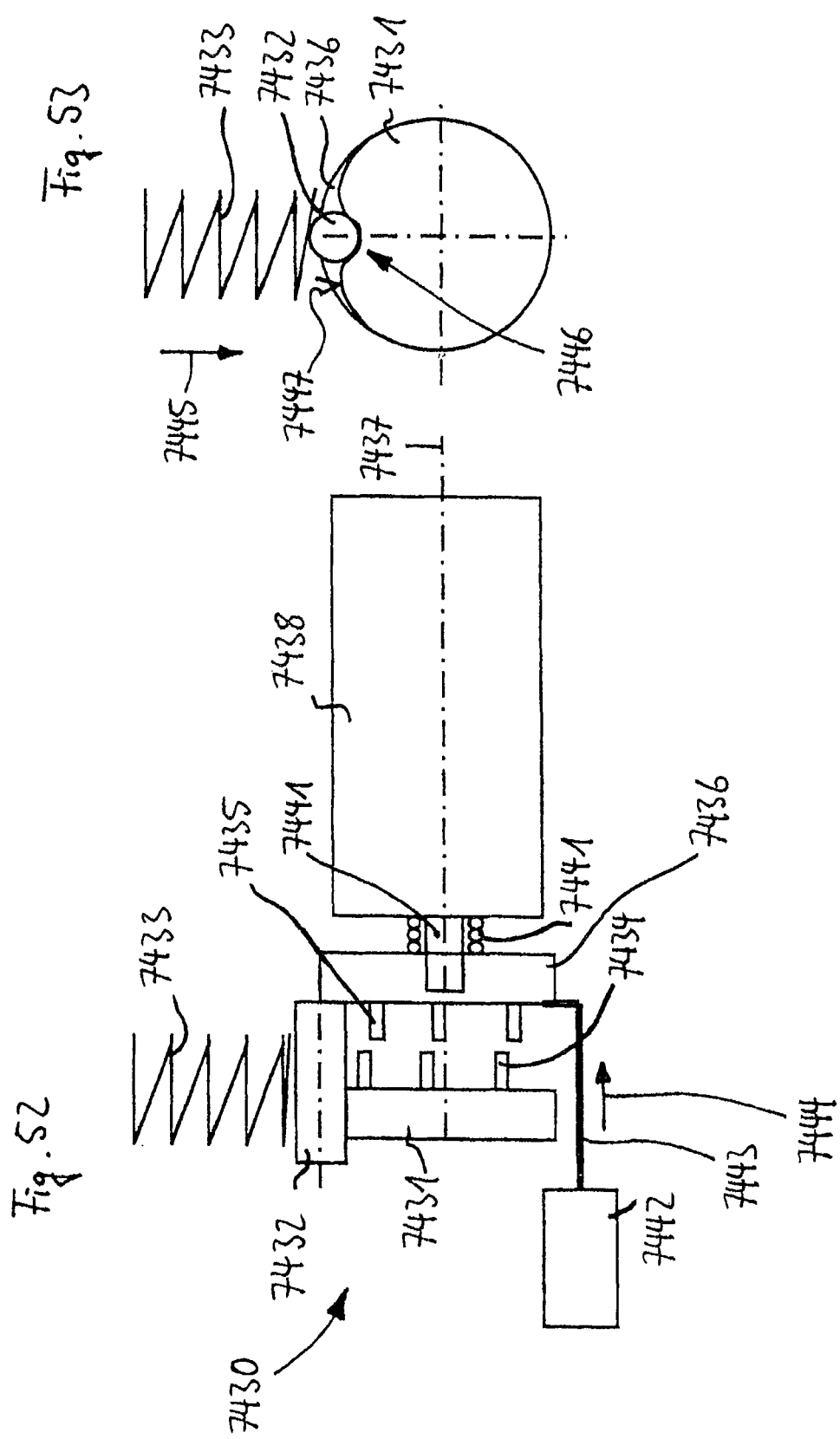

FRICTION-RING TRANSMISSION HAVING TWO ROLLER BODIES SPACED APART FROM ONE ANOTHER BY A GAP

CROSS REFERENCE TO RELATED APPLICATIONS

This application is a divisional of and Applicants claim priority under 35 U.S.C. §§120 and 121 of U.S. application Ser. No. 11/922,375 filed on Dec. 17, 2007, which application is a national stage application under 35 U.S.C. §371 of PCT Application No. PCT/DE2005/001391 filed on Aug. 5, 2005, which claims priority under 35 U.S.C. §119 from German Patent Application No. 10 2004 038 585.8 filed Aug. 6, 2004, German Patent Application No. 10 2004 038 586.6 filed Aug. 6, 2004, and German Patent Application No. 10 2004 050 855.0 filed Oct. 18, 2004, the disclosures of each of which are hereby incorporated by reference. Certified copies of the priority German Patent Applications are contained in parent U.S. application Ser. No. 11/922,375. The International Application under PCT article 21(2) was not published in English.

BACKGROUND OF THE INVENTION

1. Field of the Invention

The invention relates to a friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially. Also, the invention relates to a friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely guided axially, in a cage.

2. Description of the Related Art

Such adjustment bridges are known from the state of the art, for example as described in EP 0 878 641 A1 and EP 0 980 993 A2, and can be held in a cage and articulated on by way of this cage. However, in this connection there is the risk that the adjustment bridge can cant between the guide rods of the cage in question. This risk exists not only with regard to a cage but also in general, if the adjustment bridge is guided on guide rods.

SUMMARY OF THE INVENTION

It is the task of the present invention to further develop known friction-ring transmissions, and thereby also to eliminate the disadvantages described.

The task of the invention is accomplished, for one thing, by a friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially, and the adjustment bridge is mounted by means of a single axial guide device.

In the present connection, the term "adjustment bridge" means an arrangement that can be displaced with the friction ring, but does not rotate with the friction ring. In this regard, the adjustment bridge does not necessarily have to have the shape of a bridge. On the other hand, the adjustment bridge is supposed to be freely displaceable axially, so that the adjustment bridge can particularly follow a displacement of the friction ring that is caused in another manner, such as the one that occurs if the friction ring is tilted.

Since it is advantageous if the adjustment bridge is mounted only by means of a single axial guide device, only one guide region exists between the adjustment bridge and the axial guide device in the present case, in which the adjustment bridge stands in contact with the axial guide device. In this way, canting of the adjustment bridge relative to several guide devices is prevented in advantageous manner. Furthermore, such an arrangement can be built to be extremely small.

The term "roller body" describes devices that are suitable for transferring torque from an input side to an output side or vice versa. For example, these roller bodies are structures configured in conical or cylindrical shape, which stand in contact with one another by means of a friction ring. In this connection, each roller body rotates about an axial roller body axis, for example, whereby each axial roller body axis of a first roller body is spaced apart from an axial roller body axis of another roller body. By means of suitable spacing of the two axial roller body axes, a gap is formed between the two roller bodies that correspond to one another, in which gap a friction ring is disposed in such a manner that the friction ring surrounds one of the roller bodies and rotates around it.

In the sense of the present invention, the term "friction ring" is understood to be a device by means of which contact is produced between the two roller bodies, so that forces, particularly torques, can be transferred from one roller body to the other roller body. A preferred embodiment of the friction ring provides that the friction ring, as already indicated above, migrates back and forth in a gap between the two roller bodies, and stands in contact with both roller bodies in this connection, whereby the friction ring surrounds one of the two roller bodies. Thus, at least one roller body is disposed within the ring.

It is understood that in another embodiment, a friction ring can also have such a configuration that it is merely disposed in the gap between the two roller bodies and does not surround one of the roller bodies, or surrounds both roller bodies, whereby in these embodiments, a modified mounting would also have to be provided for the friction ring.

The term "axial guide device" is understood to mean any device that is suitable for mounting the adjustment bridge in the friction-ring transmission, in such a manner that the adjustment bridge can be displaced axially along the axial roller body axes and therefore also axially along the gap, whereby the degrees of freedom of the adjustment bridge are limited to a plane perpendicular to the adjustment path by the axial guide device. Preferably, the axial guide device is configured in such a manner that beyond this, only a rotation about the adjustment path in this plane is possible. In this connection, it can be sufficient if the adjustment bridge is sufficiently fixed in place, with regard to rotation or with regard to displacement in this plane, by the friction ring itself, for example.

Furthermore, the task of the invention is also accomplished, independent of the other characteristics of the present invention, by a friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially, and the adjustment bridge is mounted axially only on one side, with regard to a surface predetermined by the roller body axes.

The term "surface predetermined by the roller body axes" is essentially understood to mean a plane that passes through the two roller body axes, and that divides the friction-ring transmission into a first and a second side, at least in imaginary manner.

Because the adjustment bridge is mounted axially only on one side, with regard to a surface predetermined by the roller body axes, the entire arrangement can be configured to be significantly smaller, and therefore a significant amount of construction space can be saved.

In connection with the adjustment bridge disposed on one side with regard to the predetermined surface, it is also advantageous if the adjustment bridge is mounted by means of a single axial guide device. It is understood that the adjustment bridge can also be mounted on several axial guide devices, but in this case, the risk of canting of the adjustment bridge during guidance by more than one axial guide device is increased, also in connection with the axial guide device provided on one side. Thus, a single axial guide device is advantageous also in connection with an adjustment bridge that is mounted axially only on one side, with regard to a surface predetermined by the roller body axes.

Furthermore, the task of the invention is also accomplished, without the other characteristics of the present invention, by a friction ring having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially, which is characterized in that an axis of rotation of a cage is disposed on one side, with regard to a surface predetermined by the roller body axes.

Until now, the axis of rotation of a cage was disposed in a plane passing through the roller body axes. However, in order to be able to design and coordinate forces that occur during a change in the setting angle of the friction ring against the axis of rotation, on a case-by-case basis, it is advantageous if the axis of rotation of the cage, deviating from this, is disposed on one side of the surface or plane predetermined by the roller body axes. In this solution, the axis of rotation of the cage is then disposed to the side of a plane that runs essentially perpendicular to the friction ring. In particular, the adjustability of the setting angle can be predetermined less or more precisely, depending on the design of each application case, by means of such displacement of the axis of rotation.

An alternative to this provides that the axis of rotation of a cage is disposed outside of the adjustment region of the adjustment bridge. In particular, arranging the axis of rotation outside of the adjustment region guarantees that the lever lengths can be selected in almost any manner.

It is understood, however, that the axis of rotation of the cage can be provided both to the side of the plane passing through the roller body axes, and outside of the adjustment region.

By means of the different positions of the axis of rotation as described above, it is possible to implement large paths for the drives to be controlled, with a small construction space, also independent of the other characteristics of the friction-ring transmission, thereby making the control more precise and minimizing errors.

The task of the invention is furthermore accomplished, independent of the other characteristics of the present invention, by a friction ring having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely guided axially, in a cage, and the adjustment bridge is mounted on the cage by means of a single axial guide device.

Thus, the adjustment bridge is advantageously movably disposed in a cage provided for this purpose, in such a manner that the adjustment bridge can migrate back and forth only axially along the axial guide device, depending on how the cage is set with regard to the axial roller body axes.

In the present case, the term "cage" refers to a module that carries the adjustment bridge, and the module additionally allows the adjustment bridge to follow the movement of the friction ring along the roller body mantle surface. In particular, the cage therefore does not need to be similar to a cage in the narrower sense, in terms of construction. For example, depending on the embodiment, a cage in the sense of the invention can also be a simple axial guide axle on which the adjustment bridge is mounted.

As explained above, the axial guide device brings about axial guidance of the adjustment bridge. Such an axial guide can be implemented in particularly simple manner, in terms of construction, in that the adjustment bridge is merely mounted by way of a guide rod. Thus, degree guidance is reliably implemented for the adjustment bridge. Furthermore, the guide rod forms an axial guide axle designed in particularly simple manner.

In connection with a cage in which an adjustment bridge is guided, the task of the invention is accomplished, also independent of the other characteristics of the invention, by a friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely guided axially, in a cage, and the adjustment bridge is mounted on the cage only on one side, with regard to a surface predetermined by the roller body axes.

It is advantageous also with regard to this concrete solution, as already explained above, if the adjustment bridge is mounted on a single axial guide device.

In order to limit the adjustment path of the axial guide device, it is advantageous if the friction-ring transmission has an axial guide device that has means for limiting the axial displacement path.

Such limitation means are formed in particularly simple manner, in terms of construction, if the limitation means are component groups oriented approximately crosswise to the adjustment path, which runs axially, such as cross-supports of a cage.

In order to prevent the adjustment bridge from performing a rotational movement about the axial guide device or about the guide rod of the axial guide device, it is advantageous if the friction-ring transmission has an anti-rotation security device that prevents rotation of the adjustment bridge about a guide axle of an axial guide device.

This anti-rotation security device can be guaranteed by means of a separate guide device or by means of a profiling of the guide rod of an axial guide.

In the latter case, in particular, it is advantageous if an axial guide device has an internal anti-rotation security device.

However, in order to be able to absorb very high moments that occur at the adjustment bridge, in particular, in particularly advantageous manner, it is advantageous if an anti-rotation security device is disposed at a distance from a guide device. In particular, the anti-rotation security device can be disposed on the other side of the surface or plane that passes through the roller body axes, than the one on which the axial guide device is provided. There, the anti-rotation security device does not take up any construction space required for an axial guide device, or at least less construction space than an axial guide device, and can nevertheless withstand great torques. In this regard, such an arrangement can be built to be particularly small, and, since the risk of canting has been minimized, it is particularly reliable in operation. Accordingly, separately disposing the axial guide and the anti-rotation security device on one side each of the plane through which the roller body axes pass is advantageous, also independent of the other characteristics of the present invention.

Likewise, it is advantageous for absorbing particularly great forces, particularly moments, if the anti-rotation security device is disposed on a housing of the friction-ring transmission.

One embodiment variant provides that the anti-rotation security device has a holder rail for holding the adjustment bridge. By means of the holder rail, the adjustment bridge finds an additional hold on the transmission housing, independent of the guide device.

If the holder rail is free of axial limitation means, the adjustment bridge can be mounted in particularly simple manner. Because the anti-rotation security device is only provided for the purpose of preventing rotation of the adjustment bridge about the axial guide device, axial limitation means are superfluous. The axial guide device itself generally has such limitation means.

On the other hand, the axial limitation means can also be provided exclusively in the region of the anti-rotation security device, in order to be able to apply great torques, i.e. reset moments, or counter-forces by means of the distance to the axial guide device.

An alternative embodiment variant provides that the holder rail and the guide axle of the guide device are identical. In this way, the axially guided adjustment bridge can be implemented in particularly simple manner, in terms of construction.

It is understood that the structural separation of anti-rotation security device and axial guide, particularly on different sides of a plane that passes through the roller body axes, is advantageous in the case of a friction-ring transmission, also independent of the other characteristics of the present invention.

Furthermore, it is proposed that a guide axle or a cage of the friction-ring transmission has an elastic bearing device with regard to a housing of the friction-ring transmission. By means of the elastic bearing device, hysteresis-free control of the adjustment bridge, i.e. of the cage can be implemented in advantageous manner.

Also, such an elastic mounting can be implemented to be small, i.e. cost-advantageous, in comparison with other kinds of bearings, particularly in comparison with the roller bearings known from the state of the art in this regard. In the case of a suitable arrangement of the elastic elements of the elastic bearing device, it can be guaranteed that the cage is biased by the elastic elements, in the direction of a safety position, so that in case of an interruption in operation of the cage adjustment, for example, the cage is automatically moved to the safety position. This also holds true with regard to an adjustment bridge that is not additionally mounted in a cage, but rather directly on a guide axle of a guide device.

Rubber elements, but also steel springs, such as leaf springs, can advantageously be used as elastic bearing devices. Rubber elements and steel springs have good elastic properties and can be produced in simple and cost-advantageous manner.

Sufficient stability can be guaranteed with regard to undesirable degrees of freedom, in particularly cost-advantageous manner, by means of a suitable configuration or arrangement of the elastic elements. In this regard, on the other hand, other guide elements or drive elements can also be used.

In this connection, it is advantageous if the cage is produced from a sheet-metal body. A sheet-metal body can be designed in such a manner, in terms of construction, that it is characterized by particularly good spring properties in certain regions, so that an elastic bearing device is made available by means of the sheet-metal body, in advantageous manner.

Preferably, the sheet-metal body has at least one attachment region and one elastic region, whereby the elastic region is more elastic than the attachment region and makes an elastic bearing device available. The attachment region can then be configured to be more stable or rigid, particularly with regard to the degree of freedom of the bearing device.

An elastic bearing device that works both axially and radially with regard to the roller body axes is designed in particularly simple manner if the sheet-metal body is configured to be rotated about its neutral fiber in the region of its elastic bearing device, preferably by 90°.

It is understood that the elastic bearing device is advantageous for a friction-ring transmission in which a cage or a similar arrangement must be adjusted in terms of its angle in order to displace the friction ring, also independent of the other characteristics of the present invention.

Cumulatively or alternatively, as well as also independent of the other characteristics of the invention, a friction-ring transmission is advantageous having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely guided axially on an axial adjustment device, such as in a cage, whereby the axial adjustment device, i.e. the cage, can be displaced by way of a connecting rod mechanism, and whereby the axial guide device, i.e. the cage, is mounted on a housing by means of a bearing device, with movement equalization.

By means of the movement equalization, a length equalization of the bearing device, particularly also of an elastic bearing device, is implemented in particularly simple manner, in terms of construction, so that expansions of the components on the basis of temperature variations are balanced out in advantageous manner. This is particularly advantageous in the case of movable components, since tensions within components or in components that correspond with one another are prevented by means of such length equalization or movement equalization. Furthermore greater adjustment angles can also be implemented by way of a lever arrangement, by means of such length equalization, without disruptive stresses occurring. If necessary, such length equalization can also take place directly by means of separate mounting.

In order to make such length equalization available, it is advantageous if the movement equalization comprises a bearing bushing, a disk spring and/or a rubber bushing.

For example, the guide axle can be mounted in the bearing bushing so as to be axially displaceable, whereby the bearing bushing corresponds with the guide axle in such a manner that no radial play or only very slight radial play is present between the guide axle and the bearing bushing.

In order to allow tilting of the guide axle relative to the bearing bushing, a disk spring can cumulatively be provided at the guide axle, in the region of the bearing bushing. The disk spring guarantees tilting at a minimal radial play between the guide axle and the bearing bushing.

Alternatively or cumulatively to the disk spring, other devices, such as a rubber bushing, can also be provided. By means of the rubber bushing, the risk of overly great radial play between the guide axle and the bearing bushing is further reduced, since such a rubber bushing can also be configured to lie very closely radially, but at the same time, tilting of the guide axle relative to the bearing bushing is made possible.

Such a bearing device is also advantageous independent of the other characteristics of the present invention, since with it, an elastic mounting for the cage serving as the bearing for an adjustment bridge, for example on a housing, is implemented in the case of a friction-ring transmission, in cost-advantageous and structurally simple, as well as space-saving manner. In particular, it can be guaranteed, in the case of a suitable arrangement of the elastic elements, that the cage is biased in the direction of a safety position by means of the elastic elements, so that in the case of an interruption in operation of the cage adjustment, the cage is automatically displaced into the safety position.

While it is known from the state of the art to predetermine the setting angle of the friction ring by way of the position of the cage, cumulatively and/or alternatively to the arrangements indicated in the present case, a friction-ring transmission having a friction ring and two roller bodies that rotate about roller body axes, disposed spaced apart from one another by a gap, is advantageous, in which the friction ring can be displaced along the gap, on the basis of the rotation of the friction ring and of the roller bodies, as a function of a setting angle with regard to the gap, and is articulated in its setting angle by way of an adjustment bridge that supports the friction ring on at least two bearing points, and is characterized in that at least one bearing point of the friction ring is displaceably disposed with regard to the adjustment bridge and/or with regard to another bearing point of the friction ring. Such a bearing point can be provided, in particular, in the case of a conical friction-ring transmission having cones that rotate about cone axles.

By means of such an adjustment, which, in the final analysis, corresponds to a displacement of the bearing points and thus to a corresponding apparent displacement of the adjustment bridge, as far as the friction ring is concerned, the friction ring can be displaced in terms of its setting angle, without a movable cage having to be provided. In this regard, a cage that is fixed in place with regard to a housing can be provided, thereby making it significantly cost-advantageous to configure and allowing the entire arrangement to be built in reliable manner.

It is understood that the displaceable bearing point can be implemented in many different ways, in terms of design. One embodiment variant provides an articulated adjustment bridge, in which two bearing points of the friction ring are disposed on the adjustment bridge so as to be displaceable relative to one another, by means of an articulation.

If the adjustment bridge is not configured to be articulated, particularly by means of an articulation between two bearing points, a preferred embodiment provides that one bearing point is guided on a motion link arrangement. Preferably, in the case of this exemplary embodiment, the motion link arrangement is disposed on the adjustment bridge, so that the motion link arrangement can follow the adjustment bridge without problems.

It is advantageous if the motion link arrangement has both a first component group consisting of a motion link with motion link grooves and a motion link plate, as well as a second component group consisting of motion link blocks. The displaceable bearing point is guided in reliable and simple manner by means of such a motion link arrangement.

In a preferred embodiment variant, the motion link arrangement is at least partly a component of the adjustment bridge. Preferably, the motion link grooves are recessed directly into the adjustment bridge, thereby making it possible to build the motion link arrangement in particularly compact manner, and, because the motion link grooves are material recesses, making it particularly light. The motion link blocks are then placed within the motion link grooves, whereby the motion link blocks hold the rollers, which correspond with the friction ring on both sides, by means of suitable devices, on the one hand. On the other hand, the motion link blocks are connected with the motion link plate, on which, in turn, a ring follower can be attached. The ring follower is guided in or on the motion link grooves by way of the motion link plate and the motion link blocks, and, at the same time, mounted on the adjustment bridge in axially displaceable manner. In this way, the ring follower can be moved axially along the axial guide axle, for one thing. For another, the ring follower is additionally guided crosswise to the guide axle, so as to move in the motion link grooves.

Since a displaceable bearing point of the friction ring in a friction-ring transmission is implemented particularly by means of the present motion link arrangement, in simple manner in terms of design, all of the characteristics that stand in connection with the motion link arrangement are advantageous also independent of the other characteristics of the invention.

But the displaceable bearing point, which makes do without the motion link arrangement that was described, on which the friction ring is mounted, already advantageously provides support for a friction ring on an adjustment ring by itself, and is therefore advantageous also without the other characteristics of the invention.

Furthermore, the invention is accomplished, also independent of the other characteristics of the present invention, by a friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially, whereby means for deflecting out a displaceable bearing point are provided, with which the displaceable bearing point is deflected out of a zero position by a zero axis.

By means of the out-deflection means for the displaceable bearing point, it is possible to pre-select an operating state of the friction ring, so that the friction ring of the friction-ring transmission, including the adjustment bridge, follows the deflection of the deflection means, until the bearing point has returned to a zero position on the zero axis. Thus, the friction ring does not follow a compulsorily guided adjustment bridge, but rather the adjustment bridge follows the friction ring. In this way, a self-adjusting adjustment system is created, which, in particular, automatically moves to an emergency position in case of a disruption. Thus, emergency operation properties of the friction-ring transmission are advantageously predetermined, so that the reliability of the friction-ring transmission is further increased.

In order to be able to deflect a displaceable bearing point out from a zero position by a zero axis, it is advantageous if the motion link blocks are disposed to be displaceable in motion link grooves, approximately crosswise to the zero axis. By means of the motion link blocks in the motion link grooves, it is guaranteed that the displaceable bearing point is disposed on the adjustment bridge in fixed but, at the same time, out-deflectable manner. It is understood that the displaceable bearing point can also be attached to the adjustment bridge with other devices, in such a manner that the displaceable bearing point can be deflected out of a zero position by a zero axis.

In this connection, it is advantageous if the means for out-deflection have a setting lever. The setting lever preferably has such a shape that it can be used to bring the ring follower into different positions that lie next to the zero axis. For this purpose, the ring follower is displaceable relative to the setting lever.

In order to bring about out-deflection of the ring follower out of a zero position of the zero axis, by means of the setting lever, it is advantageous if the setting lever is mounted eccentric to the zero axis. By means of a setting lever mounted in such an eccentric manner, the displaceable bearing point can be deflected out on a zero axis in particularly simple manner, in terms of design.

In connection with the use of a setting lever, it is advantageous if a zero position lies in an intersection of the zero axis and a longitudinal axis of the setting lever.

The friction ring, i.e. the adjustment bridge, can communicate with the out-deflection means in particularly simple manner, in terms of design, if the out-deflection means have an accommodation for a ring follower. In the present sense, the ring follower is a component of a displaceable bearing point and preferably attached to a motion link plate, so that an out-deflection of out-deflection means, such as a setting lever, can be directly transferred to the ring follower.

It is advantageous if the ring follower accommodation has a guide groove. The ring follower can migrate back and forth in the guide groove without any problems. The ring follower is therefore disposed to be movable with regard to the out-deflection means.

One embodiment variant provides, in this connection, that the guide groove is configured in a straight line. But curved guide grooves, or guide grooves shaped in another way, can also be used.

If the displaceable bearing point is connected with a motion link arrangement, it is advantageous if the ring follower is disposed on the motion link plate. In this connection, the ring follower is able to be displaced together with the motion link plate and the motion link blocks, in the motion link grooves, crosswise to the zero axis.

It is advantageous if the out-deflection means are mounted on a housing of the friction-ring transmission and thereby fixed in place.

So that the friction-ring transmission as a whole can be built in relatively compact manner, it is advantageous if the zero axis runs essentially parallel to the gap of the axial guide device.

The task of the invention is furthermore accomplished, cumulatively and/or alternatively, by a friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially, whereby means for deflecting a displaceable bearing point in are provided, with which the displaceable bearing point, which was deflected out of a first zero position by a zero axis, is deflected into another zero position of a zero axis.

It is advantageous if a friction ring is automatically displaced into a zero position by means of in-deflection means of the displaceable bearing point, and therefore also into a rest position of the friction ring, if a corresponding reference position has been reached.

In the sense of the invention, the term "rest position" of the friction ring is understood to mean a position in which the friction ring can rotate about its axis of rotation, but does not perform any translatory movement, for example in the direction of an axial guide axle.

The term "zero axis" is understood, in the present case, to mean an axis along which a displaceable bearing point can move in approximately translatory manner. However, the displaceable bearing point moves only along the zero axis if the ring follower is deflected out of a zero position of the zero axis, as described above, and only until the ring follower has returned to a zero position of the zero axis.

A preferred embodiment variant provides that the in-deflection means of the displaceable bearing point have the friction ring. In the case of this selected embodiment variant, the friction ring is the in-deflection means of the displaceable bearing point. If the friction ring itself forms the in-deflection means, the friction-ring transmission can be built in very compact manner, since no additional devices are required for implementing the in-deflection means. It is advantageous that in the case of such an embodiment variant, the break-down tendency of the present friction-ring transmission is further reduced, since it is possible to do without additional components that could cause disruptions. Due to the aforementioned advantages, such in-deflection means are advantageous also independent of the other characteristics of the present invention.

Also independent of the other characteristics, the task of the invention is accomplished by a friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially, in which the friction ring is displaceable along the gap on the basis of the rotation of the friction ring and of the roller bodies, as a function of a setting angle with regard to the gap, and which is characterized in that the adjustment bridge can be controlled, if applicable by way of a cage, by means of a linear drive having at least one solenoid for determining the setting angle.

By means of the solenoids as a linear drive, the number of transmission links required for control can be minimized, taking into consideration a sufficient translation between an adjustment bridge drive and the adjustment bridge, thereby increasing the precision of the control by means of a reduction in the possible play. Furthermore, the use of solenoids has the advantage that they are very low-loss and work with little play, in and of themselves.

For a particularly precise setting of the cage, another embodiment provides that the friction-ring transmission has a linear drive having an adjustment axis that runs parallel to the axial guide device and/or to a surface that is formed by two roller body axes.

In order for the adjustment bridge drive on the basis of solenoids to be structured in particularly simple manner, it is advantageous if the friction-ring transmission has a linear drive having an adjustment axis that runs parallel to the axial guide device and/or to a surface that is formed by two roller body axes.

The operational reliability of the friction-ring transmission is further increased if the linear drive has more than one linear drive motor. With more than one linear drive motor, a particularly reliable drive is made available, so that the setting angle of the friction ring can still be reliably set even if a linear drive motor fails.

In the present case, two solenoids that act in opposite directions are preferably used, so that it is assured that all possible and necessary cage positions can be approached, in targeted manner.

In order to be able to undertake even the smallest changes in the setting angle, in particular, it is proposed that the linear drive has a pulse/pause control. A desired out-deflection or friction-ring adjustment can be implemented in particularly simple manner by means of the length of the pulses, i.e. the pulse/pause control, as well as by means of the frequency.

In particular, inertia effects and counter-forces by means of springs or other magnets, or other drives, can be additionally utilized in order to be able to implement a desired out-deflection of the friction ring.

Cumulatively or alternatively, to accomplish the task of the present invention, independent of the other characteristics, a friction-ring transmission is proposed, having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially, whereby an adjustment path limitation for the adjustment bridge that is freely displaceable axially is disposed at least at one end of the adjustment path.

By means of the proposed adjustment path limitation, a possibility is created for limiting the axially freely displaceable adjustment bridge with regard to its adjustment path, in such a manner that it is adjusted in a predetermined position even in case of a failure in operation, without being destroyed. It is understood that such an adjustment path limitation can be implemented in many different ways. For example, it is possible to implement the adjustment path limitation electronically, in which sensors detect or determine the position of the axially freely displaceable adjustment bridge, and the adjustment bridge is displaced on the basis of the data obtained.

A preferred embodiment variant provides for a mechanically acting adjustment path limitation, since this can be configured to be less susceptible to disruption, with regard to the present invention.

Particularly in order to be able to set the adjustment path limitation with regard to different rotation directions of the friction ring, it is advantageous if the adjustment path limitation has an adjustable end stop. Depending on the rotation direction of the friction ring, the adjustable end stop can be brought into a position that is advantageous for this purpose. Even otherwise, the position of the friction ring can be adapted within the narrow limits of an adjustable stop, by means of the adjustable end stop, so that start-up processes, for example, can be facilitated for the engine, even if the transmission as such has failed.

In order to have to move as little mass as possible with regard to the adjustable end stop, it is advantageous if the adjustable end stop has a displaceable end stop bolt that then merely has to be moved.

Depending on the embodiment, it is advantageous if the displaceable end stop bolt is disposed to be axially movable relative to the axial guide device. By means of this axial displaceability with regard to the axial guide device, it is also possible to shorten or lengthen the adjustment path, depending on what setting is required.

Particularly if the adjustable end stop has a direction-dependent free-wheel that displaces the end stop bolt as a function of the direction of rotation of the friction ring, it is advantageous if the displaceable end stop bolt is disposed to be axially movable relative to the axial guide device, on the adjustable end stop.

If it were to be provided that the adjustable end stop does not have such a free-wheel, the adjustment of the end stop, i.e. the displacement of the end stop bolt, can be achieved in simple manner, in terms of design, in that the displaceable end stop has a rotary magnet. In the present case, the rotary magnet can be connected with the displaceable end stop bolt in such a manner that the displaceable end stop bolt is disposed to be axially movable relative to the axial guide device.

An axial mobility of the displaceable end stop bolt is guaranteed in particularly simple manner, in terms of construction, if a setting disk for adjusting the displaceable end stop bolt is disposed between the displaceable end stop bolt and the rotary magnet. For example, the setting disk has a different thickness, with regard to its circumference, in the contact region towards the displaceable end stop bolt, in order to adjust the displaceable end stop bolt, so that if the setting disk is rotated, regions of the setting disk having different thickness are positioned in this contact region, depending on the position of the setting disk. Thus, the setting disk has a first thickness in a first setting position, so that the displaceable end stop bolt is brought into a first position with regard to the adjustment path. In contrast, the setting disk, rotated into another setting position, has a second thickness that is different from the first thickness, in the contact region towards the end stop bolt, so that the end stop bolt is set into a second position with regard to the adjustment path.

The task is also accomplished, independent of the other characteristics of the invention, by a friction-ring transmission having two roller bodies spaced apart from one another by a gap, which correspond with one another, rotating on axial roller body axes, by way of a friction ring, in which a pressing device for setting a pressing force between the roller bodies comprises a pressure regulation device having static and dynamic pressure regulation means, whereby the dynamic pressure regulation means are mounted on one of the roller bodies so as to be displaceable relative to the static pressure regulation means.

Friction-ring transmissions in which a pressing device sets the pressing force between roller bodies or between roller bodies and a friction ring, particularly by means of a pressure regulation device that works hydraulically, are already known from the state of the art. Thus, for example, a hydraulic pressing device for bracing two friction cones, which interact with one another by way of an adjustable friction ring, is described in WO 2004/06 1336 A1. The pressing device, which is controlled by means of hydraulic pressure, by way of a hydraulic line, is disposed in one of these friction cones, the output cone. Depending on the amount of pressure that is applied to the pressing device, a corresponding pressing force occurs between the friction cones or between the friction cones and the friction ring. Different friction conditions can be set between the friction cones and the friction ring, by means of a pressing device placed and acting in such a manner, in simple manner, in terms of construction, and therefore in advantageous manner.

By means of the present pressing device having a pressure regulation device in which dynamic pressure regulation means are disposed within a roller body, in other words within a friction cone, it is possible to further optimize known pressure regulation devices and therefore known pressing devices, in terms of design. Particularly due to the fact that the dynamic regulation means of the pressure regulation device are displaceably mounted in one of the roller bodies, the pressing device can be built in particularly compact manner.

In this connection, the term "dynamic pressure regulation means" refers to modules that are moved in order to be able to build up pressure accordingly, while the term "static pressure regulation means" refers to modules that are fixed in place and support themselves on the dynamic pressure regulation means in order to build up pressure.

A preferred embodiment variant provides that the dynamic pressure regulation means are mounted on an additional shaft of a roller body, which is disposed at least in part within the roller body. Often, an oil pressure line for controlling an oil pressure is worked onto or into the pressing device in such an additional shaft, so that the dynamic pressure regulation means can set the oil pressure of the pressing device directly on location, at or in the oil pressure line, by way of this oil pressure line. Thus, it is possible to do without an external pressure regulation device, which takes up additional construction space on a friction-ring transmission. By means of the inventive pressure regulation device, a friction-ring transmission is advantageously developed further also independent of the other characteristics of the invention.

In contrast to the mounting of the dynamic pressure regulation means described above, it is advantageous if the static pressure regulation means are disposed on another component of the friction-ring transmission, which is not part of the roller bodies. For example, the static pressure regulation means are attached fixed in place on the friction-ring transmission housing, so that the static pressure means are attached in the friction-ring transmission in a fixed location on the housing, and the dynamic pressure means can be displaced relative to the static pressure regulation means.

The dynamic pressure regulation means can be disposed to be displaceable in one of the roller bodies or in an additional shaft of one of the roller bodies, in particularly simple manner, in terms of construction, if the dynamic regulation means have a piston that rotates with a roller body, which piston can be excited by the static pressure regulation means.

A preferred embodiment variant provides that the static pressure regulation means have a solenoid. By means of the solenoid, it is possible to displace the piston that rotates with the roller body, in particularly simple manner, and to build up pressure, on the smallest possible space.

A piston that rotates in such a manner can be excited by the solenoid, in particularly advantageous and operationally reliable manner, if the rotating piston has a magnetic peg that is disposed within the solenoid. In this connection, it is preferable if the peg rotates within the solenoid without making contact, and is moved within the solenoid by means of corresponding electromagnetic pulses, so that different pressure conditions can be set with regard to the pressing device, by means of the rotating piston. The rotating piston is moved axially along a roller body axis about which the roller body having the pressing device rotates, for example.

Other characteristics that accomplish the task with regard to a friction-ring transmission, also independent of the other characteristics of the present invention, are demonstrated by a friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially, and the friction ring has a divided running surface.

Because of the fact that the running surface of the friction ring is divided, the stability of the friction ring with regard to tilting moments with regard to the gap between the two roller bodies can be improved, since larger levers can be implemented by means of the divided running surface, while the surface pressure remains the same. In this connection, it is understood that the running surface can additionally also have ribbings, independent of the gap, which serves for better fluid distribution as well as an adaptation of the surface pressure.

Furthermore, it is advantageous if the divided running surface has a gap that divides the running surface into a first running surface half and another running surface half, having a gap width that amounts to at least 10% of the width of the friction ring, preferably at least 10% of the effective running surface.

In the present case, the term "gap" is not to be equated with the term "groove" or "ribbings," since the running surface has a sufficiently great surface pressure relative to roller bodies in the region of the ribbing so that correspondingly great torques can be transferred between the friction ring and the roller bodies. However, this is not possible, in a region of the running surface that comprises a gap, since the gap has such a geometry that no torque can be transferred between the running surface of the friction ring and a roller body. Therefore, a gap is generally wider or deeper than a ribbing or a groove, as a function of the traction fluids that are used.

The term "effective running surface" in the sense of the invention describes that running surface of the friction ring with which the friction ring actually stands in contact with one of the roller bodies, i.e. transfers torques. Accordingly, the width of the effective running surface is the difference between the width of the friction ring minus the gap width according to the invention and bevels at the circumferential edge of the friction ring.

The task of the invention is furthermore accomplished by a friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially, and roller bodies are disposed in a friction-ring transmission housing in a manner free of the introduction of principal force.

It was found that it is advantageous if the roller bodies are disposed in a friction-ring transmission housing in such a manner that essentially primary forces that mainly occur when two roller bodies are braced axially or radially relative to the roller body axes are not introduced into the friction-ring transmission housing of the present friction-ring transmission, if at all possible, but rather are already absorbed previously. If the introduction of such primary forces into the friction-ring housing is prevented, the roller bodies are mounted in the friction-ring transmission housing in a manner free of the introduction of principal force, according to the invention, while the principal forces can be absorbed by a separate frame, for example.

In such a case, the friction-ring transmission housing merely has to absorb secondary forces, so that it can be built to be significantly more filigreed and therefore also lighter. Secondary forces would be, for example, forces that can occur during operation due to load shift moments.

A preferred embodiment in this regard provides for disposing at least one side of the roller bodies, braced against one another, in a roller-body bearing device on the friction-ring transmission housing that is autarkic from a friction-ring transmission housing.

The term "autarkic roller-body bearing device" is understood to be, in the sense of the invention, any bearing device with which roller bodies can be braced and fixed in place relative to one another independent of a friction-ring transmission housing, at least while the transmission is at a standstill.

It has been shown that it is particularly advantageous if the roller-body bearing device has a steel frame. Primary forces can be absorbed particularly well by means of a steel frame, in particular, since steel has a high strength. Steel frames can be produced in cost-advantageous manner, particularly from a sheet-metal construction, in such a manner that the roller-body bearing device has not only great strength but also great rigidity.

A preferred embodiment variant provides that the roller bodies are mounted in autarkic roller-body bearing devices on both sides, braced relative to one another. If roller bodies are mounted in autarkic roller-body bearing devices, such as steel frames, for example, on both sides, braced relative to one another, the stress relief potential with regard to forces that would otherwise be introduced into the friction-ring transmission housing is particularly great.

For further stiffening of the roller-body bearing devices, it is advantageous if the autarkic roller-body bearing devices are connected with one another, particularly by means of a steel rack. In this way, the actual housing can be further relieved of stress. Of course, materials other than steel are also suitable for implementing such a rack.

In order to be able to dispose the roller bodies in a fixed location relative to other transmission elements of the friction-ring transmission, it is advantageous if the autarkic roller-body bearing devices are disposed in the friction-ring transmission housing.

The housing, in particular, can be configured to be significantly lighter, and also more filigreed in its geometry, by means of such an arrangement, so that in this regard, the construction space can be minimized. Nevertheless, sufficient stability and a great pressing force between the rolling modules can be guaranteed by means of the roller-body bearing device.

A further advantageous embodiment variant provides for a friction-ring transmission having a differential transmission, which is added to the friction-ring transmission and also mounted in the roller-body bearing device. Similar to the situation with regard to two roller bodies that can be connected with one another, in very rigid manner, by means of an autarkic roller-body bearing device, it is possible to additionally mount a differential transmission or transmission elements of it, with regard to roller bodies, in a roller-body bearing device, such as the steel frame mentioned above, for example.

The transmission elements are then mounted in particularly advantageous manner, particularly also with regard to temperature variations, since the steel frame has significantly more advantageous expansion coefficients than a housing made of an aluminum casting, for example. In particular, the properties of the roller-body bearing device, in total, can be suitably adapted to the properties of the transmission elements to be mounted, without having to take the housing into account, which can then be configured to be particularly light and to have a complex shape.

Since the mounting of roller bearings in autarkic roller-body bearing devices, such as in a steel frame, develops a friction-ring transmission further in particularly advantageous manner, the characteristics with regard to the autarkic roller-body bearing device are advantageous also independent of the other characteristics of the present invention.

Furthermore, it is advantageous if the roller bodies of the friction-ring transmission, particularly the friction cones, the friction ring and/or any roller body shafts that are provided, such as additional shafts of a friction cone, are made from steel, i.e. from the same material as the roller-body bearing device. Steel as a material has the advantage that it has a very great strength and rigidity. Components or transmission elements of the friction-ring transmission made from it are then particularly durable and resistant, thereby further increasing the operational reliability of the friction-ring transmission. For this reason, the characteristics with regard to the components or transmission elements made of steel are advantageous also independent of the other characteristics of the invention.

In order for a torque that interacts with the friction-ring transmission not to have to be transferred by way of gear wheels, as is the case with arrangements known from the state of the art, a friction-ring transmission having two roller bodies spaced apart from one another by a gap, which correspond with one another, rotating on axial roller body axes, by way of a friction ring, is advantageous, also independent of the other characteristics of the present invention, in which the friction ring is disposed to be displaceable axially, along the gap, by an adjustment path, in an adjustment bridge that is freely displaceable axially, whereby a double planetary transmission is disposed on the friction-ring transmission.

Furthermore, a reverse gear is implemented in particularly simple manner, in terms of design, in the case of the present friction-ring transmission, with the double planetary transmission. The reverse gear can be implemented with a small construction space and a minimal number of transmission elements, in interplay with the directions of rotation predetermined by the friction-ring transmission.

Also independent of the other characteristics of the invention, a friction-ring transmission having two roller bodies spaced apart from one another by a gap, which correspond with one another, rotating on axial roller body axes, by way of a friction ring, is advantageous, in which the friction ring is disposed to be displaceable axially, along the gap, by an adjustment path, in an adjustment bridge that is freely displaceable axially, and a link of the adjustment bridge or of a guide cage of the adjustment bridge is connected to interact with a drive, such as an eccentric motor, for example, on the one hand, and mounted in a link rotation point of the adjustment bridge or of the guide cage, on the other hand, and the link has an overload security device.

In this manner, the drive can be separated from the adjustment bridge or from the guide cage, respectively, particularly in the case of a malfunction, such as an overload, at the link, so that the adjustment bridge or the guide cage, respectively, can freely follow a different movement that has been predetermined. Furthermore, an overload security device that has been separated due to an overload, if designed suitably, can be engaged again immediately after the problem has been corrected, if necessary, quickly and in uncomplicated manner, if the overload security device is situated on the link.

The overload security device is protected particularly well against external influences if the overload security device is disposed within the link.

An embodiment that is particularly simple in this connection, in terms of construction, provides that the link has a tube in which the overload security device is disposed. It is understood that on the other hand, such an overload security device can be implemented in many different ways, in terms of design.

For example, a preferred embodiment variant provides that the overload security device has overload security means that are destruction-free. This has the advantage that at least in the case of a slight overload, the overload security device is not destroyed directly, but rather the overload security device independently compensates at least slight overloads, so that after the overload, operation of the transmission with regard to the freely displaceable adjustment bridge can be continued without any influence.

In order to make destruction-free overload security means available, it is advantageous if the overload security device has at least one pressure element and/or at least one tension element.

As the term "pressure element" already shows, the pressure element of the overload security device is provided for the purpose of compensating pressure peaks that act on the adjustment bridge, and therefore also on the link, at least on a noncritical range.

Accordingly, the "tension element" compensates noncritical tension forces that occur between the adjustment bridge and the drive.

The overload security device is implemented in a manner so as to save space, if the pressure element and the tension element are disposed so as to be displaceable relative to one another. Preferably, the pressure element and the tension element are nested into one another, at least in part, and are displaceable relative to one another in this connection, so that the overload security device can be built in very compact manner.

In order to equalize pressure and/or tension forces, it is also advantageous that both the pressure element and the tension element are mounted to be displaceable relative to the link.

The overload security device is given an advantageous bias if the pressure element and/or the tension element are biased with a spring element, in each instance. By means of the bias, it is possible that neither the pressure element nor the tension element rest against a rigid stop, but rather they can essentially be displaced along a link axis, in both directions.

In connection with the present invention, the pressure element and/or the tension element are dynamically acting overload security means. The overload security means act dynamically because destruction-free overload security means of the overload security device are implemented by means of their displacement, thereby making it possible to compensate at least slight, non-critical overload peaks in destruction-free manner.

An embodiment variant that can be built to be small, in terms of construction, provides that the tension element is mounted on a drive of the adjustment bridge or of the guide cage of the adjustment bridge. Due to the fact that the tension element of the overload security device is mounted directly on the drive, the need for additional components in order to achieve a connection of the overload security device with the adjustment bridge or the cage is eliminated.

Cumulatively and/or alternatively to this, it is proposed that the pressure element is mounted on the adjustment bridge or on the guide cage of the adjustment bridge. By means of arranging the pressure element directly on the adjustment bridge or on the guide cage, other additional components also become superfluous in this regard, so that the overload security device is implemented with as few components as possible and is built to be as compact as possible.

It is understood that in the case of another embodiment variant, the tension element can be attached directly to the adjustment bridge, and the pressure element can be attached directly to the drive of the adjustment bridge. In this way, the functional reliability and the method of functioning of the overload security device remain unimpaired.

If very great overloads occur, it can be advantageous, independent of the other characteristics of the present invention, if the overload security device has destructible overload security means such as a planned breaking point. This is particularly advantageous if the overload forces reach a critical range, to such an extent that they can no longer be compensated by means of the overload security means that act in dynamic manner.

In contrast to the overload security means that act in dynamic manner, the planned breaking point in the sense of the invention is an overload security means that acts in static manner. This is destroyed after having been triggered, so that it must be replaced before the overload security device is able to function again.

Furthermore, the task of the present invention is accomplished, independent of the other characteristics described here, by a friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially, and which is characterized by a failure security device having means for setting the adjustment bridge or a guide cage of the adjustment bridge into an emergency position, independent of the primary drive of the adjustment bridge or the guide cage.

By means of the failure security device, it is possible to operate the present friction-ring transmission even if the primary drive of the adjustment bridge or of the guide cage fails or only operates in disrupted manner. Thus, a friction-ring transmission having a failure security device is particularly reliable in operation, as compared with conventional friction-ring transmissions from the state of the art.

It is particularly advantageous if the failure security device represents a secondary drive for the adjustment bridge or for the guide cage. By means of the failure security device as a secondary drive, the adjustment bridge, i.e. the guide cage of the adjustment bridge, is given a redundant drive, thereby further increasing the operational reliability of the friction-ring transmission.

The failure security device is implemented in particularly simple manner, in terms of construction, and to save space, if the failure security device is disposed between the adjustment bridge and a primary drive of the adjustment bridge.

In order to make it possible to uncouple a primary drive that does not function properly from the adjustment bridge or from the guide cage, respectively, and for the adjustment bridge or the guide cage to be set in a different way, it is advantageous if the failure security device has a locking/unlocking device for a force flow between the adjustment bridge and the primary drive.

It is understood that corresponding setting means of the adjustment bridge or of the guide cage, respectively, which serve for the other way of setting as described above, can be implemented in many different ways. A particularly simple embodiment variant provides that the setting means have a cam disk and a cam follower that rotates on it. In this connection, the cam follower is pressed against the cam disk by means of a spring element. The cam disk can be "engaged" into an emergency position by means of the cam follower. It can then be implemented, by means of suitable measures, that this engagement takes place only in case of an emergency, in that the cam follower is prevented from engaging in the normal operating state, for example.

It is advantageous if the cam follower is disposed in an emergency position between two cams of the cam disk, for example, during engagement of the cam follower. The cam follower remains there so long, and thereby blocks rotation of the cam disk, until the function of the primary drive is restored in problem-free manner.

In order to be able to interrupt the force flow between a drive of the adjustment bridge and the adjustment bridge, or the guide cage of the adjustment bridge, respectively, it is advantageous if the locking/unlocking device has a release device, such as an electrically driven piston, for blocking a force flow, and an engagement device, such as a spring element, for unlocking the force flow. Furthermore, the cam follower can also be released by means of the release device, in such a manner that it can engage in the cam disk.

For example, the release device moves a first clutch disk of an emergency clutch away from the cam disk, which represents a second clutch disk of the emergency clutch, so that the two clutch disks are separated from one another. In this connection, the release device displaces the first of the clutch disks away from the cam disk in such a manner that it no longer blocks the cam follower, so that the cam disk rotates freely until the cam follower rotating on it engages between two cams of the cam disk and fixes it in place in the emergency position.

Once the primary drive has been restored again, the release device can move back into its original position and the first clutch disk can be displaced back in the direction of the cam disk, until the cam disk, in other words the second clutch disk, properly interacts with the first clutch disk again.

Additional advantages, goals, and properties of the present invention will be described using the following explanation of the attached drawing, in which friction-ring transmissions as well as modules of them are shown as examples.

BRIEF DESCRIPTION OF THE DRAWINGS

The drawing shows:

FIG. 9 a schematic top view of the cage and the adjustment bridge according to FIG. 8;

FIG. 10 an alternative to the cage according to FIG. 9;

FIG. 11 an alternative to the cages according to FIGS. 9 and 10;

FIG. 12 another alternative to the cages according to FIGS. 9 to 11;

FIG. 20 schematically, a longitudinal section through the cage having the motion link arrangement according to FIG. 19;

FIG. 21 schematically, a side view of a concrete exemplary embodiment of a cage having a motion link arrangement according to FIGS. 19 and 20, in interaction with friction cones, from a first perspective;

FIG. 22 schematically, a side view of the concrete exemplary embodiment according to FIG. 21, without friction cones, from the first perspective;

FIG. 23 schematically, a side view of the concrete exemplary embodiment having friction cones, from another perspective;

FIG. 24 schematically, a side view of the concrete exemplary embodiment according to FIG. 22, without friction cones, from the other perspective;

FIG. 25 schematically, a top view of the concrete exemplary embodiment according to FIGS. 21 to 24, with friction cones, from another perspective;

FIG. 26 schematically, a top view of the concrete exemplary embodiment according to FIG. 25, with friction cones, from another perspective;

FIG. 27 schematically, a top view of the concrete exemplary embodiment according to FIGS. 21 to 26, with friction cones, from another perspective;

FIG. 28 schematically, a top view of the concrete exemplary embodiment according to FIG. 27, without friction cones, from the other perspective;

FIG. 44 schematically, a side view of a friction-ring transmission having a double planetary drive disposed on the input side;

FIG. 45 schematically, a side view of a friction-ring transmission having a double planetary drive disposed on the output side;

FIG. 46 schematically, a side view of a guide cage for an adjustment bridge having an overload security device;

FIG. 47 schematically, a side view of the guide cage from FIG. 46, in a first sectional representation;

FIG. 48 schematically, a side view of the guide cage from FIGS. 46 and 47, in another sectional representation;

FIG. 52 schematically, a side view of a deactivated failure security device with the force flow interrupted, and FIG. 53 schematically, the side view of the deactivated failure security device from FIG. 52 in cross-section.

DETAILED DESCRIPTION OF PREFERRED EMBODIMENTS

Figure 1:
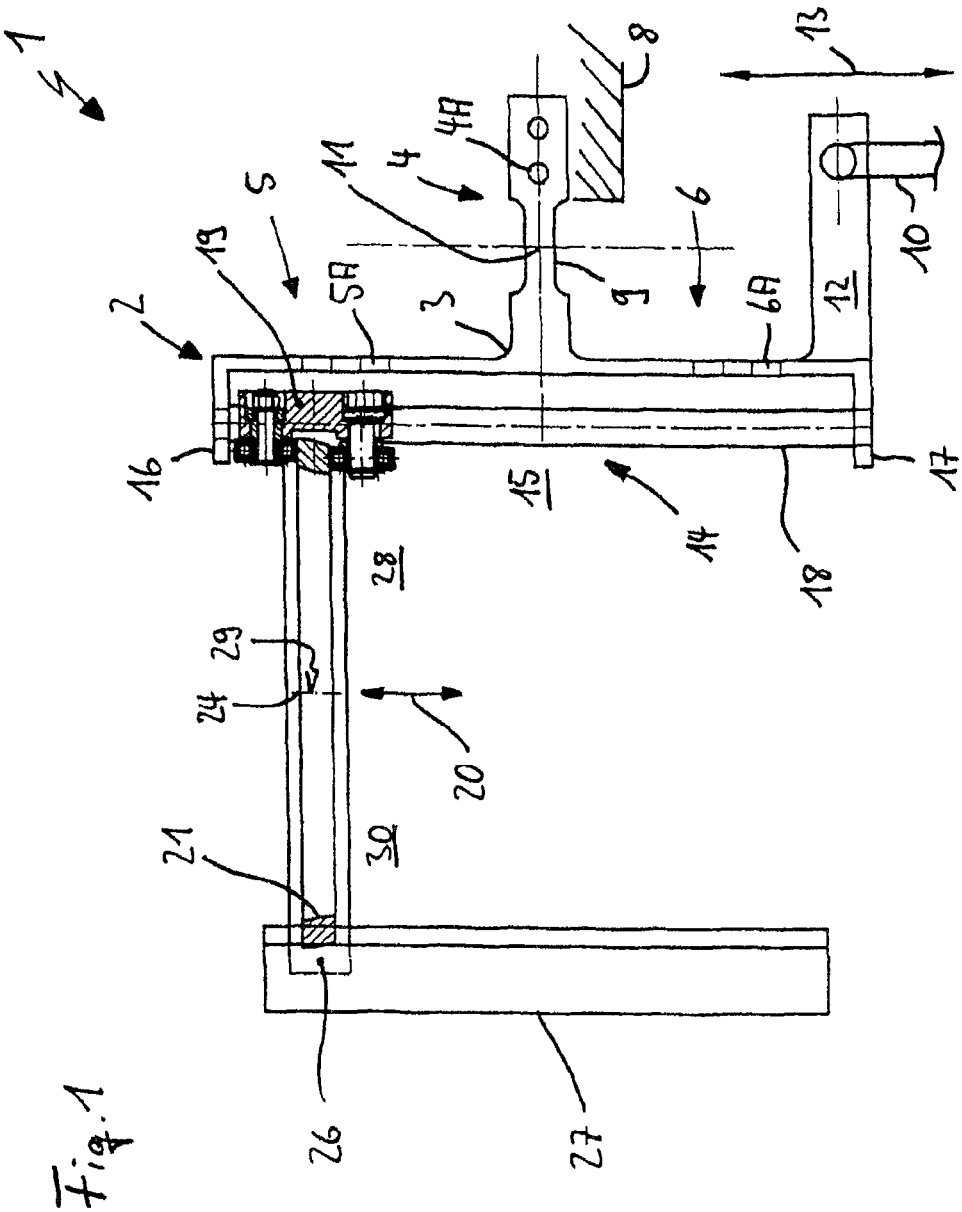
FIG. 1 schematically, a top view of a cage having a leaf spring as an elastic bearing device of a friction-ring transmission, FIG. 2 schematically, a cross-section of the cage from FIG. 1, FIG. 3 schematically, a top view of another cage having a rubber element as an elastic bearing device of a friction-ring transmission, FIG. 4 schematically, a cross-section of the other cage from FIG. 3, FIG. 5 schematically, a top view of a cage having an adjustment motor as an alternative elastic bearing device of a friction-ring transmission, FIG. 6 schematically, a cross-section of the cage from FIG. 5, FIG. 7 schematically, a side view of the connection between the adjustment motor and an axial guide axle of the cage from FIGS. 5 and 6, FIG. 8 schematically, a perspective side view of a cage of a friction-ring transmission, alternative to the embodiment according to FIGS. 5 to 7.

The arrangement 1 of the friction-ring transmission shown in FIG. 1 particularly comprises a cage 2 that is essentially configured as a sheet-metal body 3. Because of the design of this sheet-metal body 3, the cage 2 has a first elastic bearing device 4, a second elastic bearing device 5, and a third elastic bearing device 6. Bores 4A, 5A, and 6A, respectively (numbered only as examples here) are provided on each of its elastic bearing devices 4, 5, and 6, so that the cage 2 can be screwed onto a friction-ring transmission housing 8 by way of screw connections 7 (shown only as examples with regard to FIG. 2). In the present case, at least the first elastic bearing device 4 has a narrowing 9 in cross-section, so that the cage 2 can be pivoted about an axis of rotation 11 by means of a setting lever 10, in the paper plane of FIG. 1. For this purpose, the setting lever 10 is mounted on the cage 2 in articulated manner, by means of a setting lever accommodation sheet metal 12. In this exemplary embodiment, the setting lever 10 is moved back and forth in translatory manner, in order to pivot the cage 2 in accordance with the double arrow 13.

Furthermore, the arrangement 1 has an axial guide device 14, which is disposed in a U-shaped curved region 15 of the cage 2, between a first shank 16 of the sheet-metal body 3 and a second shank 17 of the sheet-metal body 3. In the present case, the axial guide device 14 comprises a cylindrical guide axle 18, on which an adjustment bridge 19 can be freely moved in accordance with the directions of the double arrow 20. In the present case, the axial guide device represents a one-sided axial guide of the adjustment bridge 19 within the cage 2, in a structurally particularly simple manner.

A friction ring 21 that produces a connection between two roller bodies, not shown in greater detail here, actually in known manner, is mounted to rotate by means of a first roll holder 22 and a second roll holder 23, using the adjustment bridge 19. The first roll holder 22 represents a first bearing point in the sense of the invention. Accordingly, the second roll holder 23 represents a second bearing point in the sense of the invention. In the representation according to FIG. 2, a first roller body axis 24 of a first one of the two roller bodies is shown schematically.

In order to prevent the adjustment bridge 19 from rotating about the cylindrical guide axle 18, the adjustment bridge 19 has an anti-rotation security device 25. In this exemplary embodiment, the anti-rotation security device 25 consists of an anti-rotation security device peg 26, which is an integral part of the adjustment bridge 19. Furthermore, the anti-rotation security device 25 has a running rail 27, in which the anti-rotation security device peg 26 can slide back and forth in accordance with the directions of the double arrow 20. The running rail 27 of the anti-rotation security device 25 is attached to the friction-ring transmission housing 8, so that larger forces can also be easily absorbed by the anti-rotation security device 25, and passed into the friction-ring transmission housing 8.

In this exemplary embodiment, the anti-rotation security device 25 is provided opposite the axial guide device 14, whereby the axial guide device 14 is disposed in the region of a first surface side 28 of a surface 29 that passes through the two roller body axes, while the anti-rotation security device 25 is disposed on a second surface side 30 of the surface 29. The adjustment bridge 19 is therefore mounted axially only on a single surface side 28, with regard to the surface 29 predetermined by the roller body axes (here, only the first roller body axis 24 of the first roller body is shown).

The surface 29 is formed by means of and along the two roller body axes, represented by the first roller body axis 24 of the first roller body, as an example. The surface 29 that forms the basis here, and therefore also the plane described by the surface 29, runs at a right angle to the paper plane, in accordance with the representations of FIGS. 1 and 2. The surface 29 can also intersect the paper plane at an acute angle.

Because of the one-sided mounting of the adjustment bridge 19, the risk that the adjustment bridge 19 might jam with regard to two axial guide devices, and therefore problem-free operation of the friction-ring transmission would no longer be guaranteed or at least restricted, is minimized. As a result, adjustment of the friction ring 21 with regard to an adjustment path (not shown here, for the sake of simplicity) between the first shank 16 of the sheet-metal body 3 and the second shank 17 of the sheet-metal body 3 is configured to be very reliable, because of the single axial guide device 14 of the adjustment bridge 19.

Figure 3:
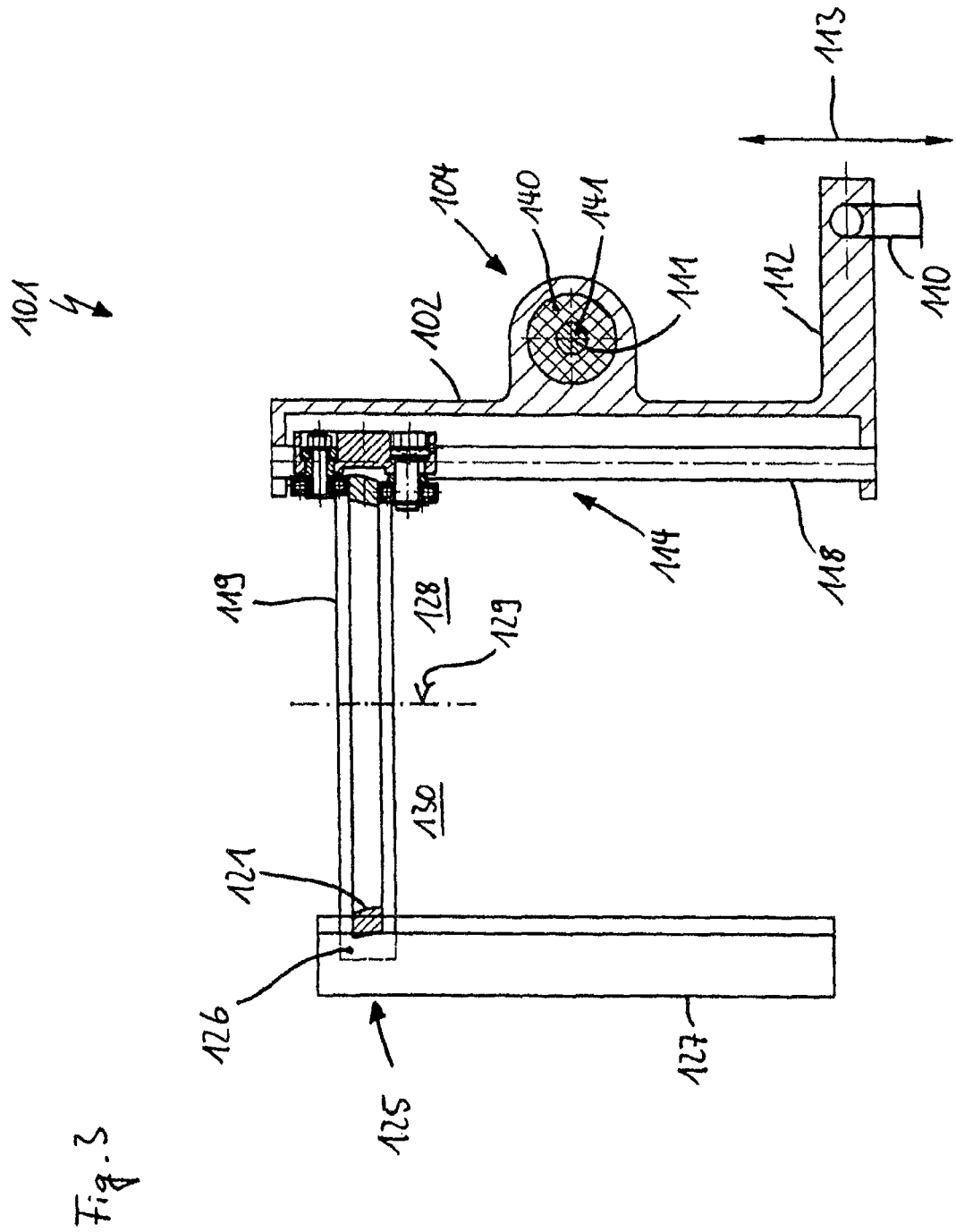
Figure 4:
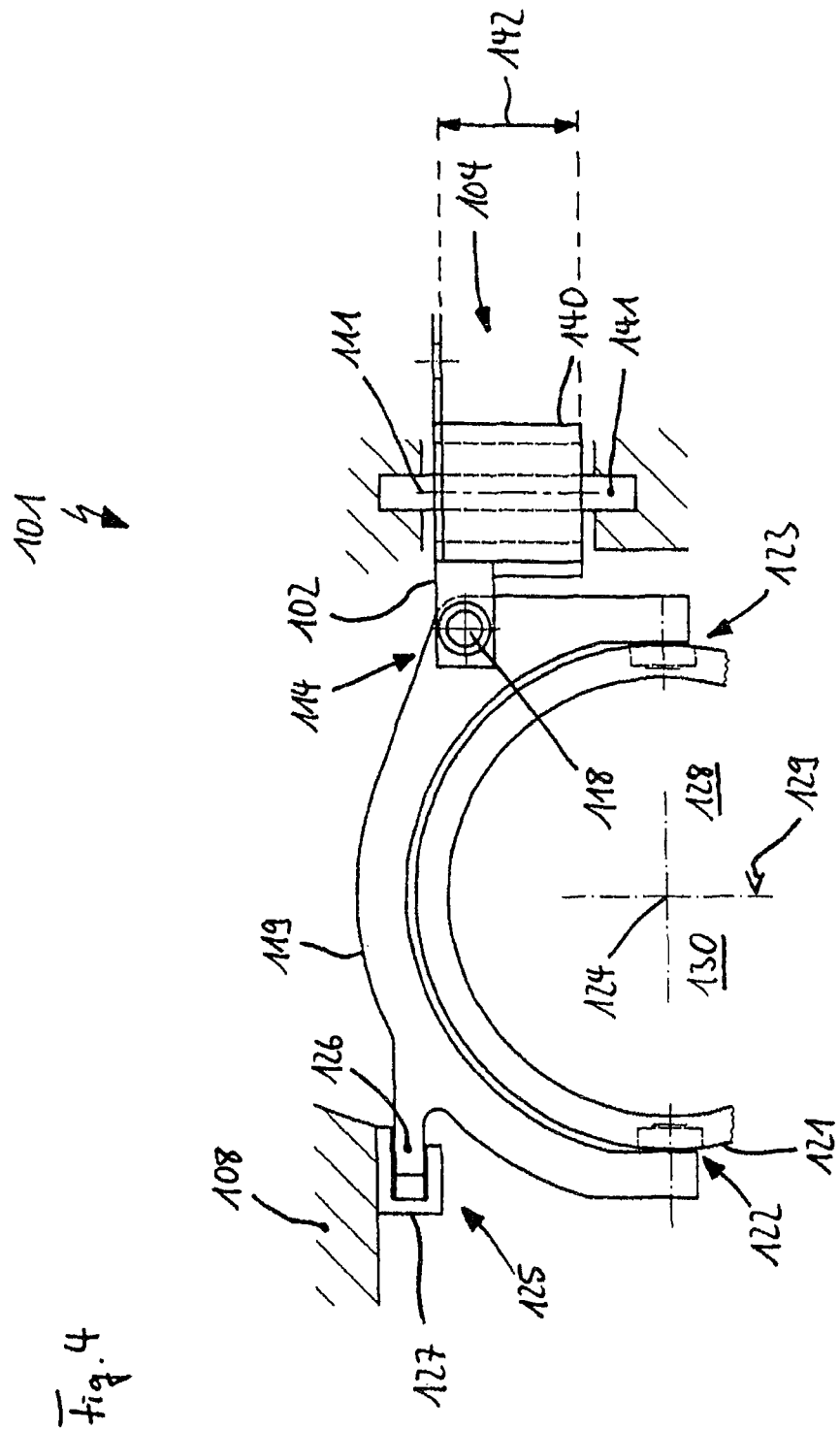

The arrangement 101 of a friction-ring transmission shown in FIGS. 3 and 4 essentially comprises a cage 102 in which an adjustment bridge 119 is mounted by means of an axial guide device 114. A friction ring 121 is guided with the adjustment bridge 119, by means of a first roll holder 122 and a second roll holder 123. In order to prevent incorrect rotation of the adjustment bridge 119 with regard to a guide axle 118 of the axial guide device 114, the adjustment bridge 119 has an anti-rotation security device 125, which comprises an anti-rotation security device peg 126 with regard to the adjustment bridge 119. The anti-rotation security device peg 126 corresponds with a running rail 127, which is attached to a friction-ring transmission housing 108. Aside from the running rail 127, the cage 102 is also attached in the friction-ring transmission housing 108. In contrast, the adjustment bridge 119 is only mounted on the cage 102 by means of the axial guide device 114. Thus, the adjustment bridge 119 is mounted on the cage 102 only by means of a single bearing. This almost completely precludes the risk of canting of the adjustment bridge 119 with regard to the axial guide device 114, so that adjustment of the friction ring 121 with regard to the roller bodies that correspond with one another (not shown here, for the sake of simplicity) is configured with particular operational reliability.

In this exemplary embodiment, as well, the axial guide device 114 is situated only on a first surface side 128 with regard to a surface 129. The anti-rotation security device 125, on the other hand, is situated on a second surface side 130 of the surface 129. The surface 129 runs through and along the two roller body axes of the roller bodies, not shown in detail here, which can interact with one another by means of the friction ring 121. The surface 129 extends perpendicular to the paper plane, in accordance with the representations of FIGS. 3 and 4. The surface 129 can also intersect the paper plane at an acute angle.

Figure 2:
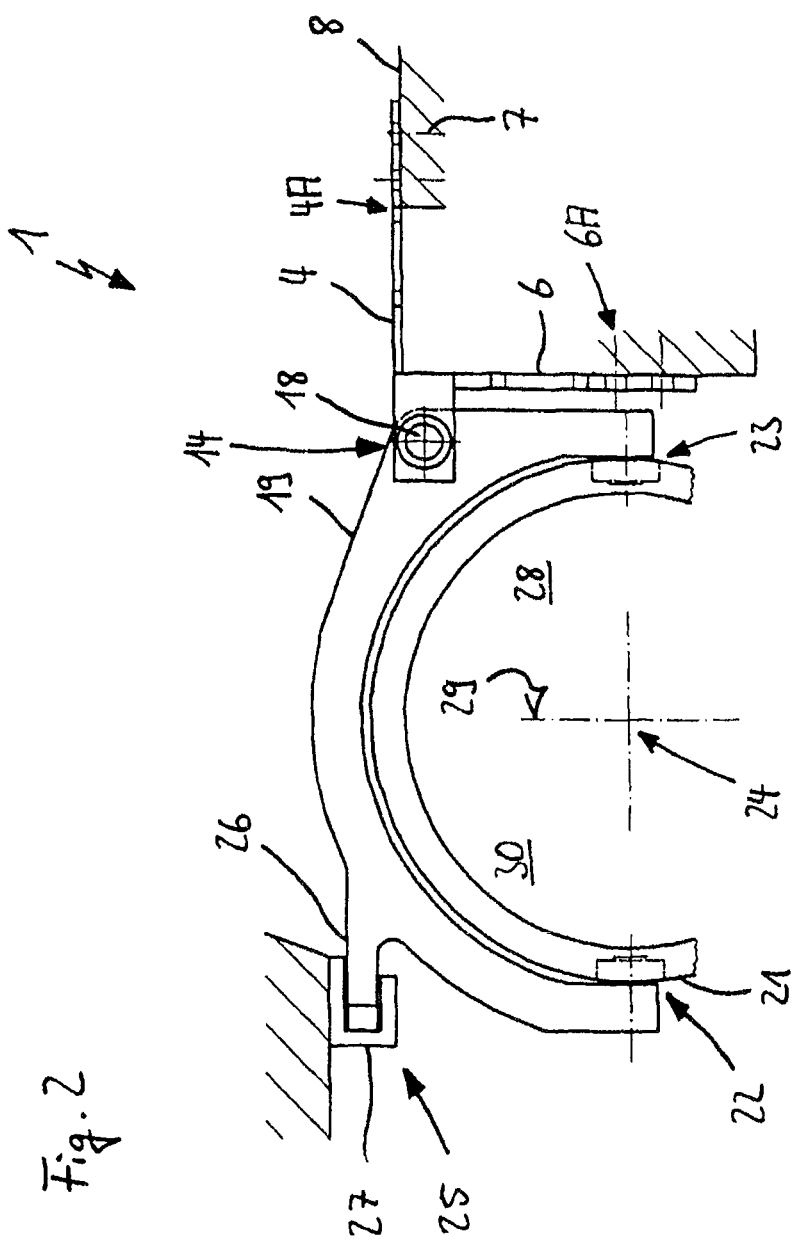

The significant difference between the arrangement 1 according to FIGS. 1 and 2 and the arrangement 101 according to FIGS. 3 and 4 lies in the structure of the cages 2 and 102, 68 particularly in the different elastic bearings 4, 5, 6, and 104, respectively, of the two cages 2 and 102. The elastic bearing device 104 in the case of the arrangement 101 is implemented as a rubber element 140 having a fixed attachment core 141, by way of which the cage 102 corresponds with the friction-ring transmission housing 108. By means of the rubber element 140 of the elastic bearing device 104, it is possible to be able to set the cage 102 about an axis of rotation 111, so that the cage 102 can be set along the axial guide device 114 by means of a different setting angle.

In order to be able to transfer the required setting forces to the cage 102, a setting lever accommodation sheet metal 112, on which a setting lever 110 is attached in articulated manner, is provided on the cage 102. The setting lever 110, attached in articulated manner, can be moved back and forth in accordance with the double arrow 113, so that as a consequence of this, the cage 102 is rotated about the axis of rotation 111.

The stability, i.e. the degree of strength of the bearing of the cage 102 within the friction-ring transmission, is determined not only by the selection of material but also by the selected length 142 of the rubber element 140. If the length ratios of the rubber element 140 are chosen appropriately, the cage 102 finds sufficient hold within the friction-ring transmission despite the elastic bearing device 104, so that reliable adjustment of the adjustment bridge 119 and therefore also of the friction ring 121, with regard to roller bodies (not explicitly shown here, for the sake of simplicity), as well as a sufficiently stable bearing perpendicular to the degree of freedom required for this purpose is guaranteed.

The alternative arrangement 201 shown in FIGS. 5 to 7, in the region of a cage 202 of a friction-ring transmission, has an adjustment motor 245 for implementing the elastic bearing device 204 for the cage 202, which motor is coupled with a cylindrical guide axle 218 of an axial guide device 214, by way of a transmission arrangement 246. In the present exemplary embodiment, the cylindrical guide axle 218 represents the actual cage 202 of the arrangement 201. The cylindrical guide axle 218 is moved back and forth, in pendulum manner, by means of the adjustment motor 245 and the transmission arrangement 246, so that an adjustment bridge 219 can be set with regard to roller bodies, not shown in detail here.

In this exemplary embodiment, as well, the adjustment bridge 219 is mounted on one side on the axial guide device 214. As in the case of the exemplary embodiments explained above, the adjustment bridge 219 has not only the axial guide device 214 but also an anti-rotation security device 225, which comprises an anti-rotation security device peg 226 on the adjustment bridge side, which peg is inserted to slide within a running rail 227. The running rail 227 is attached in a friction-ring transmission housing 208. The adjustment motor 245, as well as the side of the cage 202 that lies opposite the adjustment motor 245, is also attached directly to the friction-ring transmission housing 208.

As in the case of the exemplary embodiments described previously, a friction ring 221 is mounted on the adjustment bridge 219 itself. The friction ring 221 rotates about a roller body axis 224. In order for the friction ring 221 to be able to move accordingly with regard to the adjustment bridge 219, the friction ring 221 is attached to the adjustment bridge 219 so as to rotate, by means of a first roll holder 222 and a second roll holder 223. As in the case of the two exemplary embodiments explained above, the adjustment bridge 219 is mounted within the friction-ring transmission housing 208, relative to the cage 202, only by means of a single axial guide device 214. In this connection, the one single axial guide device 214 is situated on a first surface side 228 of the surface 229. In this exemplary embodiment, as well, the surface 229 is essentially a plane that passes through two roller body axes 224 of two roller bodies. According to the representations according to FIGS. 5 and 6, it extends perpendicular to the paper plane. The surface 229 can also intersect the paper plane at an acute angle.

By means of such an arrangement 201, the adjustment bridge 219 is mounted, in advantageous manner, axially only on one side 228 with regard to a surface 229 predetermined by the roller body axis 224. In this way, jamming of the adjustment bridge 219 on the axial guide device 214 of the cage 202 is prevented.

In the case of this exemplary embodiment, the elastic bearing 204 takes place by way of a leaf spring 248, which can also be configured in one piece with the cage 202, with the guide axis 218, for example. As is directly evident, reset forces can be applied by means of the elastic bearings of the exemplary embodiments described above. If suitably implemented, these reset forces can be selected in such a manner that the cage or the adjustment bridge, respectively, are brought into an emergency position by means of these reset forces, if the drive, for example the adjustment motor, fails.

An alternative to the embodiment according to FIGS. 5 to 7 is shown in FIGS. 8 to 9. This corresponds essentially to the embodiment according to FIGS. 5 to 7, so that identical modules are also numbered identically here and will not be explicitly explained again. Here again, a friction ring 221 rotates between two conical friction wheels 252 and 253, surrounding one of the conical friction wheels 252, 253, and is guided by an adjustment bridge 219 that in turn is mounted on a cage 202 so as to be freely displaceable axially. However, the cage 202, i.e. the guide axle 218, is mounted to be axially displaceable not by way of a leaf spring but rather by way of a bearing bushing 248A, whereby a suitable bearing point is used to guarantee that the guide axle 218 has no radial play in the bearing bushing 248A, or only very slight play, but can tilt in the bearing bushing 248A.

Such tilting can be implemented in particularly simple manner, in terms of construction, as an alternative, using a disk spring 248B, as shown in FIG. 10, with minimal radial play. Instead, a tilt-elastic rubber bushing 248C (see FIG. 11) can also be used.

Furthermore, in the case of the arrangements according to FIGS. 8 to 11, a lever 246A mounted on the housing is provided, which can be driven by an eccentric motor, similar to the adjustment motor 245, not shown in detail. Furthermore, the guide axle 218 is mounted on the lever 246A so as to rotate, by way of a bearing 249. In this regard, the lever 246A predetermines the movement and can be displaced very precisely, with only one rotational degree of freedom, while the bearing of the guide axle 218 can assure the corresponding equalization. This represents a deviation from the exemplary embodiment according to FIGS. 5 to 7, in which the equalization takes place essentially by means of play between the guide axle 218, the lever, i.e. the transmission arrangement 246, and the adjustment motor 245.

The exemplary embodiment according to FIG. 12 also corresponds essentially to the aforementioned exemplary embodiment. However, in the case of this exemplary embodiment, the bearing point for the guide axle 218 is moved in the direction of the center of the cone. In this regard, in the case of this arrangement, the rotation point for the guide rod 218 and therefore also for the cage 202 lies in a plane that passes through the guide rod 218 and is disposed parallel to the shaft axes, resulting in extremely small movements of the guide rod 218 and the cage 202, respectively, thereby causing this arrangement to use up very little space. Preferably, bearing takes place within the guide axle 218, which particularly saves space. In the case of the present exemplary embodiment, this is implemented by means of a bearing head 248D, which is attached to a rod 248E and rests in a bearing pan 248F, which in turn is disposed in the guide axle 218.

The arrangements 1, 101, and 201 described above are also particularly suitable for being disposed on or in friction-ring transmissions according to FIGS. 13 to 18.

The friction-ring transmissions represented in FIGS. 13 to 18 consist essentially of two conical friction wheels 352 and 353 disposed on parallel roller body axes 350 and 351, at a radial distance from one another, which are disposed in opposite directions and have the same cone angle β. A friction ring 321 bridging the radial distance is disposed between the conical friction wheels 352 and 353, which surrounds the first conical friction wheel 352 and is held in a cage 302. Therefore, a gap 321A is present due to the distance between the two conical friction wheels 352 and 353.

The cage 302 consists of a frame that is formed by two cross-heads 354 and 355, and two parallel guide axles 356 and 357 accommodated in them. These guide axles 356, 357 are disposed parallel to the conical friction wheel axes 350 and 351, and, at the same time, to the generatrix of the conical friction wheels 352 and 353 that is inclined at an angle of β, and carry an adjustment bridge 319 having two pegs 358 that face one another (numbered only as examples here), on which a first roll holder 322 and a second roll holder 323, respectively, sit. The roll holders 322 and 323 engage on both sides of the friction ring 321 and give the latter the necessary axial guidance.

The center of the cross-head 354 forms a vertical axis of rotation 311, about which the entire cage 302 can pivot. For this purpose, the lower cross-head 355 is connected with a cross-drive 359, which engages on it and is not shown in greater detail, and an adjustment motor 345.

In the case of this exemplary embodiment, the axis of rotation 311 lies in the surface determined by the conical friction wheel axes 350 and 351 of the conical friction wheels 352 and 353, which surface represents a plane. The surface 329 can also lie in a plane parallel to this, or intersect the first surface 329 at an acute angle.

If the cage 302 is pivoted by a few degrees of angle, the friction drive will provide for an axial adjustment of the adjustment bridge 319 and therefore a change in the translation ratio of the conical friction wheels 352 and 353. A tiny expenditure of energy is sufficient for this.

Figure 15:
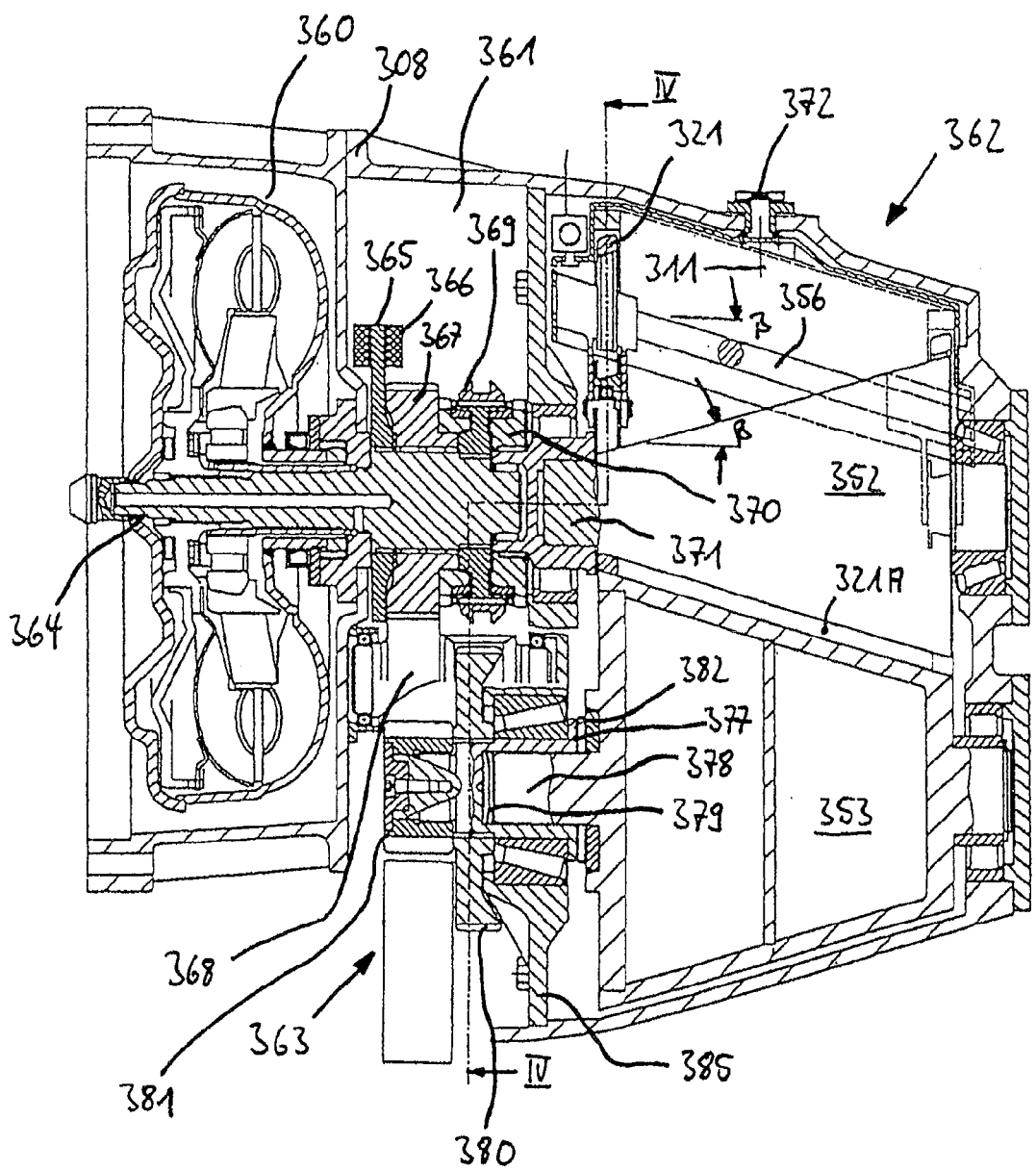
FIG. 15 schematically, a longitudinal section through a vehicle drive for a front-wheel drive having a friction-ring transmission.

The front-wheel drive for a vehicle shown in FIG. 15 has a conical friction-ring transmission 360. The front-wheel drive consists essentially of a hydraulic converter or a fluid clutch 360, a switching unit 361 that follows the latter, the conical friction-ring transmission 362, and a power take-off 363.

The drive part of the fluid clutch 360 sits on a shaft 364, on which a brake disk 365 is also disposed, which interacts with the brake pads 366 held with the conical friction-ring transmission housing 308, and can be controlled electronically. A free-running gear wheel 367 that stands in engagement with an auxiliary transmission 368, shown only in part, and can bring about reverse movement in the power take-off 363, sits directly behind the brake disk 365. The gear wheel 367 has a crown tooth system on one side, with which it can be brought into engagement with a switching cuff 369 that has an inner axial tooth system, is held on the shaft 364, and is axially displaceable, and can thereby be activated.

If a reversal of the direction of rotation is desired, first the brake, consisting of brake disk 365 and brake pads 366, is activated, so that the subsequent transmission is not negatively affected by the torque surge. Then, the switching cuff 369 in FIG. 15 is moved to the right, out of its neutral position shown there, and comes into engagement with a pinion 370, which is rigidly connected with the drive shaft 371 of the conical friction wheel 353 of the conical friction-ring transmission 362.

Figure 13:
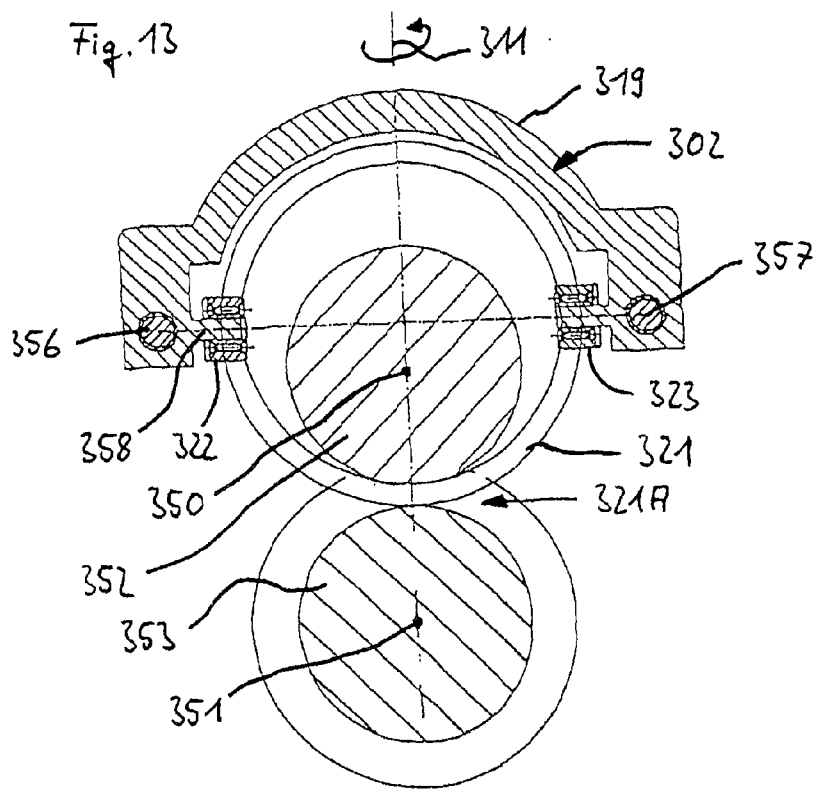
FIG. 13 schematically, a cross-section of a friction-ring transmission, in which one of the cages described above can be disposed, with regard to the section surface "I-I" from FIG. 14.
Figure 14:
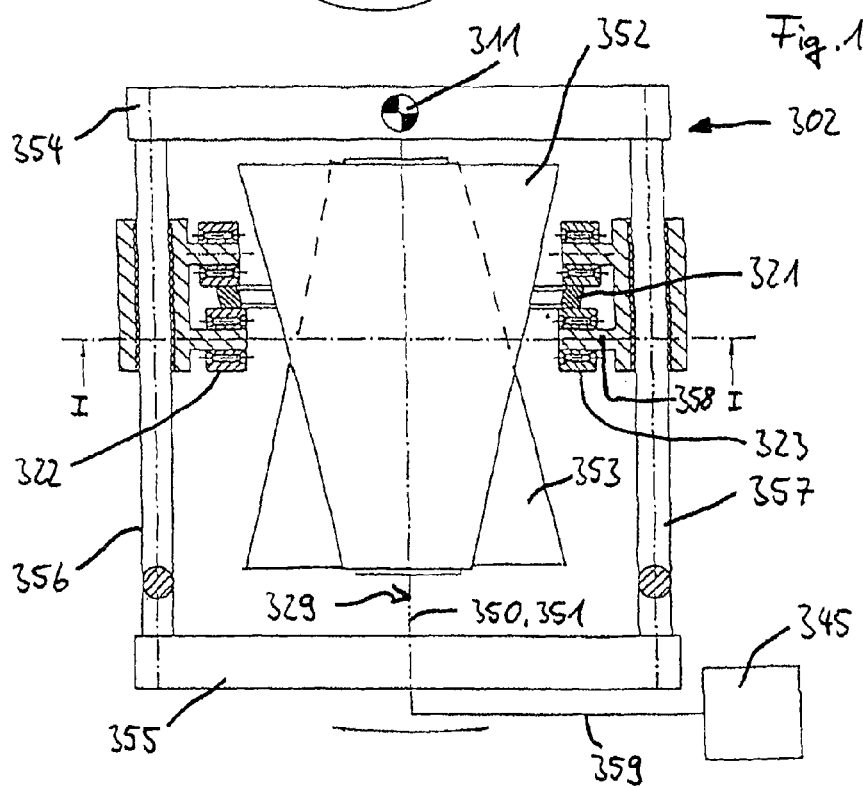
FIG. 14 schematically, a top view of the friction-ring transmission according to FIG. 13.

The conical friction-ring transmission 362 consists, as also described in connection with FIGS. 13 and 14, of two opposite conical friction wheels 352 and 353, disposed at a radial distance from one another, having the same cone angle and parallel axes. Furthermore, the first conical friction wheel 352 (here, the upper conical friction wheel) is surrounded by the friction ring 321, which stands in friction engagement with the second conical friction wheel 353 with its inner mantle surface, and with the first conical friction wheel 352 with its outer mantle surface.

The two conical friction wheels 352, 353 can have different diameters, as shown, thereby possibly saving one translation step in the subsequent drive 363. For reasons of weight, the conical friction wheels 352 and 353 can also be configured to be hollow, since the only thing that matters is their mantle surface.

Figure 16:
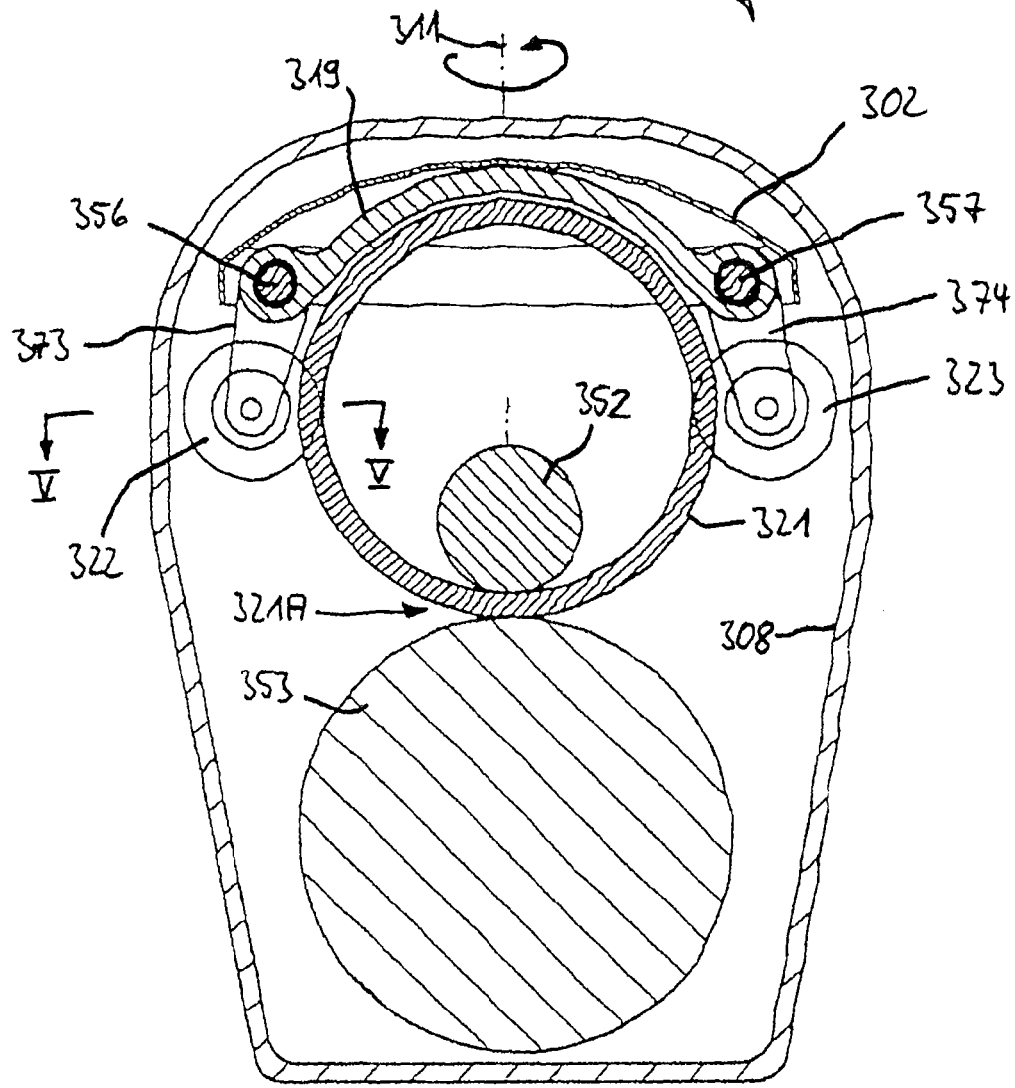
FIG. 16 schematically, a representation of an adjustment bridge with regard to the section surface "IV-IV" of the friction-ring transmission from FIG. 15.
Figure 17:
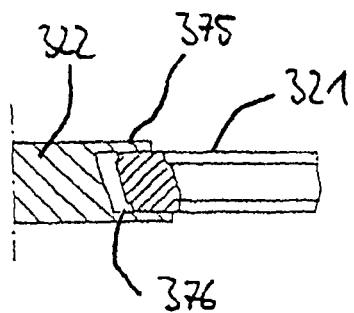
FIG. 17 schematically, a detail of the adjustment bridge from FIG. 16, with regard to the section surface "V-V"

The friction ring 321 is also held in a cage 302, as also shown in FIGS. 16 and 17, which cage is disposed to pivot about an axis of rotation 311 at the location 372 (FIG. 10) in the friction-ring transmission housing 308, which location lies in the plane determined by the conical friction wheel axes 350 and 351, respectively, of the conical friction wheels 352 and 353, respectively. In order to avoid large pivot paths, it lies approximately in the middle of the axial length of the conical friction wheels 352, 353. The axis of rotation 311 can also lie in a plane parallel to this, as mentioned above, and intersect the plane first mentioned at an acute angle.

Two parallel guide axles 356 and 357 are held in the cage 302; their incline angle β relative to the horizontal, is equal to the cone angle β of the conical friction wheels 352 and 353. An adjustment bridge 319 is guided on these guide axles 356 and 357, which bridge has projections 373 and 374, respectively, on which roll holders 322 and 323, respectively, are mounted. These have a circumferential groove 375, as shown in FIG. 12, and engage the friction ring 321 with their flanges 376.

The friction ring 321 can be disposed with its axis parallel to the conical friction wheel axes 350, 351 of the conical friction wheels 352 and 353. However, it can also be held in the cage 302 in such a manner that its axis lies parallel to the generatrix of the conical friction wheels 352, 353 that face one another, and stands perpendicular on the mantle surface of the conical friction wheels 352, 353.

For the adjustment of the cage 302, an adjustment spindle 377 mounted in the housing 308 is provided, which is connected with an adjustment motor or magnet, not shown, and engages on the cage 302.

In the case of a slight rotation of the cage 302, the friction ring 321 is rotated about the axis 311, thereby changing the relative position with regard to the conical friction wheels 352 and 353, so that the friction ring 321 automatically changes its position and changes the translation ratio of the conical friction-ring transmission 362.

The power take-off shaft 378 of the conical friction wheel 353 is accommodated in a pressing device 379 that in turn is mounted in the housing 308, and carries power take-off pinions 380, 381.

The pressing device 379 consists of an extension shaft that engages over the power take-off shaft 378, with a flange 382 having a radial tooth system that faces the conical friction wheel 353, which tooth system interacts with a corresponding radial tooth system on the conical friction wheel 353. The radial tooth system brings about an axial pressure on the conical friction wheel 353.

It is advantageous if the friction-ring transmission housing 308 is divided by a partition 385, between the drive and power take-off 360, 361, 363, on the one hand, and the conical friction-ring transmission 362, on the other hand. In this way, it is possible to allow a cooling fluid not having lubricant properties, for example silicone oil, into the housing part for the friction-ring transmission 362, so that the friction value is not influenced. Traction fluids or oils with ceramic powder or other solid particles are also suitable as a cooling fluid for the friction-ring transmission 362.

It is advantageous if the friction surfaces of at least one transmission part of the friction-ring transmission 362, for example the conical friction wheels 352, 353 or the friction ring 321, consist of a coating or hard metal or ceramic, for example titanium nitride, titanium carbon nitride, titanium aluminum nitride, or the like.

Figure 18:
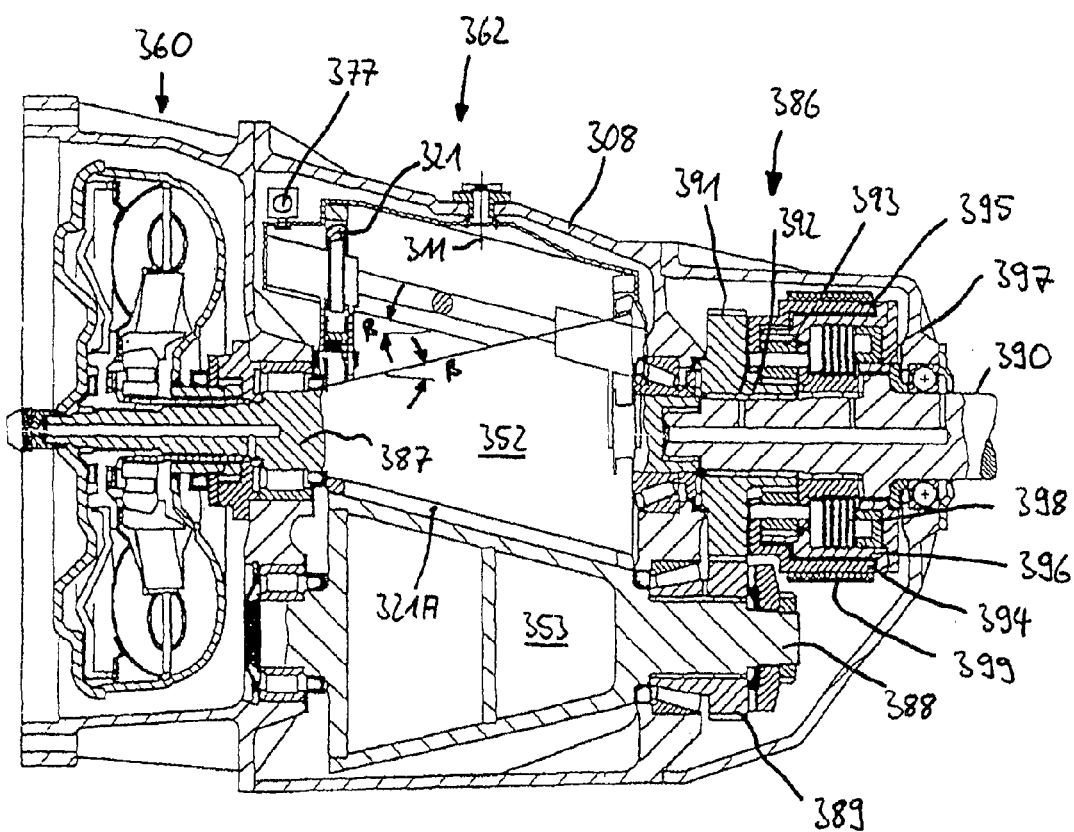
FIG. 18 schematically, a longitudinal section through a rear-wheel drive for a vehicle having a friction-ring transmission.

The use of the friction-ring transmission 362 shown in FIG. 18 is assigned to a rear-wheel drive of a vehicle and essentially corresponds to the arrangement according to FIGS. 15 to 17, so that modules that have the same effect are also numbered identically. A fluid clutch, i.e. a hydraulic converter 360 is situated in front of the friction-ring transmission 362, and a planetary transmission 386 is situated behind the friction-ring transmission 362.

At the same time, the power take-off shaft of the fluid clutch 360 forms the shaft 387 of the upper first conical friction wheel 352, which drives the second conical friction wheel 353 by way of the friction ring 321; a pinion 389 sits on the power take-off shaft 388 of the second, which pinion meshes with a gear wheel 391 that sits on a transmission power take-off shaft 390 so as to rotate freely. The transmission power takeoff shaft 390 aligns with the shaft 387 and is accommodated to rotate freely in it. A pinion 392 connected in one piece with the gear wheel 391 forms the sun gear of the planetary transmission 386. This meshes with planetary gear wheels 393, which are held in a planetary carrier 394, which is able to run about the transmission power take-off shaft 390. The planetary carrier 394 has a cylindrical projection 395, which encloses a ring gear 396, which meshes with the planetary gear wheels 393 and is rigidly connected with the transmission power take-off shaft 390 by way of a longitudinal tooth system 397. Furthermore, a multiple disk clutch 398 is provided in the planetary transmission 386, which can connect the transmission power take-off shaft 390 with the ring gear 396. Finally, a brake is assigned to the cylindrical projection 395 of the planetary carrier 392.

The forward gear is engaged by means of activating the multiple disk clutch. If the brake is activated, the planetary carrier is held in place and this results in a change in the direction of rotation of the transmission power take-off shaft 390, in other words a reverse drive.

As is directly evident, the axis of rotation for the cage is disposed in the region of the cones, i.e. the cone axes, in the case of the exemplary embodiments according to FIGS. 13 to 18. This is different in the case of the exemplary embodiments according to FIGS. 1 to 12. Here, the axis of rotation lies outside of the space taken up by the cones and the cone axes, if the arrangement is viewed from above, in the plane through which the cone axes pass. While the displacement paths become longer due to the latter arrangement, in return the latter arrangement allows a more sensitive setting and the application of greater forces.

Figure 19:
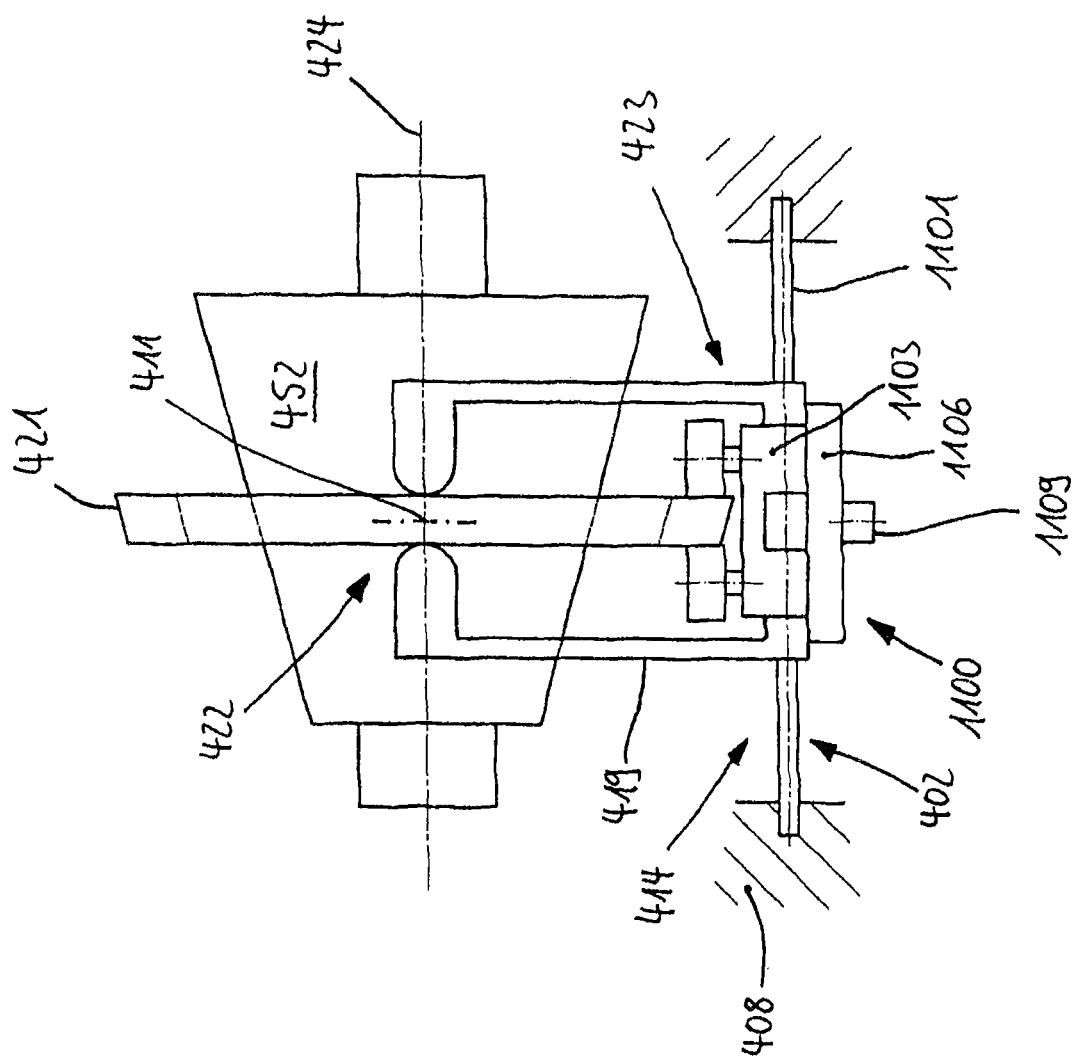
FIG. 19 schematically, a top view of a cage having a motion link arrangement of a friction-ring transmission.
Figure 29:
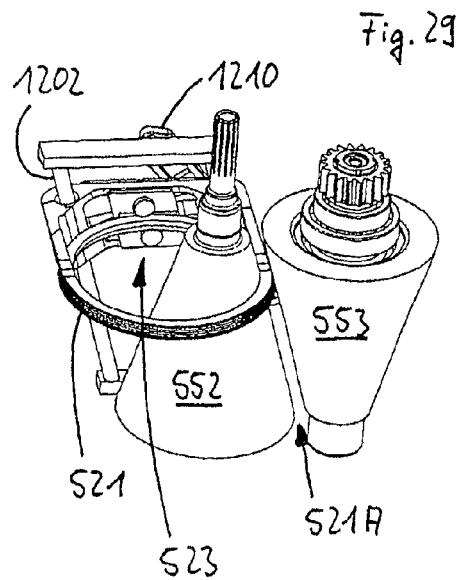
FIG. 29 schematically, a side view of the concrete exemplary embodiment according to FIGS. 21 to 28, with friction cones, from another perspective.
Figure 31:
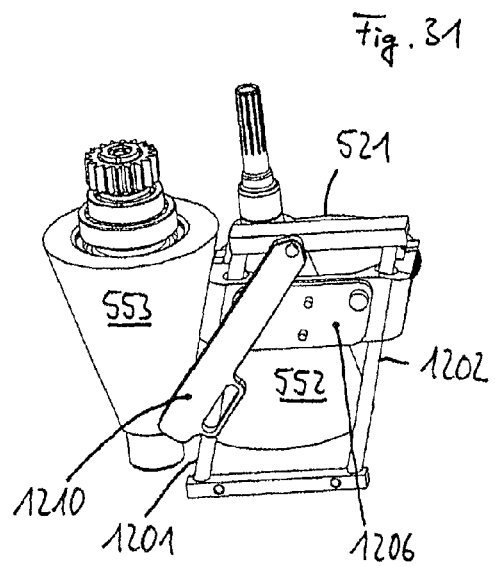
Figure 30:
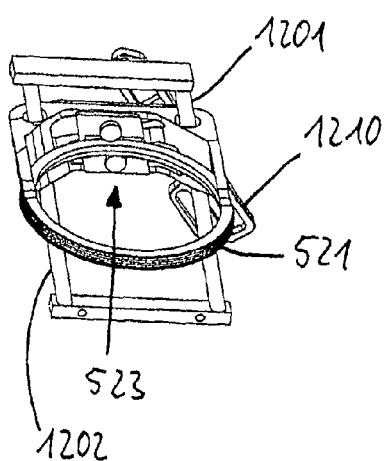
FIG. 30 schematically, the concrete exemplary embodiment from FIG. 29, without friction cones, FIG. 31 schematically, a top view of the concrete exemplary embodiment according to FIGS. 21 to 30, without friction cones, from the other perspective.
Figure 32:
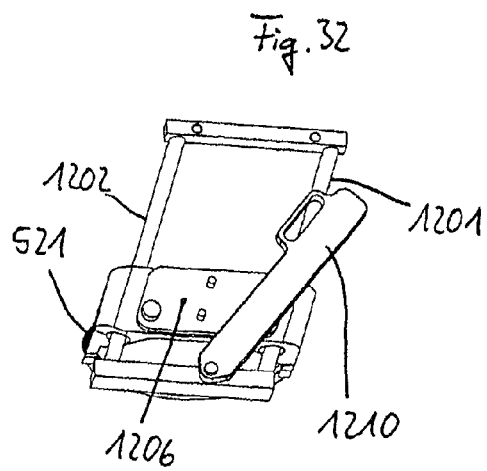
FIG. 32 schematically, the concrete exemplary embodiment from FIG. 31 without friction cones, from the other perspective.

The conical friction-ring transmission shown in FIGS. 19 and 20 has a friction ring 421 and two conical friction wheels 452, 453 (here, only conical friction wheel 452 is shown), in which the friction ring 421 is articulated on by way of an adjustment bridge 419, which supports the friction ring 421 at a first bearing point 422 and at a second bearing point 423. The friction ring rotates about the axis of rotation 411 during adjustment.

In the case of this exemplary embodiment, the second bearing point 423 is an adjustable bearing point, so that the adjustable bearing point 423 is adjustable relative to the first bearing point 422, for one thing, and relative to the adjustment bridge 419, for another. For an adjustment, in this exemplary embodiment the adjustment bridge 419 is guided by means of a motion link arrangement 1100 on a cage 402, which has an axial guide device 414 consisting of a first cylindrical guide axle 1101 and a second cylindrical guide axle 1102. Both the first cylindrical guide axle 1101 and the second cylindrical guide axle 1102 of the cage 402 are attached in a friction-ring transmission housing 408.

The motion link arrangement 1100 essentially consists of a motion link 1103, which has a first motion link groove 1104 and a second motion link groove 1105, of a motion link plate 1106 having a first motion link block 1107 and a second motion link block 1108, and of a ring follower 1109.

In order to guide the ring follower 1109 of the motion link arrangement 1100, a setting lever 1110 is mounted on the friction-ring transmission housing 408 so as to rotate, by means of a guide pin 1111, so that the entire ring follower accommodation 1110 is attached so that it can pivot about the guide pin 1111, in accordance with the double arrow 1112. The ring follower accommodation 1110 has a ring follower guide groove 1113, in which the ring follower 1109 can be moved along a longitudinal axis 1114 of the setting lever 1110.

In the normal operating state, the ring follower 1109 is disposed centered on a zero axis 1115. If the setting lever 1110 is moved about the guide pin 1111 in one of the two directions of the double arrow 1112, the ring follower 1109 is deflected out, proceeding from the zero axis 1115, to the left or to the right of the zero axis 1115. This results in a displacement of the adjustable bearing point 423, and therefore in tilting of the friction ring, which thereby begins to migrate and moves the ring follower 1109 back to the zero axis 1115 again. Since the ring follower 1109 is therefore constantly striving to remain centered on the zero axis 1115, the ring follower 1109 migrates along the longitudinal axis 1114 within the guide groove 1113 of the setting lever 1110 until the ring follower 1109 has arrived back in the center, in other words in a zero position 1116 on the zero axis 1115. The zero position 1116, in each instance, is defined by the intersection of the center longitudinal axis 1114 of the setting lever 1110 and the zero axis 1115.

Because the ring follower 1109 moves automatically along the center longitudinal axis 1114 of the setting lever 1110, as a function of the position of the setting lever 1110, particularly reliable, simple, and fast-reacting adjustment of the friction ring 422 with regard to the conical friction wheels 452, 453 is possible. The present zero axis 1115 preferably runs essentially parallel to the gap between the two conical friction wheels 452, 453.

In the case of the present arrangement, the friction ring 421 represents a means for deflecting in the displaceable bearing point 423. The in-deflection means, in other words the friction ring, deflects the ring follower 1109 and therefore also the displaceable bearing point 423, in total, back into a zero position 1116 on the zero axis 1115. It is understood that several different zero positions exist along the zero axis 1115, depending on the position of the setting lever 1110.

A first roller 1117 and a second roller 1118, respectively, are attached to the motion link blocks 1107 and 1008, by means of suitable devices, to guide the friction ring 421.

In FIGS. 21 to 32, a concrete exemplary embodiment of the configuration according to FIGS. 19 and 20 is shown in different perspectives. In this connection, the figure pairs 21 and 22, 23 and 24, 25 and 26, 27 and 28, 29 and 30, as well as 31 and 32, show the exemplary embodiment with conical friction wheels 552, 553, in one instance, and without the conical friction wheels 552, 553, in the other instance. A gap 521A is 86 provided between the conical friction wheels, which gap is bridged by a friction ring 521. The friction ring 521 is guided in first bearing points 522 (numbered only as an example here) that are fixed in place with regard to the adjustment bridge 519, and in a bearing point 523 displaceable with regard to the adjustment bridge 519. As is directly evident, the bearing point 523 is adjustable not only with regard to the adjustment bridge but also with regard to the other two bearing points 522. The other two bearing points 522 are preferably disposed centrally, in other words in the axis of rotation of the friction ring 521, which remains as a degree of freedom by means of the gap 521A between the two conical friction wheels 552, 553, and makes the setting angle for migration of the friction ring 521 possible, in each instance. One of the two bearing points 522 is situated in the gap 521A between the two conical friction wheels 552 and 553. In this way, the adjustment bridge 519 can be axially displaced with regard to the exact ring position, and follow the friction ring 521 in precise axial manner. A corresponding central bearing point can also be provided in the gap 521A, whereby the bearing points can also be provided at another circumference position on the friction ring 521.

The displaceable bearing point 523 is mounted on the adjustment bridge 519 by way of motion link blocks (not visible here) in the case of this exemplary embodiment, which blocks allow an axial displacement of the displaceable bearing point 523 along the gap 521A, with regard to the friction ring path, and a displacement perpendicular to the displacement path of the adjustment bridge 519. In this way, an axial adjustment of the adjustable bearing point 523 can be brought about by way of a setting lever 1210. If the setting lever 1210 is mounted eccentrically with regard to the path of the entire adjustment bridge 519, its position can be utilized as a measure for the position of the friction ring 521. If the setting lever 1210 is set into a certain position, this results in an adjustment of the displaceable bearing point 523, and the friction ring 521 migrates in the direction of the position predetermined by the setting of the setting lever 1210. The more it approaches this position, the more the ring follower 1211, which is guided in a guide groove 1213 of the setting lever 1210, approaches its rest or neutral position for the motion link, which it reaches precisely in the reference position of the friction ring 521, so that the latter comes to rest.

In this regard, an arrangement is made available in this manner, as an example, in which the setting angle of the friction ring 521 can be adjusted by way of a setting device, whereby the setting device, for example the setting lever 1210, is set in a different manner, in each instance, with regard to a setting angle zero position of the friction ring 521, in which the friction ring 521 maintains its axial position with regard to its setting path, in each instance. If the setting device is therefore adjusted when the friction ring 521 is in a setting angle zero position, the friction ring 521 is set by a corresponding angle. It then migrates so long, in accordance with its setting, until it reaches a setting angle zero position or zero position on the zero axis again, specifically in a different axial position, namely in the axial position that corresponds to the set position of the setting device.

Figure 33:
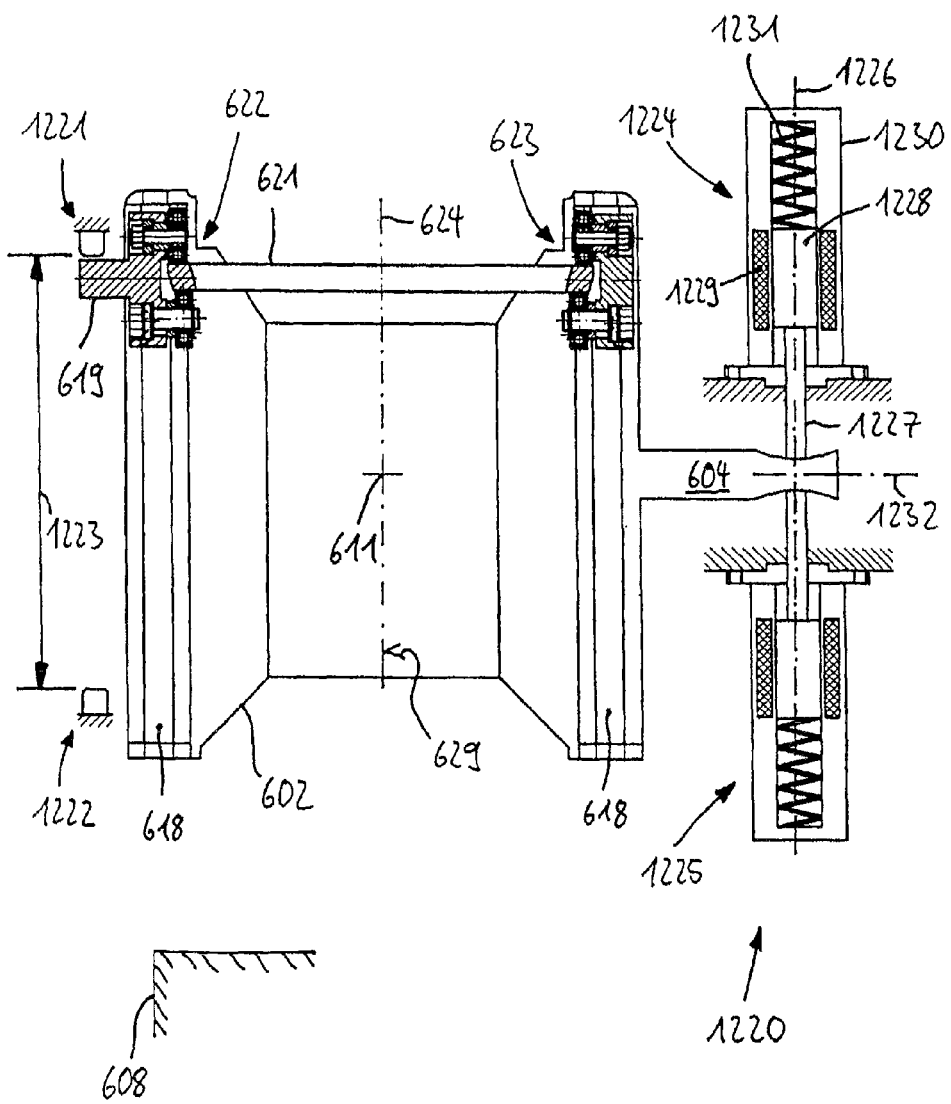
FIG. 33 schematically, a top view of a cage having a linear motor drive and a cage axis of rotation disposed centrally with regard to the cage.

The cage 602 of another exemplary embodiment, shown in FIG. 33, is mounted so it can be set on, in a friction-ring transmission housing 608, about an axis of rotation 611, by means of a linear drive 1220. The cage 602 has two guide axles 618, on which an adjustment bridge 619 is mounted between a first end stop 1221 and a second end stop 1222, to be displaceable by an adjustment path 1223. A friction ring 621 is provided on the adjustment bridge 619, which is mounted on the adjustment bridge 619 by means of a first roll holder 622 and by means of a second roll holder 623.

In this exemplary embodiment, the axis of rotation 611 of the cage 602 lies within the region of the displacement path 1223, for one thing, and in the plane that is formed by a surface 629 that the roller body axes 624 are forming.

The linear drive 1220 has a first solenoid 1224 and a second solenoid 1225. In this exemplary embodiment, the two solenoids 1224 and 1225 have the same structure. For this reason, the structure and the function of the solenoids 1224 and 1225 will be explained merely using the first solenoid 1224. Both solenoids 1224, 1225 are attached to the friction-ring transmission housing 608 and lie opposite one another on an adjustment axis 1226, in such a manner that an adjustment piston 1227 of the first solenoid 1224 as well as of the second solenoid 1225, in each instance, corresponds with a bearing device 604 of the cage 602. In order to displace the adjustment piston 1227 along the adjustment axis 1226, each of the solenoids 1224, 1225 has a metal core 1228 at one end of the adjustment piston 1227, which is surrounded by a magnet coil 1229, which is accommodated in a solenoid housing 1230. To move the adjustment piston 1227, the magnet coil 1229 is controlled in pulse/pause operation, thereby making it possible to set, i.e. control the cage 602 in particularly precise manner. The solenoids 1224 and 1225 each have a spring element 1231, which permanently presses the adjustment piston 1227 of a solenoid 1224 in the direction of the bearing device 604. Since the two solenoids 1224, 1225 lie opposite one another on a common adjustment axis 1226, the spring forces of the spring elements 1231 of the individual solenoids 1224, 1225 cancel one another out, thereby keeping the bearing device 604 of the cage 602 in equilibrium with regard to the center position 1232.

The provision of two solenoids 1224, 1225 has the advantage that there is a redundancy with regard to the linear drive 1220 used, so that the operational reliability of the linear drive 1220 is guaranteed even if one of the solenoids 1224, 1225 were to fail.

Figure 34:
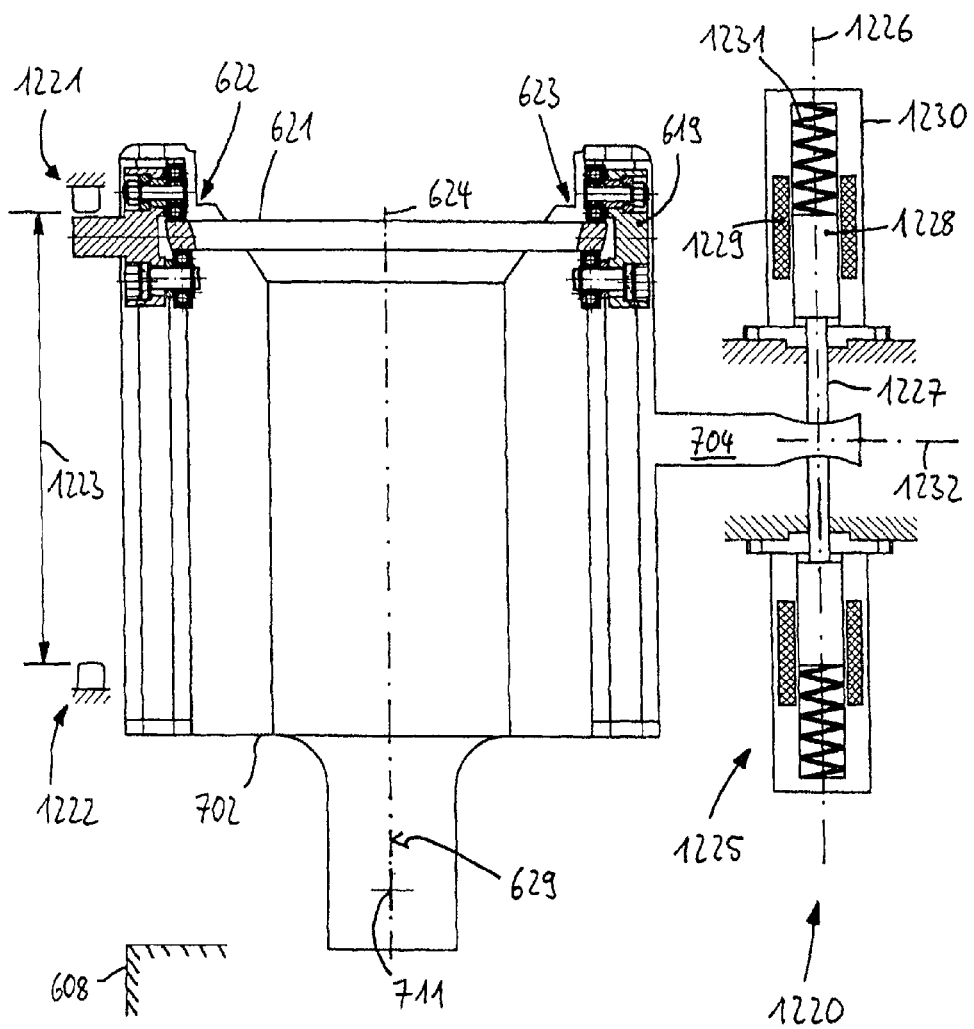
FIG. 34 schematically, a top view of a cage having a linear motor drive and an axis of rotation disposed outside of the guide axle of the cage with regard to the cage.
Figure 35:
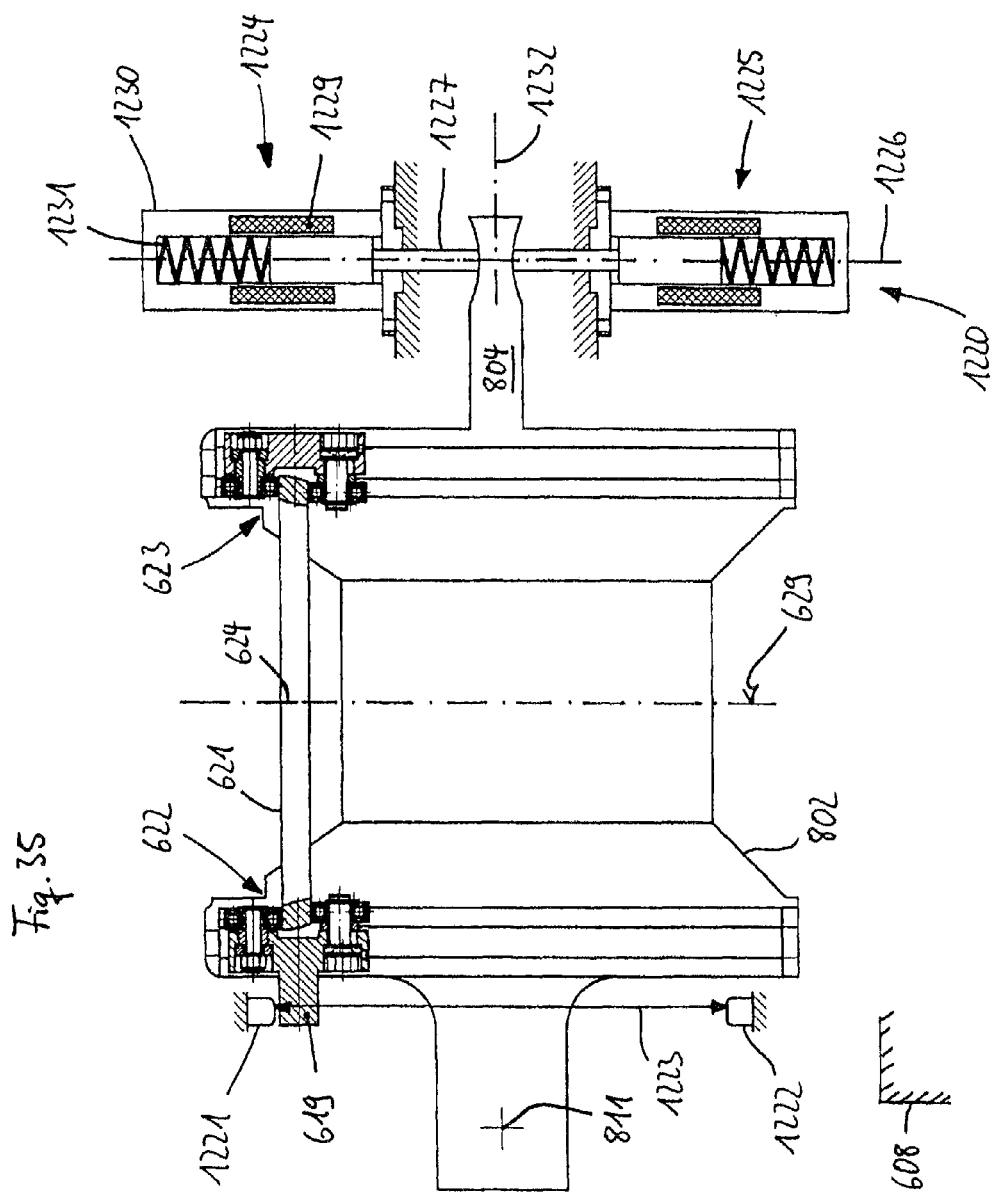
FIG. 35 schematically, a top view of another cage having a linear motor and a cage axis of rotation disposed outside of the basic body of the cage.

The exemplary embodiments according to FIGS. 34 and 35 have essentially the same structure as the exemplary embodiment from FIG. 33, so that modules that are and/or act the same have identical numbering. The exemplary embodiments according to FIGS. 34 and 35 differ only in the structure of the cage 702 and 802, respectively, in each instance.

In the case of the cage 702 according to FIG. 34, the axis of rotation 711 of the cage 702 lies outside of the region of the adjustment path 1223 of the adjustment bridge 619, but within the plane that is determined by the surface 629. Thus, in the case of the exemplary embodiments according to FIGS. 33 and 34, the axes of rotation also lie in a region covered by the cones and the cone shafts, in each instance, as was already explained in connection with the exemplary embodiments according to FIGS. 13 to 32. Because the position of the axis of rotation 711 is disposed outside of the adjustment path 1223, as compared with the position of the axis of rotation 611, in the case of the exemplary embodiment according to FIG. 34, the lever dimensions that occur between the axis of rotation 711 and the adjustment axis 1226 are different in the case of the cage 702 than between the axis of rotation 611 and the adjustment axis 1226 in the case of the cage 602.

The same holds true with regard to the cage 802 from FIG. 35, since it is true that the axis of rotation 811 of the cage 802 is disposed between the first end stop 1221 and the second end stop 1222, therefore in the region of the adjustment path 1223. However, the axis of rotation 811 is disposed offset to the plane of the surface 629 and outside of a region taken up by the cones and the cone shafts, so that different lever dimensions occur between the axis of rotation 811 and the adjustment axis 1226, thereby causing the sensitivity of the settability, i.e. adjustability of the friction ring 621 to be selected in a different way again.

The adjustment bridge can run up against the end stops 1221 and 1222 if the drive for the cage fails. These stops ensure that the adjustment bridge is tilted into a neutral position and does not migrate further. In this manner, complete destruction of the transmission can be counteracted in these cases, and a motor vehicle having this transmission can continue to be moved forward.

Figure 36:
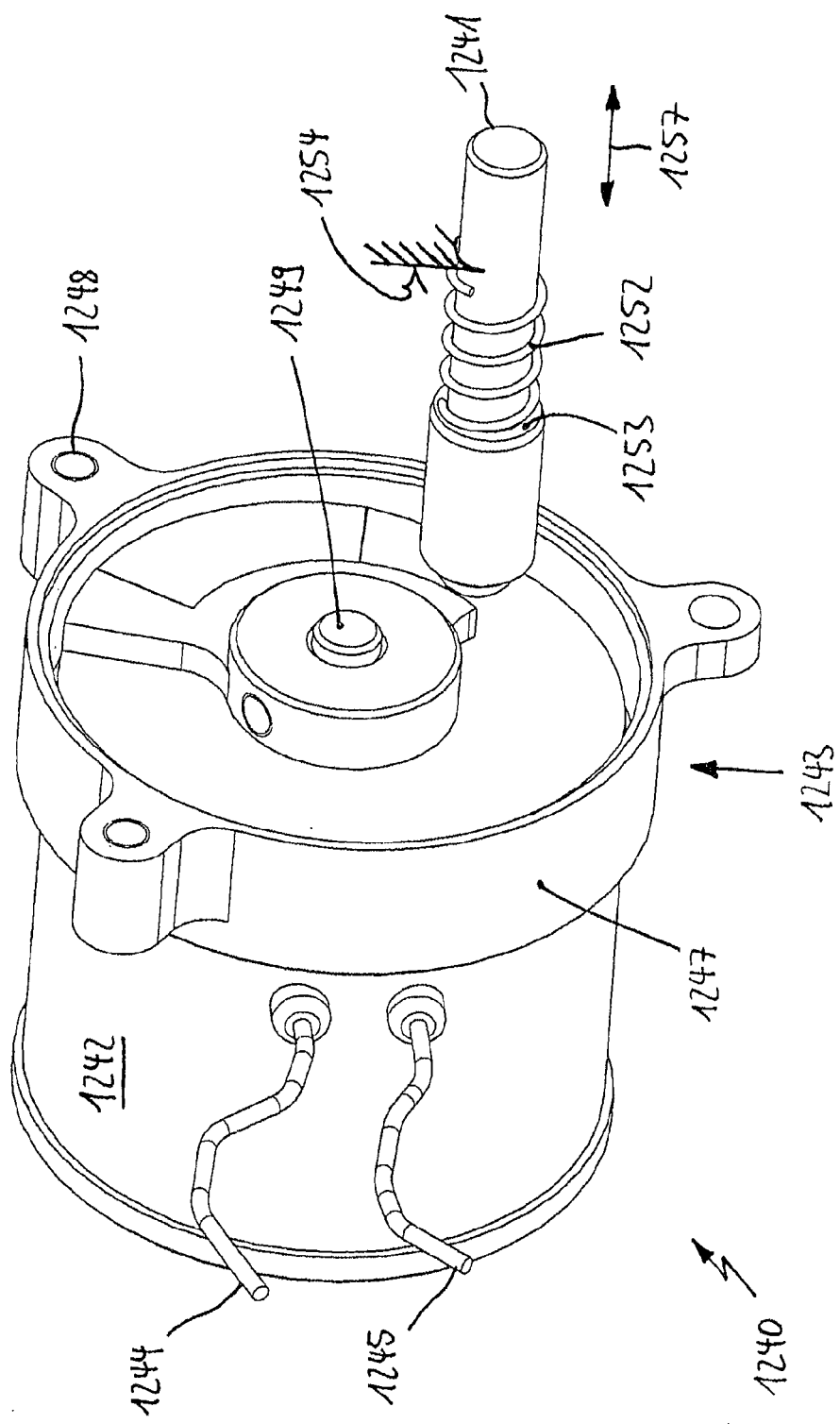
FIG. 36 schematically, a perspective side view of a drive of an adjustable end stop.
Figure 37:
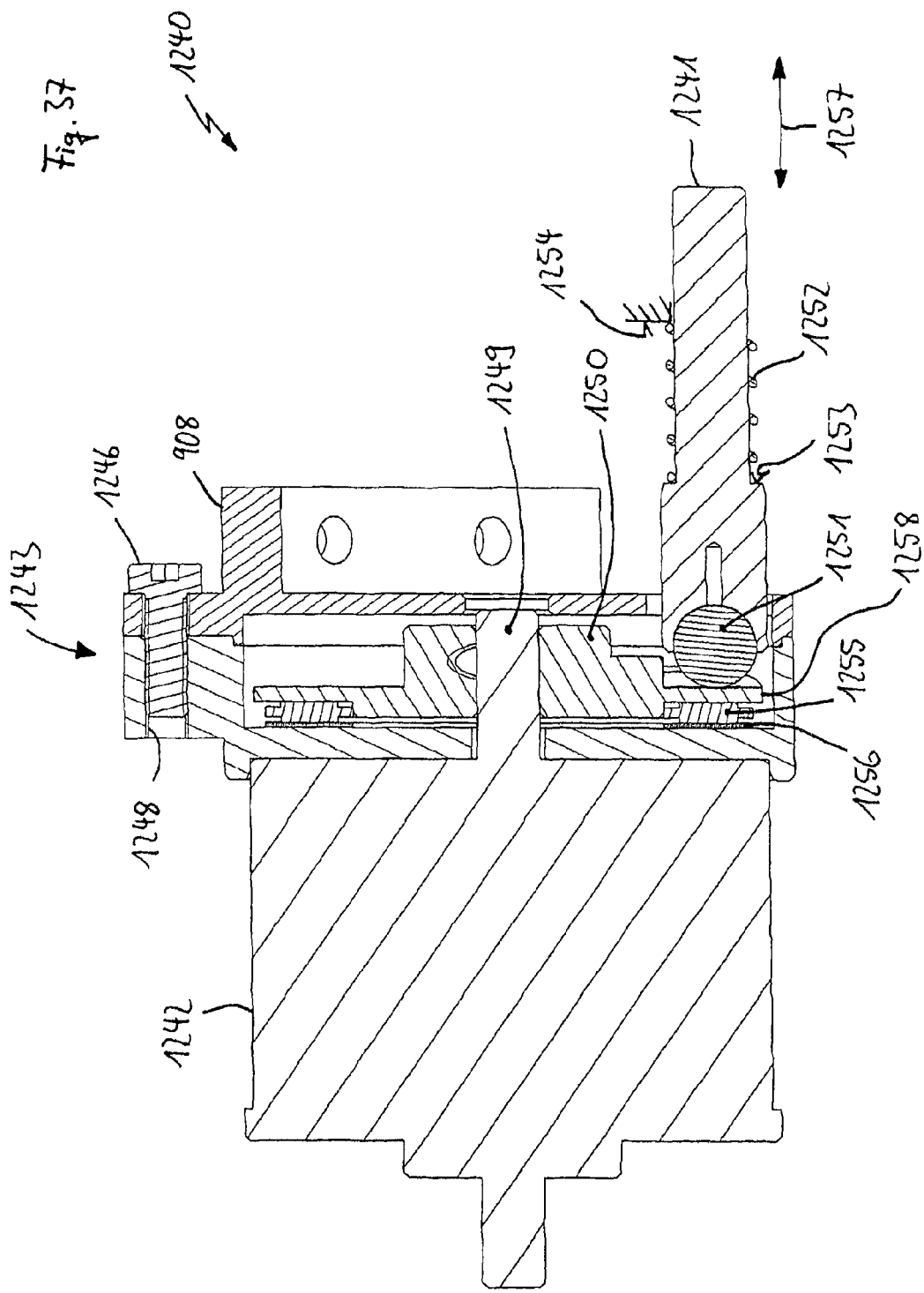
FIG. 37 schematically, a longitudinal section through the drive of the adjustable end stop from FIG. 36, in a first position.
Figure 38:
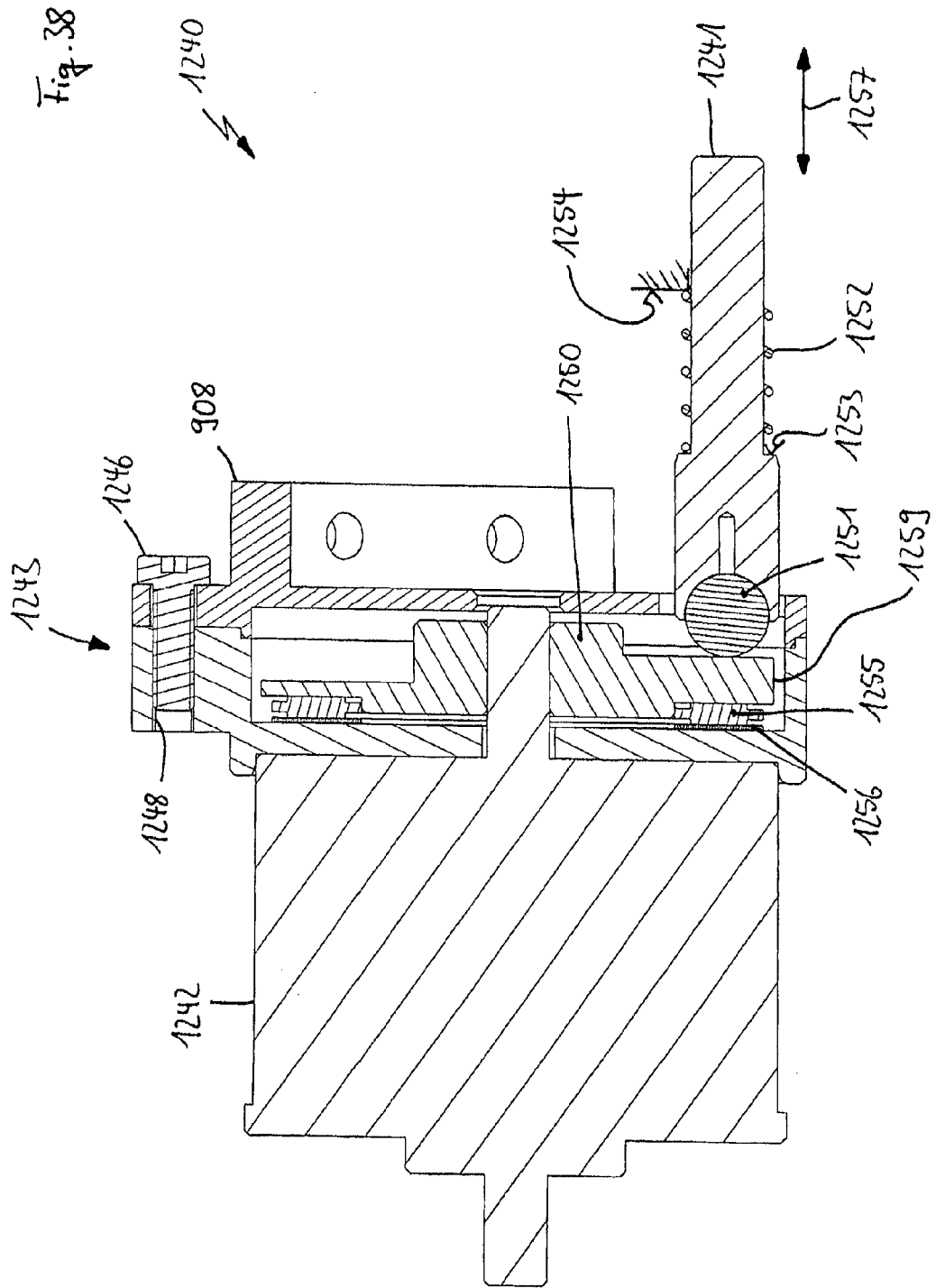
FIG. 38 schematically, a longitudinal section through the drive of the adjustable end stop from FIG. 36, in a second position.

The adjustable end stop 1240 shown in FIGS. 36 to 38 has a displaceable end stop bolt 1241 and forms a preferred adjustment path limitation for a friction-ring transmission having alternating directions of rotation. The adjustable end stop 1240 furthermore consists essentially of a rotary magnet 1242 and an adjustment mechanism 1243. The rotary magnet 1242 is supplied with electricity by way of two electrical cables 1244 and 1245, and can therefore drive the adjustment mechanism 1243.

The adjustable end stop 1240 is flanged onto a friction-ring transmission housing 908 by means of screw connections 1246 (numbered only as examples here). For this purpose, the adjustment mechanism 1243 has a corresponding adjustment mechanism housing 1247 having corresponding threaded bushings 1248. In this exemplary embodiment, the adjustment mechanism housing 1247 comprises a total of three threaded bushings 1248 (numbered only as examples here).

The rotary magnet 1242 is connected with a setting disk 1250 of the adjustment mechanism 1243 by way of a rotary magnet shaft 1249. The rotary magnet shaft 1249 and the setting disk 1250 form a shaft/hub connection in the case of this exemplary embodiment. A bearing ball 1251 is provided between the setting disk 1250 and the end stop bolt 1241. Forces between the end stop bolt 1241 and the setting disk 1250 are transferred without problems by way of this bearing ball 1251, for one thing, and for another thing, the setting disk 1250 is mounted with regard to the end stop bolt 1241, in relatively simple manner, in terms of design. So that the end stop bolt 1241 is always pressed against the setting disk 1250 by way of the bearing ball 1251, and thereby clearly positioned with regard to the setting disk 1250, a pressure spring 1252 surrounds the end stop bolt 1241. So that the pressure spring 1252 can apply a sufficiently large pressure force, the pressure spring 1252 is wedged between a step 1253 of the end stop bolt 1241 and a housing stop 1254.

In order to transfer the forces that act on the end stop bolt 1241 and the setting disk 1250, respectively, to the adjustment mechanism housing 1247, a bearing disk 1255 is provided between the setting disk 1250 and the adjustment mechanism housing 1247, which disk brings about a slide bearing 1256 between the setting disk 1250 and the adjustment mechanism housing 1247.

The setting disk 1250 has different thickness in the region of its outer radius, so that the displaceable end stop bolt 1241 of the adjustable end stop 1240 can be displaced in particularly simple manner, in terms of construction, in accordance with the double arrow direction 1257. Thus, the setting disk 1250 makes an initial thickness 1258 (see FIG. 37) available in the region of the displaceable end stop bolt 1241, while it makes a final thickness 1259 (see FIG. 38) available in the region of the displaceable end stop bolt 1241 available in another position.

The present adjustable end stop 1240 can be provided, for one thing, in order to have an adjustment bridge or a friction ring run up against it in an emergency situation or in borderline situations. In the case of a suitable arrangement of the adjustable end stop 1240, this has the result that a friction ring that runs up against the end of an adjustment path straightens out and remains in this position, without being destroyed. This method of function, however, depends on the direction of rotation of the friction ring, so that the adjustable end stop 1240 must be set differently, depending on the direction of rotation of the friction ring. For this reason, it is advantageous if the rotary magnet 1242 is activated in accordance with the required end position of the end stop bolt 1241, depending on the direction of rotation of the friction ring. At this point, it should be noted once again that in addition to the exemplary embodiment having a proposed rotary magnet 1242, a purely mechanical solution can also be provided, by way of a direction-dependent free-wheel (not shown here), whereby the free-wheel correspondingly displaces an end stop bolt 1241, as a function of the direction of rotation of the friction ring.

Figure 39:
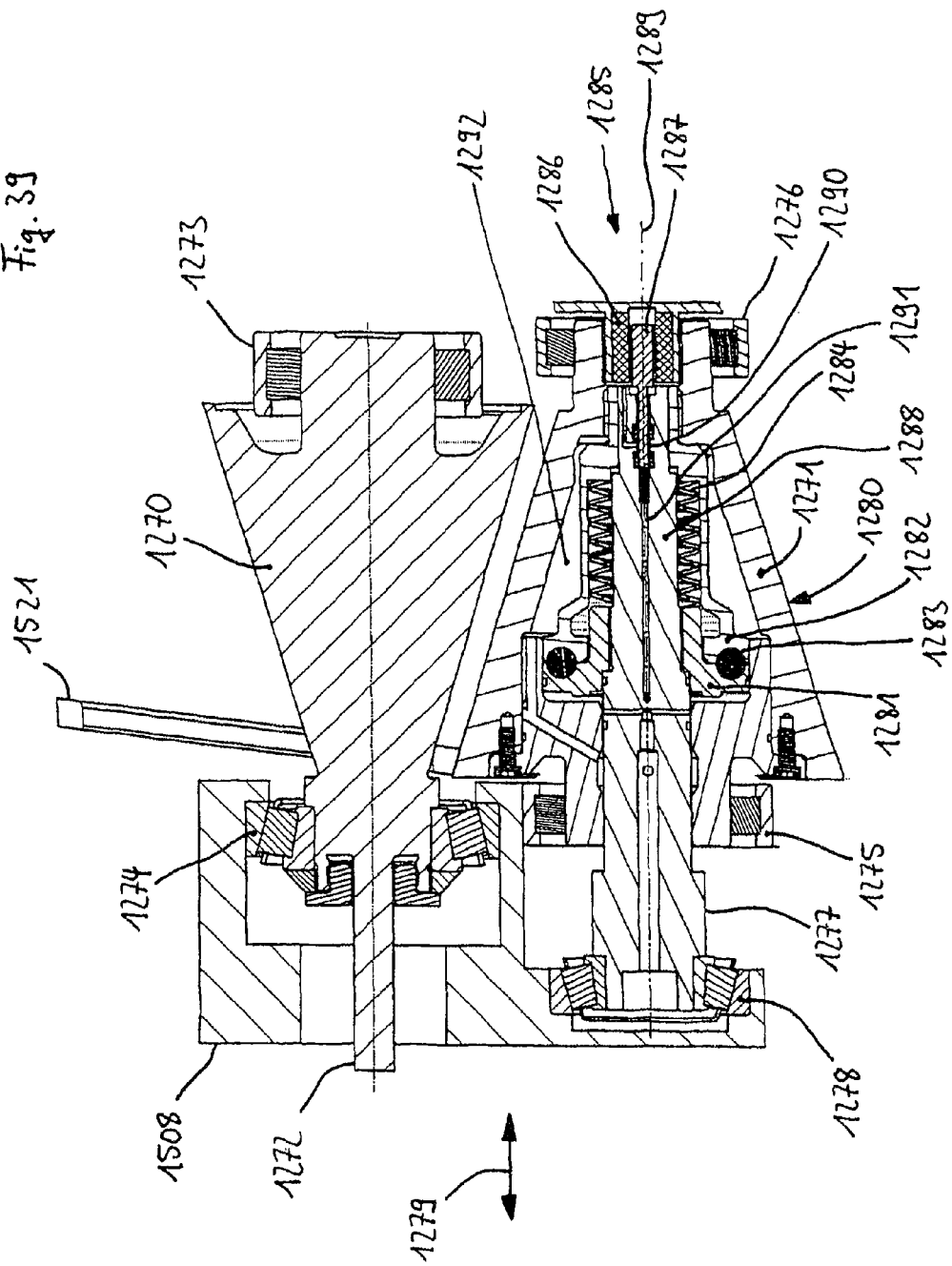
FIG. 39 schematically, a longitudinal section through two friction cones that correspond with one another.

The arrangement shown in FIG. 39 essentially consists of an input cone 1270, an output cone 1271, and a friction ring 2021. The input cone 1270 is connected to act together with a drive shaft 1272, and is mounted on a friction-ring transmission housing 2008 by means of cylindrical roller bearings 1273, for one thing, and by means of conical roller bearings 1274, for another thing. The conical roller bearings 1274 are particularly well suited for absorbing forces that act axially, in addition to forces that act radially.

In contrast, the output cone 1271 is mounted on the friction-ring transmission housing 2008 only by means of cylindrical roller bearings 1275 and 1276, respectively. The output cone 1271 is connected to act with a power take-off shaft 1277. The power take-off shaft 1277 is mounted directly on the output cone 1271, for one thing, and additionally mounted on the friction-ring transmission housing 2008 by means of conical roller bearings 1278. The input cone 1270 and the output cone 1271 are braced relative to one another by means of the bearings 1274, 1278, 1273, 1275, and 1276, in the axial direction 1279, in such a manner that necessary pressing forces are applied between the input cone 1270, the friction ring 1521, and the output cone 1271, in order to be able to transfer forces, particularly torques, between these components without problems. A pressing device 1280 is provided between the drive shaft 1277 and the output cone 1271, for bracing and for producing an additional pressing force. By means of the pressing device 1280, there is the possibility of varying a distance, in the axial direction 1279, between the output cone 1271 and the conical roller bearing 1278 on the drive shaft 1277, or, particularly in the braced state, to produce correspondingly varied pressing forces.

Varying the pressing forces between the input cone 1270, the output cone 1271, and the friction ring 1521 is advantageous, because not only the translation ratio, but also forces that act on the arrangement, particularly torques and surface pressing forces, change when the friction ring 1521 is displaced. In order to be able to advantageously adapt the pressing forces and therefore also the friction connection between the two friction cones 1270, 1271 and the friction ring 1521 to these different operating conditions, the pressing device 1280 does not act only with a constant force, but rather can be additionally adjusted. For this purpose, the pressing device 1280 comprises a first setting disk 1281 and a second setting disk 1282, between which a ball 1283 is guided on corresponding guide tracks (not explicitly shown here) of the individual setting disks 1281, 1282. The guide tracks for the balls 1283 are configured in such a manner that an increased torque brings about a rotation of the two setting disks 1281, 1282 relative to one another, which in turn leads to the result that the balls 1283 are displaced along the guide track, thereby pressing the setting disks 1281, 1282 apart from one another. In this manner, the pressing device 1280 produces a pressing force that is dependent on the output torque. In advantageous manner, the arrangement described here, as a mechanical device, has extremely short reaction times, and can particularly react very well to surges in the output-side drive train.

In addition to the method of effect of the balls 1283, the setting disks 1281, 1282 are pressed apart from one another by means of the spring arrangement 1284, and the spring arrangement 1284 makes a certain basic load of the pressing device 1280 available in the present case.

Since the characteristic line of the present pressing device 1280 can only be optimized with certain restrictions, the pressing device 1280 has force compensation, particularly for partial load regions. This takes place by means of a hydraulic pressure regulation device 1285, which has a solenoid 1286 and a magnetic piston 1287 that rotates with the drive cone 1271 in this exemplary embodiment. The solenoid 1286 is attached fixed in place in the friction-ring transmission housing 1508. The magnetic piston 1287, on the other hand, is movably mounted in an additional shaft 1288.

The additional shaft 1288 can rotate with the output cone 1271 and, in this connection, "take along" the magnetic piston 1287 of the hydraulic pressure regulation device 1285, so that the magnetic piston 1278 rotates with the output cone 1271, about the axis of rotation 1289 of the latter. For this purpose, the additional shaft 1288 has a bearing bore 1290 for the magnetic piston 1287, whereby the bearing bore 1290 makes a transition into a hydraulic oil bore 1291. The hydraulic oil bore 1291, in turn, is connected to act together with an oil chamber 1292 of the output cone 1271.

The forces that are transferred to the second setting disk 1282 by means of the spring arrangement 1284 and/or which are transferred from the first setting disk 1281 by way of the balls 1283 can be compensated by means of the hydraulic oil kept on hand in the hydraulic oil chamber 1292.

In order to now be able to perform a corresponding pressure equalization in the hydraulic oil chamber 1292, the magnetic piston 1287 is axially displaced along the axis of rotation 1289 of the output shaft 1271 by means of the solenoid 1286. Depending on how the magnetic piston 1287 is excited by the solenoid 1286 and axially displaced along the axis of rotation 1288, the volume of the bearing bore 1290 increases, causing different hydraulic oil pressures to be adjusted in this bearing bore 1290. These pressure variations are transferred to the oil chamber 1292 by way of the oil hydraulic bore 1291, so that in this way, the forces that act on the second setting disk 1282, proceeding from the hydraulic oil of the hydraulic oil chamber 1292, can be set in different ways.

The hydraulic pressure regulation device 1295 of the pressing device 1280, as described, can be built in particularly compact manner and therefore requires very little construction space. It is advantageous that it can be disposed almost completely within the output cone 1271. Only the solenoid 1286, as a component that is fixed on the housing and therefore statically attached, requires mounting on a friction-ring transmission component that does not directly belong to the output shaft 1271. It is particularly advantageous in this connection that the magnetic piston 1287 that works together with the solenoid 1286, as a dynamically moved component of the hydraulic pressure regulation device 1285, is mounted on the output cone 1271 in displaceable manner, indirectly or directly. In the present exemplary embodiment, the magnetic piston 1287 is mounted on the additional shaft 1288 of the output cone 1271, in particularly operationally reliable manner.

It is understood that a piston of a hydraulic arrangement does not necessarily have to be driven by the solenoid 1286. Instead, any other dynamic component of a pressing device, particularly a pressing device that acts in compensatory manner and/or is driven by a motor, can be correspondingly driven.

Figure 40:
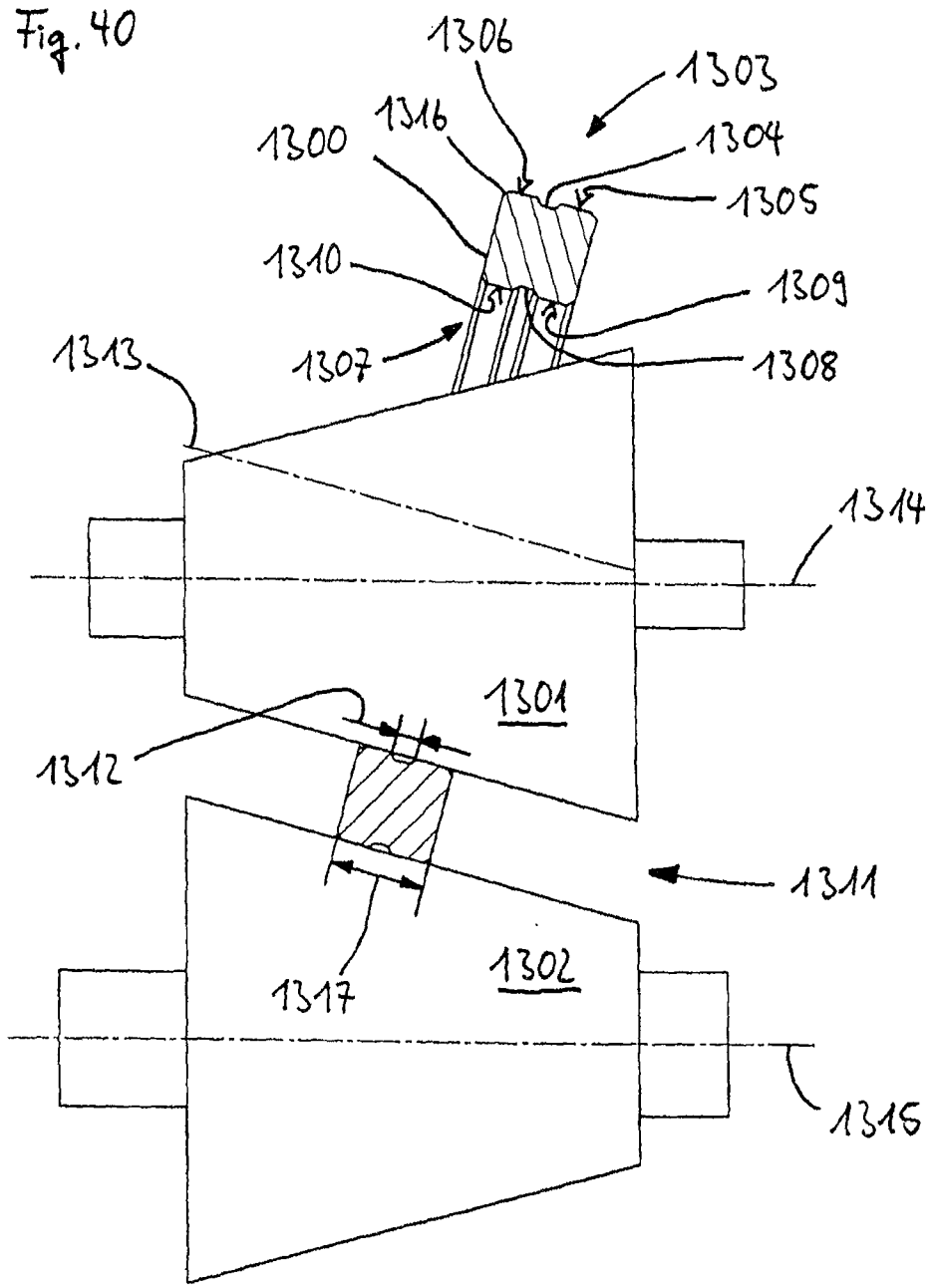
FIG. 40 schematically, a cross-section of a two-surface friction ring between two friction cones.

In accordance with the representation according to FIG. 40, a divided friction ring 1300 for a conical friction-ring transmission, having a first friction cone 1301 and a second friction cone 1302, is proposed. The divided friction ring 1300 has a gap 1304 on its outer running surface 1303, which divides the outer running surface 1303 into a first running surface half 1305 and another running surface half 1306. Furthermore, the divided friction ring 1300 has an inner gap 1308 on its inner running surface 1307, which divides the inner running surface 1307 into a first inner running surface half 1309 and a second inner running surface half 1310.

The stability of the divided friction ring 1300 with regard to tilting moments relative to a gap 1311 between the two friction cones 1301 and 1302 (with regard to rotational movements in the plane of the drawing of FIG. 40) can be improved by means of the divided outer running surface 1303 and the divided inner running surface 1307, since greater levers can be implemented by means of the divided running surfaces 1303, 1307, at the same surface pressure.

It is understood that the divided running surfaces 1303, 1307, independent of this, can also have ribbings (not explicitly shown here, for the sake of simplicity). A better fluid distribution as well as an improved adaptation of the surface pressure is achieved by means of such ribbings. It has turned out that the aforementioned effects can no longer be significantly influenced in the case of wider gaps, so that in the case of a gap width 1312 of more than 10% of the width of the first running surface half 1305 or 1309, respectively, and the second running surface half 1306 or 1310, respectively, the stabilization of the divided friction ring 1300 has a significant effect.

In this connection, the divided friction ring 1300 rotates about a friction ring axis of rotation 1313, while the first friction cone 1301 rotates about a friction cone axis 1314 and the second friction cone 1302 rotates about a friction cone axis 1315. In this connection, the divided friction ring 1300 surrounds the first friction cone 1301 and is disposed at least partly in the gap 1311 between the first friction cone 1301 and the second friction cone 1302. In accordance with the outer shape of the friction cones 1301, 1302, the friction ring axis 1313 has an angle 1316 with regard to the friction cone axes of rotation 1314 and 1315. However, it can also easily be aligned with this gap, in conical running surfaces parallel to the cone axes.

Thus, the regions of the gaps 1304, 1308 count just as little among the effective running surface 1303 or 1307, respectively, as any bevels that are made on the divided friction ring 1300 (numbered only as examples, for the sake of simplicity). The divided friction ring 1300 has a total width 1317. It is understood that such a gap can only be provided on one of the two running surfaces.

Figure 41:
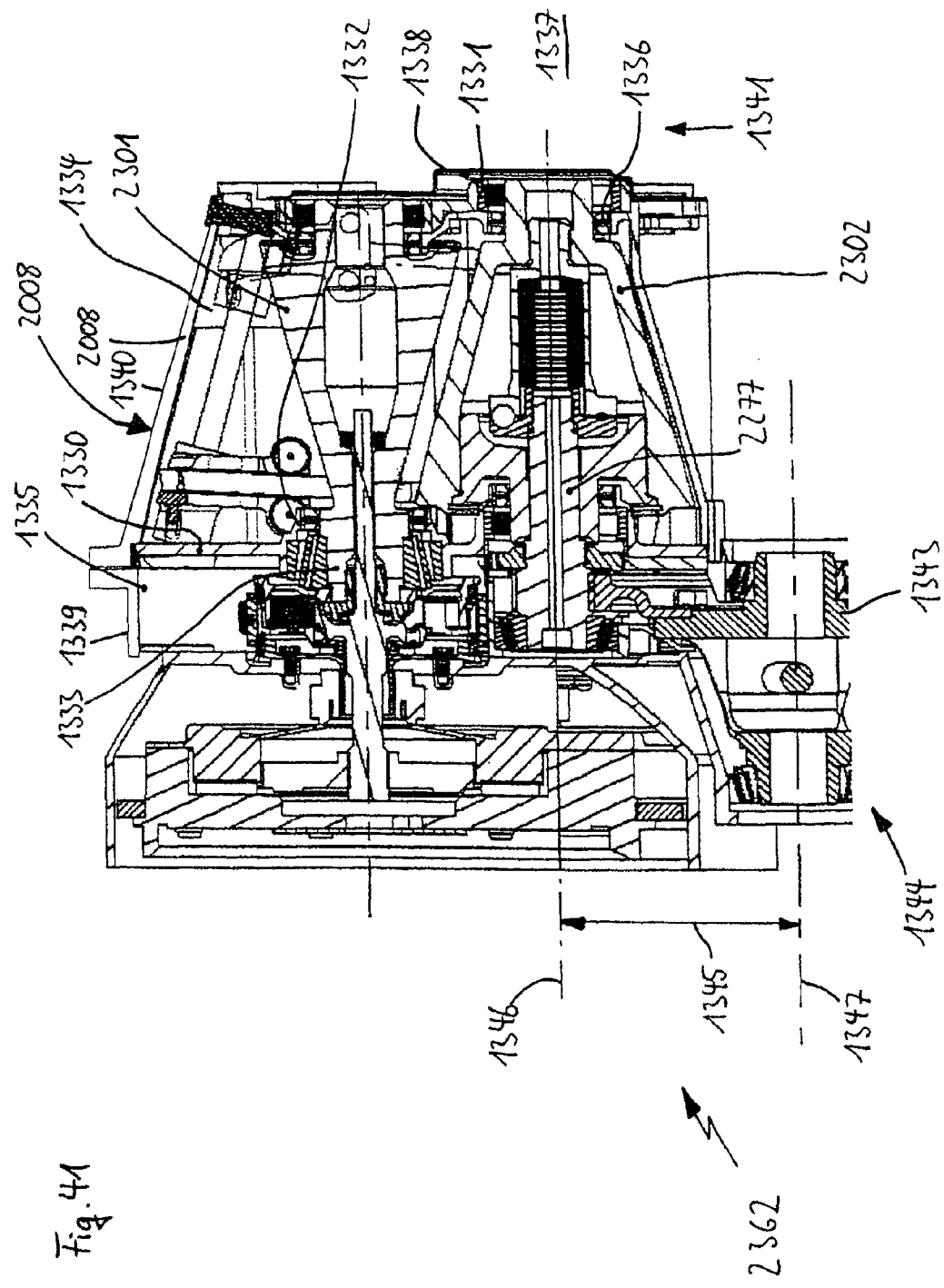
FIG. 41 schematically, a friction-ring transmission having a friction-ring transmission housing made of aluminum, and autarkic friction-cone bearing devices.
Figure 42:
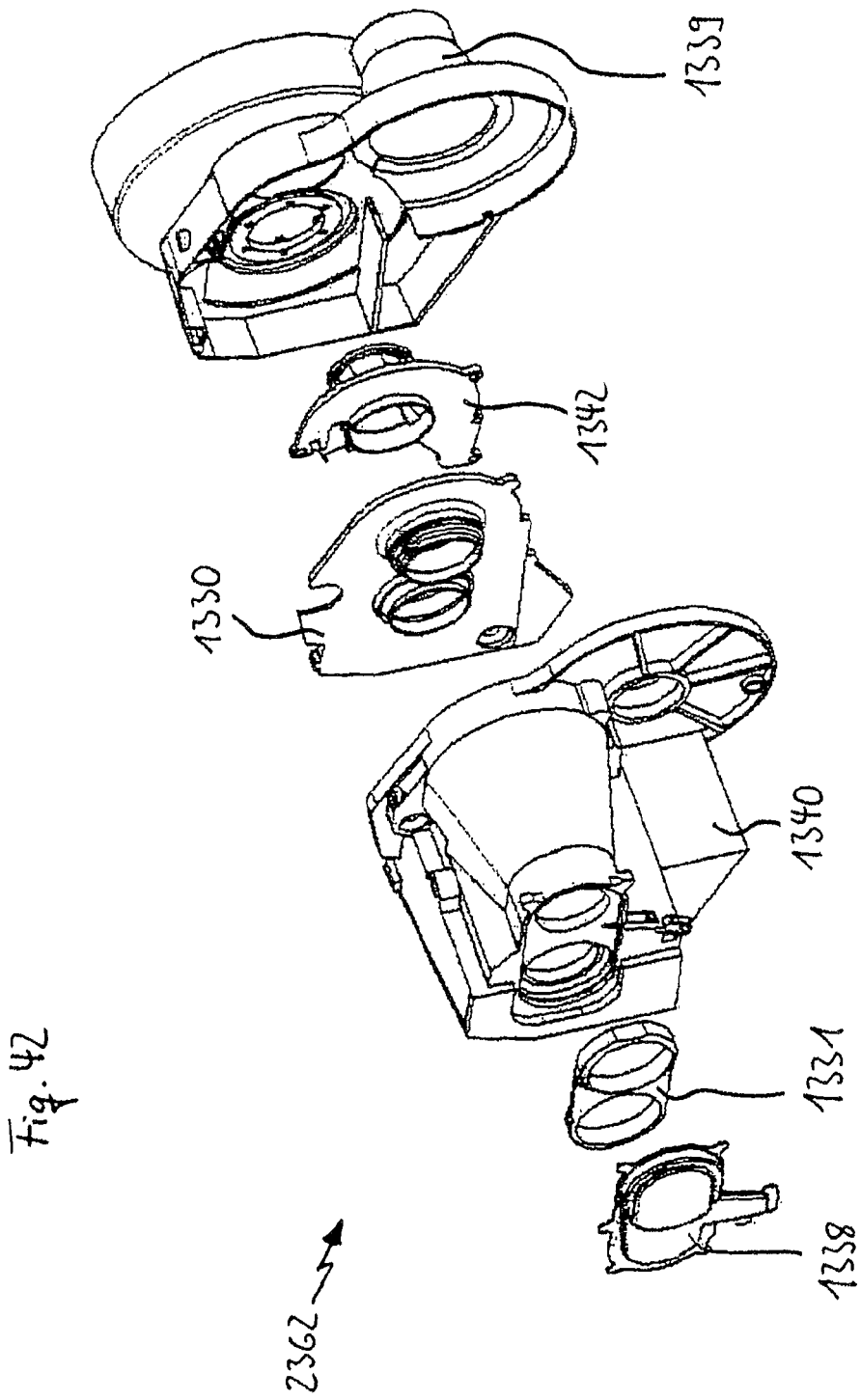
FIG. 42 schematically, a perspective side view of the friction-ring transmission housing from FIG. 41, in a first exploded representation.
Figure 43:
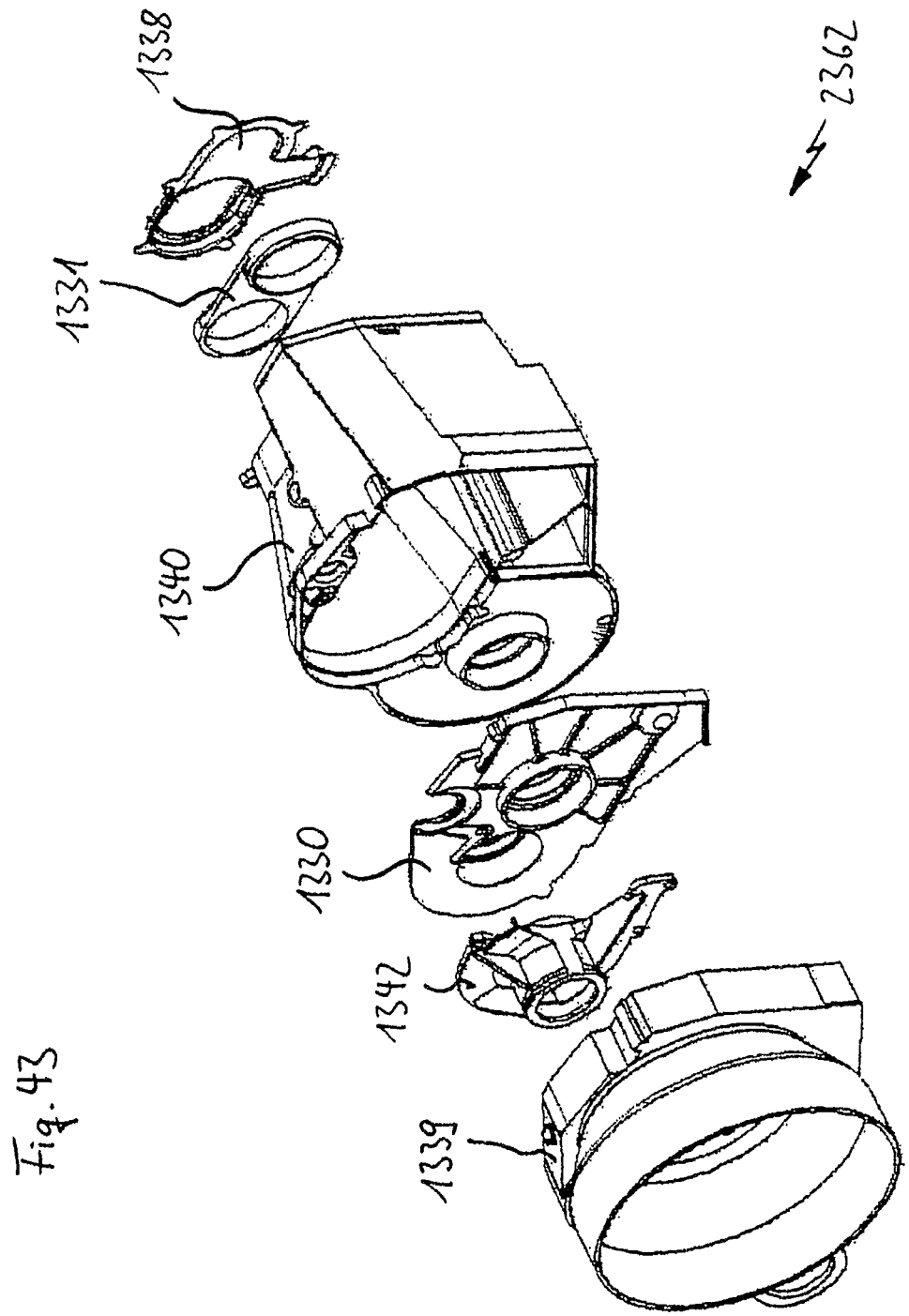
FIG. 43 schematically, a perspective side view of the friction-ring transmission housing from FIGS. 41 and 42, in another exploded representation.

The conical friction-ring transmission 2363 shown in FIGS. 41 to 43 essentially corresponds to the transmissions discussed here, in terms of its design structure. A significant difference is that the friction cones 2301, 2302 in this exemplary embodiment are mounted both in a first separate bearing collar plate 1330 made of steel and in another separate bearing collar plate 1331 made of steel. It is understood that a different, correspondingly suitable material can also be utilized for the production of the separate bearing collar plates 1330 and 1331.

Particularly on the basis of the stable bearing collar plates 1330, 1331 made of steel, it is possible that the remaining conical friction-ring housing 2008 can be made from a lighter material, such as aluminum, for example, for one thing, and for another thing, it can be produced with particularly thin walls. In this connection, the bearing collar plates 1330 and 1331 preferably absorb the complete principal forces, such as the radial and axial forces, which essentially occur due to the bracing of the two friction cones 2301 and 2302. In advantageous manner, the conical friction-ring housing 2008 as such only has to absorb secondary forces, such as moment forces of bearing collar plates 1330, 1331 that rotate relative to one another, so that it can be constructed in significantly more filigreed manner and therefore lighter, as mentioned above. This results in tremendous weight savings as compared with conventional transmissions. Fundamentally, in the present case it can be sufficient, if necessary, to mount the friction cones 2301, 2302 in a bearing collar plate only on one of their sides.

Solely on the basis of the fact that much weight is saved by means of the bearing collar plates 1330 and 1331, with regard to a transmission housing 2008, mounting of at least one side of the two friction cones 2301, 2302 in a common bearing collar plate 1330 or 1331, which is preferably formed from a material that deviates from the remaining transmission housing 2008, is advantageously also independent of the other characteristics of the present invention. Accordingly, two such bearing collar plates 1330, 1331 for one side of the friction cones 2301, 2302, in each instance, are particularly advantageous.

Preferably, a seal, particularly a shaft seal 1332 for the friction cone shaft 1333 of the friction cone 2301 mounted on the bearing collar plate 1330, can be provided directly on the bearing collar plate 1330. In this way, the bearing collar plate 1330 can act as a fluid chamber separation, in itself, so that it is possible to do without any additional sealing modules in this regard. This is particularly advantageous if chambers comprising transmission elements are supposed to be separated from one another by means of the steel bearing collar plate 1330.

In the present exemplary embodiment, for example, the bearing collar plate 1330 separates a fluid chamber 1334 filled with a traction fluid, in which the friction cones 2301, 2302 rotate, from an adjacent additional transmission chamber 1335.

In the region of the bearing collar plate 1331, a friction cone peg seal 1336 is provided on the friction-cone housing 2008. The bearing collar plate 1331 and the friction cone peg seal 1336 are shielded by a cover sheet metal 1338 with regard to the surroundings 1337.

In order to minimize the number of attachment elements for the present bearing collar plates 1330, 1331, and thereby save construction space, among other things, it is advantageous if at least one of the bearing collar plates 1330, 1331 is merely wedged in between a first housing half 1339 of the conical friction-ring transmission housing 2008 and another housing half 1340 of the conical friction-ring transmission housing 2008. In this way, production is also facilitated, since no separate attachment elements, such as screw holes and the like, have to be provided for the bearing collar plate 1330. On the other hand, it can be advantageous to implement a seal by way of a housing that surrounds a transmission element chamber, as is actually already known from the state of the art.

In connection with the bearing collar plate 1331 described above, and if transmission elements 2302 supported by the bearing collar plate 1331 can be found only on one side of the bearing collar plate 1331, it can be advantageous to dispose the bearing collar plate 1331 outside of a sealed chamber, such as the fluid chamber 1334, for example. In this manner, the bearing collar plate 1331 is easily accessible and a complicated collar plate seal is not necessary. The bearing collar plate 1331 can then be covered with the simple cover sheet metal 1338, on its side 1341 facing away from the transmission elements 2302, in cost-advantageous manner.

In order to be able to attach the bearing collar plate 1330, which has a relatively large construction, to the conical friction-ring transmission housing 2008 particularly well, the conical friction-ring transmission 2363 additionally has a bearing collar plate projection 1342. A connection between the bearing collar plate 1330 and the first housing part 1339, with accurate fit, is possible by means of the bearing collar plate projection 1342.

It is understood that the bearing collar plate 1330, in particular, can be configured in such a manner that a transmission element 1343 of a differential transmission, which is an integral part of the conical friction-ring transmission 2363, can be flanged onto it. It is advantageous if the steel bearing collar plate 1330 supports the transmission element 1343 of the differential transmission 1344, with regard to the second friction cone 2302, particularly with regard to a power take-off shaft 2277 of the second friction cone 2302, in such a stable manner that a distance 1345 of a power take-off shaft axis of rotation 1346 from a differential transmission axis of rotation 1347 changes particularly slightly or, ideally, not at all with regard to temperature and load variations. In this way, the result is achieved that the component group of power take-off shaft 2277 and transmission element 1343 of the differential transmission 1344 interact with one another with as little wear as possible and with little noise in almost all operating states.

Furthermore, forces between the differential transmission 1344 and the conical friction-ring transmission 2362, particularly between the transmission element 1343 and the power take-off shaft 2277, can be transferred in particularly advantageous manner by means of the bearing collar plate 1330, without thereby putting stress on the conical friction-ring transmission housing 2008.

As is directly evident, it is possible to connect the two bearing collar plates with one another by way of a separate rack, in a varied embodiment, for example by way of rods or by way of a connecting rod system, in order to thereby relieve the housing of stress even further.

As is shown in FIGS. 44 and 45, a reverse gear R can be implemented, in the case of a conical friction-ring transmission 3362 (FIG. 44), 4362 (FIG. 45), preferably independent of the other characteristics of the present invention, also by means of a planetary transmission 3360 or a double planetary transmission 4360. A reverse gear R can be implemented, in particular with the double planetary transmission 4360, with a small construction space and a minimal number of transmission elements, in interaction with the directions of rotation predetermined by a conical friction-ring transmission 4362, in which a torque does not have to be transferred by way of gear wheels that are standing still, as is the case with arrangements known from the state of the art.

The planetary transmission 3360 of the conical friction-ring transmission 3362 is disposed in front of an input cone 3270 of the conical friction-ring transmission 3362 on the input side. The input cone 3270 stands in active connection with an output cone 3271 of the conical friction-ring transmission 3362 by way of a friction ring 3021. The input cone 3270 rotates on an input cone axis 3363, while the output cone 3271 rotates on an output cone axis 3364. On the power take-off side, an output shaft 3365 is disposed on the output cone 3271, which shaft has an output shaft sun gear 3366.

The planetary transmission 3360 is operated by way of an input shaft sun gear 3367 of an input shaft 3368. A planetary gear 3369 stands in direct contact with the input shaft sun gear 3367. The planetary gear 3369 rotates not only about its planetary gear axis 3370, but at the same time also rotates about the input shaft axis 3363, and in this connection meshes with a ring gear 3371 of the planetary transmission 3360. By means of the ring gear 3367, which also rotates on the input shaft axis 3363, torques are transferred from the input shaft 3368 to the input cone 3270.

If a switching connecting rod system 3372 of the planetary transmission 3360 is in a neutral position N, the planetary gear 3369 rotates about the input cone axis 3363 and, in this connection, meshes with the input shaft sun gear 3367, for one thing, and with the ring gear 3371, for another thing, in such a manner that no sufficient drive forces are transferred between the input shaft 3368 and the ring gear 3371, in order to put the input cone 3270 into rotation.

If the switching connecting rod system 3372 is shifted to the R position, a crosspiece 3373 of the planetary gear 3369 is fixed in place on a conical friction-ring housing 3008, thus the planetary gear 3369 rotates about its planetary gear axis 3370, and the ring gear 3367 rotates in the opposite direction to the input sun gear 3367. Therefore, a reverse gear has been implemented.

If the switching connecting rod system 3372 is shifted from the neutral position N in the direction of the D position, the crosspiece 3373 is fixed in place on the ring gear 3371, so that the planetary gear 3369 cannot rotate about the input shaft axis 3363. Thus, the planetary gear 3369 is fixed in place relative to the ring gear 3371, so that no relative movement between the ring gear 3371 and the planetary gear 3369 is possible. In this way, a rotational movement of the input shaft sun gear 3367 is transferred to the input cone 3270, by way of the planetary gear 3369, thereby bringing about a forward gear.

In the case of the conical friction-ring transmission 4362, the input shaft 4368 is directly connected with the input cone 4270, so that a force transfer from the input shaft 4368 to the input cone 4270 takes place directly. In this exemplary embodiment, the double planetary transmission 4360 is disposed between the output cone 4271 and the output shaft 4375 on the output side.

The double planetary transmission 4360 has an output shaft sun gear 3380, which meshes with a first planetary gear 4369 having a first planetary gear axis 4370. In turn, a second planetary gear 4381, which rotates about a second planetary gear axis 4382, meshes with the first planetary gear 4369. The two planetary gears 4369 and 4381 are directly connected with the output cone 4271 by way of a planetary gear rack 4383.

Particularly in order to fix the second planetary gear 4381 in place, the double planetary transmission 4360 has a first switching connecting rod system 4384, by way of which a reverse gear can be set. By means of a second switching connecting rod system 4385, the planetary gear rack 4383 can be fixed in place relative to the power take-off shaft 4365, so that a forward gear is implemented.

If the first switching connecting rod system 4384 is shifted to the R position, the second planetary gear 4381 can no longer rotate about the second planetary gear axis 4382, so that the first planetary gear 4369 rotates about the output cone axis 4364. In this connection, the direction of rotation of the output cone 4271 reverses, so that the power take-off shaft 4365 rotates in the opposite direction.

If, on the other hand, the second switching connecting rod system 4385 is brought into the D position, so that the planetary gear rack 4383 and the power take-off shaft are rigidly connected with one another by way of a second shaft sun gear 4386, a direction of rotation of the output cone 4271 is directly transferred to the second output shaft sun gear 4386 and thereby also to the output shaft 4365, by way of the planetary gear rack 4383. In this way, a forward gear is implemented.

The cage 5002 shown in FIGS. 46 to 48 has an axial guide device 5014 having two guide axles 5018, a left one and a right one. An adjustment bridge 5019 is guided on the guide axles 5018 so as to be freely displaceable axially. A friction ring 5021, which transfers forces between two friction cones (not shown), is held with the adjustment bridge 5019, by means of a first roll holder 5022 and by means of a second roll holder 5023.

The cage 5002 is mounted on a friction-ring transmission housing (not shown here), about an axis of rotation 5011. The adjustment of the cage 5002 about the axis of rotation 5011 takes place by means of an eccentric motor 5390, which is connected to act with the cage 5002 by means of a link 5391. In this exemplary embodiment, the link 5391 is divided into two parts and consists of a link rod 5392, which is attached to the eccentric motor 5390, and of a cage link rod 5393, which is directly attached to the cage 5002, by way of a cage link rotation point 5394.

Slight setting movements of the eccentric motor 5390 are precisely transferred, by means of the link 5391, to the cage 5002, so that the latter rotates about the axis of rotation 5011, thereby setting the friction ring 5021 relative to the friction cones (not shown here), so that it moves accordingly with the adjustment bridge 5019, along the guide axles 5018, and repositions itself.

So that disruptions in the region of the eccentric motor 5390 do not block the function of the cage 5002 in such a manner that operation of the cage 5002 fails completely, an overload security device 5395 is provided in the region of the cage link rod 5393, for such emergency situations. Components of the overload security device 5395, such as a positioning ball 5396 and a positioning spring 5397, are disposed on the cage 5002, i.e. within an accommodation 5398 on the cage 5002 provided for this purpose.

The cage link rod 5393 is placed above the accommodation 5398, in such a manner that the positioning ball 5396 is pressed into a positioning ball recess 5399 by the spring force of the positioning spring 5397. In this way, the cage link rod 5393 is held and fixed in place, in a defined position with regard to the cage 5002, in the normal operating state of the cage 5002 and of the eccentric motor 5390. So that the cage link rod 5393 is not pressed away by the spring force of the positioning spring 5397, the overload security device 5395 comprises an overload security device cover 5400, which surrounds the cage 5002 in C shape in the region of the overload security device 5395. So that the overload security device cover 5400 remains securely in its original location, it is additionally attached to the cage 5002 by means of a locking screw 5401.

If an overload should occur during operation, the cage link rod 5393 can escape within the overload security device 5395, in accordance with the directions of the double arrow 5402, so that damage to the cage 5002, to the link 5391, or to the eccentric motor 5390 is prevented, at least at low overloads.

The overload security device 5395 is triggered as soon as the overload forces exceed the forces of the positioning spring 5397 as well as the friction resistances between the cage link rod 5393 and the positioning ball 5396, the cage 5002, as well as the overload security device cover 5400.

Figure 49:
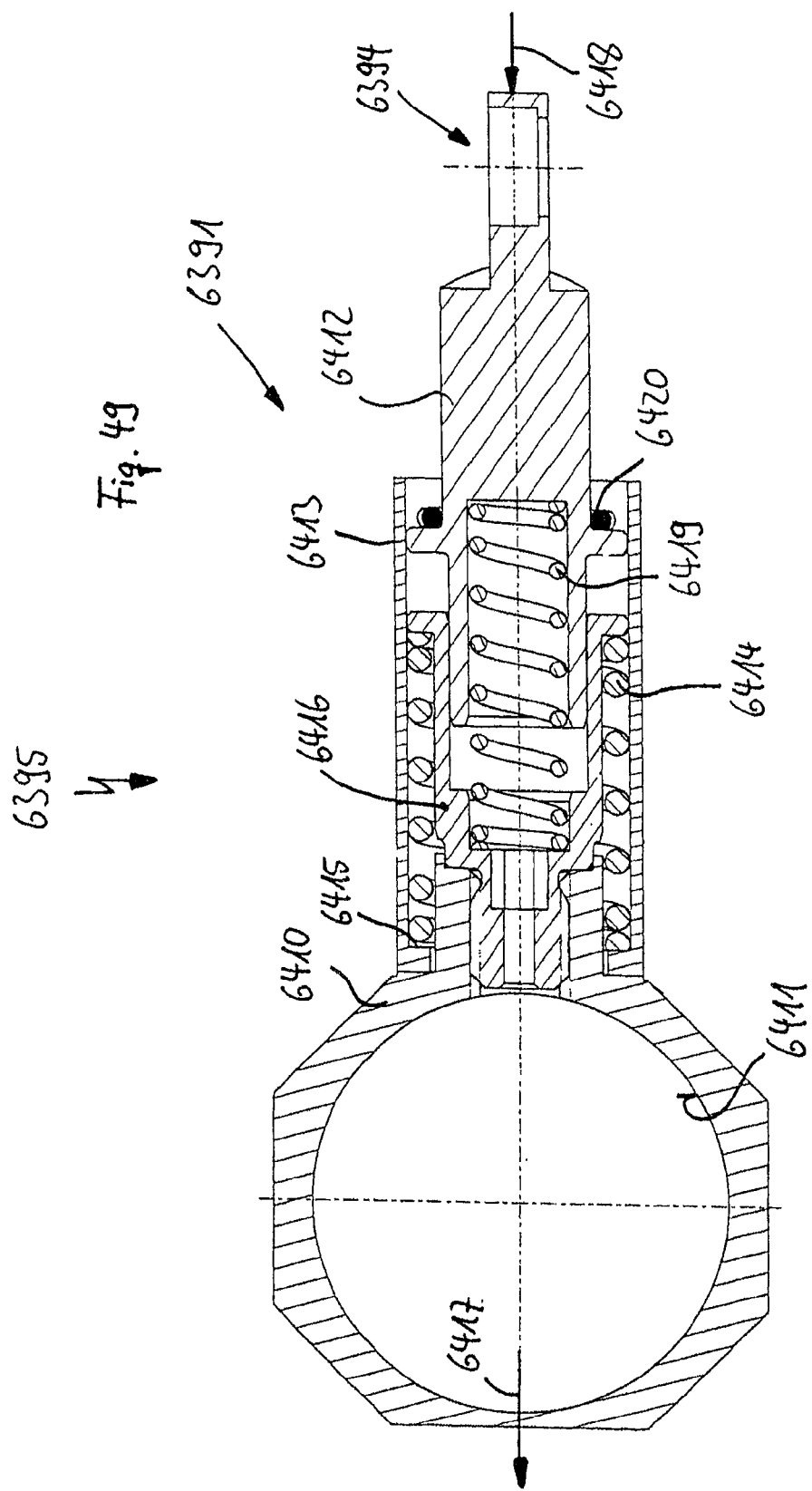
FIG. 49 schematically, a longitudinal section through an alternative overload security device in a link.
Figure 51:
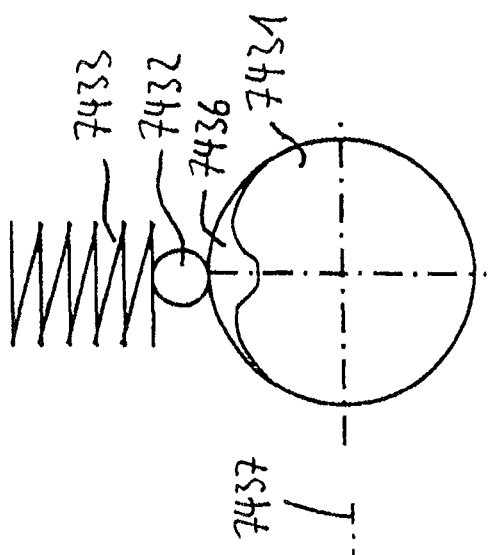
FIG. 51 schematically, the side view of the deactivated failure security device from FIG. 50 in cross-section.
Figure 50:
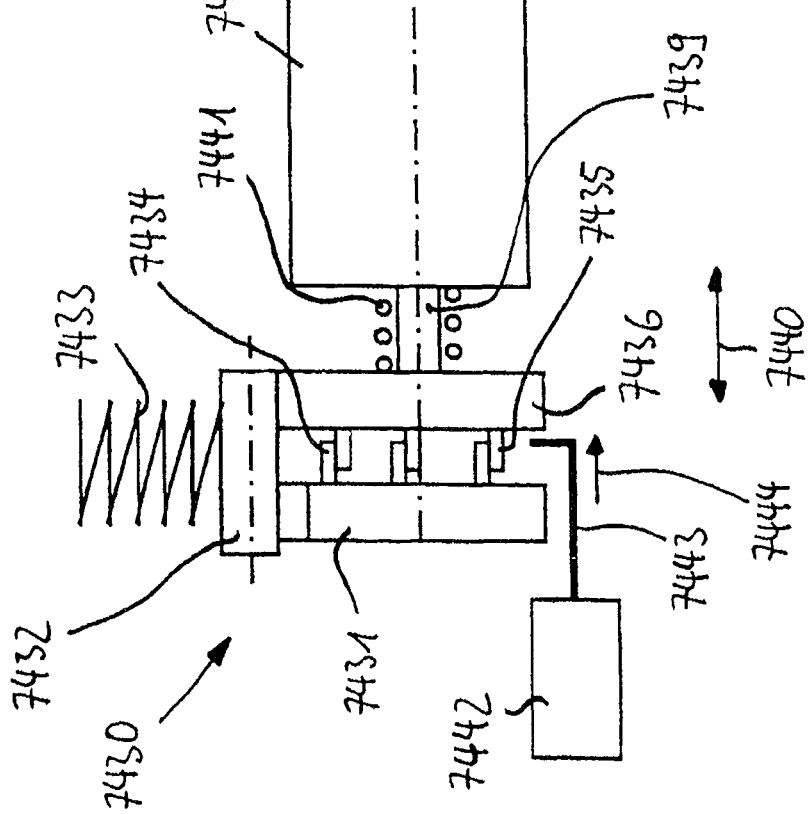
FIG. 50 schematically, a side view of a deactivated failure security device with the force flow closed.

The overload security device 6395 shown in FIG. 49 is disposed within a link 6391, so that the mechanism of the overload security device 6395 is protected against external influences particularly well by means of the link 6391. The overload security device 6395 has a tension element 6410, which is provided for the purpose of being attached directly to a guide cage (not shown here) for an adjustment bridge (not shown here), by means of a cage link rotation point 6394. Furthermore, the overload security device 6395 has a pressure element 6412, which comprises a bearing ring 6411 for coupling with an eccentric disk (not shown here) of an eccentric drive (not shown here). By means of the bearing ring 6411, the link 6391 can be securely connected with the eccentric drive. Both the tension element 6410 and the pressure element 6412 are guided in a link pipe 6413, so as to be displaceable relative to one another.

The tension element 6410 is braced within the link pipe 6413 by means of a first pressure spring 6414. In this connection, the pressure spring 6414 supports itself on a link pipe collar 6415 of the link pipe 6413, for one thing, and on a link flange 6416 that is screwed onto the tension element 6410, for another thing. Wedged in this manner, the first pressure spring 6414 is accordingly biased. Tension forces 6417, which act on the link 6391, can be compensated by the overload security device 6395, by means of the first pressure spring 6414, in that the tension element 6410 moves relative to the link pipe 6413 and the pressure element 6412, in the direction of the tension forces 6417.

In order to compensate pressure forces 6418, the overload security device 6395 has a second pressure spring 6419 between the pressure element 6412 and the tension element 6410, i.e. the link flange 6416. By means of the spring force of the second pressure spring 6419, pressure forces 6418 that lie below a critical value can be well compensated by the overload security device 6395. For this purpose, the pressure element 6412 springs into the link pipe 6413 or into the link flange 6416, respectively.

In the normal operating state, the second pressure spring 6419 presses the pressure element 6412 away from the tension element 6410, so that the pressure element 6412 lies against a locking ring 6420 that is disposed on the link pipe 6413, in the normal case. In this exemplary embodiment, the locking ring 6420 makes a planned breaking point of the overload security device 6395 available, which is destroyed in the case of an overload that exceeds a critical value.

Thus, the present overload security device 6395 has a destructible overload security means, in the locking ring 6420, for one thing, which is destroyed, in the present case, particularly in the case of overload forces that exceed a critical value. For another thing, the overload security device 6395 has destruction-free overload security means, in the tension element 6410 and pressure element 6412 that are spring-mounted, with which dynamically acting overload security means are implemented, which compensate overload forces that do not exceed a critical value. In this connection, the springs are selected to be so strong, in each instance, that the link 6391 becomes rigid in normal operation, and gives way only in the case of an overload, in the desired manner, as described above.

The overload security device 6395 described above can be built in particularly compact manner, since it is integrated within the link 6391, whereby the link 6391, or the overload security device 6395, respectively, is disposed and acts directly between a drive and a cage in this regard.

Alternatively or cumulatively to the overload security devices shown in FIGS. 46 to 49, a failure security device 7430, as illustrated in FIGS. 50 to 53, can be provided with regard to an adjustment bridge (not shown) or a guide cage (not shown) of an adjustment bridge. Such a failure security device 7430 has, for one thing, a cam disk 7431, a cam follower 7432, and a cam follower pressing spring 7433. The cam disk 7431 of the failure security device 7430 stands in contact with second drivers 7435 of a holder disk 7436 in the normal operating state, by means of first drivers 7434 of the cam disk 7431. The holder disk 7436 is mounted on a drive shaft 7439, so as to be displaceable along a drive axis 7437 of a drive 7438, in accordance with the directions of the double arrow 7440.

The holder disk 7436 is pressed in the direction of the cam disk 7431 and fixed in place by means of a holder disk spring 7441, so that a force flow from the drive 7438 is transferred to the first drivers 7434 of the cam disk 7431 and from there to the cage, i.e. to the adjustment bridge, by way of the drive shaft 7439 and the holder disk 7436 having two drivers 7435.

In order to uncouple the holder disk 7436 from the cam disk 7431, a release device 7442 is provided, which is able, by means of a release device piston 7443, to press the holder disk 7436 away from the cam disk 7431, until the first drivers 7434 and the second drivers 7435 lose contact with one another. For uncoupling, the release device piston 7434 is simply moved in the direction 7444, so that the holder disk 7436, as shown in FIGS. 52 and 53, is completely uncoupled from the cam disk. In this connection, the holder disk 7436 has displaced itself relative to the drive shaft 7439, and moved closer to the drive 7438, so that the holder disk spring 7441 has been compressed.

Once the holder disk 7436 has been uncoupled from the cam disk 7431 by means of the release device piston 7443, the holder disk 7436 has been displaced behind the cam follower 7432, so that the cam follower 7432 is pressed into a countersunk region 7446 of the cam disk 7431 by means of the pressing force 7445 of the cam follower pressing spring 7433 (see, in particular, FIG. 53).

By means of the failure security device 7430 presented here, it is ensured that in case of a failure of the drive 7438, the free adjustment of a cage or an adjustment bridge, respectively, is guaranteed, in that the release device 7442 uncouples the cam disk 7431 from the drive 7438, and in this connection, the cam follower 7432 is pressed into the countersunk region 7446 of the cam follower 7431. In this way, the cam disk 7431 is fixed in place in an emergency position, so that the ability of a friction-ring transmission that has the failure security device 7430 to function is guaranteed. The emergency position exists if the cam disk 7431 is oriented in such a manner that the cam follower 7432 is disposed in the countersunk region 7446 of the cam disk 7431.

The spring force of the cam follower pressing spring 7433 can be designed in such a manner that a friction ring of a friction-ring transmission is able to rotate the cam disk 7431 into a final rest position, i.e. emergency position, in which the cam follower 7432 is disposed in the countersunk region 7446, as soon as the friction ring reaches a corresponding end stop (not shown here) and runs up against it. In this manner, a reliable failure security device can be easily implemented, which adjusts the friction ring in the direction of a contact position, for example, at a predetermined adjustment speed, whereby the friction ring is then stabilized in this position by means of the end stop. In the case of the method of functioning of the failure security device 7430 as described, it must be taken into consideration that as a rule, a drive only has to perform small angular movements, whereby if applicable, a suitable transmission (not shown here) can be provided between the drive and the cam disk 7431. In this regard, a height profile 7447 of a cam curve of the cam disk 7431 is sufficient to hold the cam disk 7431 in an emergency position, in most areas of application.

It is understood that the holder disk 7436 can also be provided with a cam, which is not, however, disposed in the working region of a cam disk. After a disruption has been corrected, in other words also if a release device piston of a release device has moved in again, the holder disk 7436 can be rotated by means of a drive, until a cam of the holder disk 7436 reaches the cam follower 7432. Then, a cam follower pressing spring 7441, which was pressed into a countersunk region by a cam follower until then, can be relaxed, so that a coupling between the two disks 7431 and 7436 can engage again. If the entire arrangement is then rotated back again, it is in its normal operating position once again.

REFERENCE SYMBOL LIST

1 arrangement
2 cage
3 sheet-metal construction
4 first elastic bearing device
5 second elastic bearing device
6 third elastic bearing device
7 bores
8 friction-ring transmission housing
9 narrowing in cross-section
10 setting lever
11 axis of rotation
12 setting lever accommodation sheet metal
13 double arrow
14 axial guide device
15 region curved in U shape 16 first shank of the sheet-metal construction
17 second shank of the sheet-metal construction
18 guide axle
19 adjustment bridge
20 arrow directions
21 friction ring
22 first roll holder
23 second roll holder
24 roller body axis
25 anti-rotation security device
26 anti-rotation security device peg
27 running rail
28 first surface side
29 surface
30 second surface side
101 arrangement
102 cage
104 elastic bearing device
110 setting lever
111 axis of rotation
112 setting lever accommodation sheet metal
113 double arrow
114 axial guide device
118 guide axle
119 adjustment bridge
121 friction ring
122 first roll holder
123 second roll holder
124 roller body axis
125 anti-rotation security device
126 anti-rotation security device peg
127 running rail
128 first surface side
129 surface
130 second surface side
140 rubber element
141 fixed attachment core
142 rubber element length
201 arrangement
202 cage
204 elastic bearing device
208 friction-ring transmission housing
214 axial guide device
218 guide axle
219 adjustment bridge
221 friction ring
222 first roll holder
223 second roll holder
224 roller body axis
225 anti-rotation security device
226 anti-rotation security device peg
227 running rail
228 first surface side
229 surface
230 second surface side
245 adjustment motor
246 transmission arrangement
247 opposite side
248 blade spring
248A guide bushing
248B disk spring
248C rubber element guide
248D bearing head
248E bearing rod
248F bearing pan
249 bearing for the guide rod
302 cage 308 friction-ring transmission housing
311 axis of rotation
319 adjustment bridge
321 friction ring
321A gap
322 first roll holder
323 second roll holder
329 surface
345 adjustment motor
350 first conical friction gear axis
351 second conical friction gear axis
352 first conical friction gear
353 second conical friction gear
354 first cross-head
355 second cross-head
356 first guide axle
357 second guide axle
358 peg
359 cross-drive
360 fluid clutch
361 switching unit
362 conical friction-ring transmission
363 power take-off
364 shaft
365 brake disk
366 brake pads
367 free-running gear wheel
368 auxiliary transmission
369 switching cuff
370 pinion
371 drive shaft
372 location
373 projections
374 projections
375 circumferential groove
376 flange
377 adjustment spindle
378 power take-off shaft
379 adaptation device
380 power take-off pinion
381 power take-off pinion
382 facing flange
383 radial tooth system
384 radial tooth system
385 partition
386 planetary gear
387 shaft
388 power take-off shaft
389 pinion
390 transmission power take-off shaft
391 gear wheel
392 pinion that is connected in one piece with the gear wheel
393 planetary gear wheels
394 planetary carrier
395 cylindrical projection
396 ring gear
397 longitudinal tooth system
398 multiple disk clutch
399 brake
402 cage
408 friction-ring transmission housing
411 axis of rotation
414 axial guide device
419 adjustment bridge
421 friction ring
422 first bearing point
423 second bearing point 424 roller body axis
452 first conical friction gear
519 adjustment bridge
521 friction ring
522 first bearing point
523 second bearing point
521A gap
552 first conical friction gear
553 second conical friction gear
602 cage
604 bearing device
608 friction-ring transmission housing
611 axis of rotation
618 guide axle
619 adjustment bridge
621 friction ring
622 first roll holder
623 second roll holder
624 roller body axis
629 surface
702 cage
704 bearing device
711 surface
802 cage
804 bearing device
811 axis of rotation
908 friction-ring transmission housing
1100 motion link arrangement
1101 first cylindrical guide axle
1102 second cylindrical guide axle
1103 motion link
1104 first motion link groove
1105 second motion link groove
1106 motion link plate
1107 first motion link block
1108 second motion link block
1109 ring follower
1110 setting lever
1111 guide pin
1112 double arrow
1113 guide groove
1114 center longitudinal axis of the setting lever
1115 zero axis
1116 zero position
1117 first roller
1118 second roller
1201 first cylindrical guide axle
1202 second cylindrical guide axle
1206 motion link plate
1210 setting lever
1211 guide pin
1213 guide groove
1220 linear drive
1221 first end stop
1222 second end stop
1223 adjustment path
1224 first solenoid
1225 second solenoid
1226 adjustment axis
1227 adjustment piston
1228 metal core
1229 magnet coil
1230 solenoid housing
1231 spring element
1232 center position
1240 adjustable end stop
1241 adjustable end stop bolt
1242 rotary magnet
1243 adjustment mechanism
1244 electrical cable
1245 electrical cable
1246 screw connections
1247 adjustment mechanism housing
1248 threaded bushings
1249 rotary magnet shaft
1250 setting disk
1251 bearing ball
1252 pressure spring
1253 end stop bolt step
1254 housing stop
1255 bearing disk
1256 slide bearing
1257 double directions
1258 initial thickness
1259 final thickness
1270 input cone
1271 output cone
1272 drive shaft
1273 cylindrical roller bearing of the input cone
1274 conical roller bearing of the input cone
1275 cylindrical roller bearing of the output cone
1276 cylindrical roller bearing of the output cone
1277 power take-off shaft
1278 conical roller bearing of the power take-off shaft
1279 axial direction
1280 pressing device
1281 first setting disk
1282 second setting disk
1283 balls
1284 spring arrangement
1285 hydraulic pressure regulation device
1286 solenoid
1287 magnetic piston
1288 additional shaft
1289 axis of rotation of the output shaft
1290 bearing bore
1291 hydraulic oil bore
1292 hydraulic oil chamber
1300 divided friction ring
1301 first friction cone
1302 second friction cone
1303 divided outer running surface
1304 outer gap
1305 first outer running surface half
1306 second outer running surface half
1307 divided inner running surface
1308 inner gap
1309 first inner running surface half
1310 second inner running surface half
1311 gap
1312 gap width
1313 friction ring axis of rotation
1314 friction cone axis of rotation
1315 friction cone axis of rotation
1316 bevels
1317 total width
1330 first separate bearing collar plate
1331 second separate bearing collar plate
1332 shaft seal
1333 friction cone shafts
1334 fluid chamber
1335 additional transmission chamber
1336 friction cone peg seal
1337 surroundings 1338 cover sheet metal
1339 first housing half
1340 second housing half
1341 side facing away
1342 bearing collar plate projection
1343 transmission element
1344 differential transmission
1345 distance
1346 power take-off shaft axis of rotation
1347 differential transmission axis of rotation
1508 friction-ring transmission housing
1521 friction ring
2008 conical friction-ring housing
2277 power take-off shaft
2301 first friction cone
2302 second friction cone
2362 conical friction-ring transmission
3270 input cone
3271 output cone
3360 planetary transmission
3362 conical friction-ring transmission
3363 input cone axis
3364 output cone axis
3365 output shaft
3366 output shaft sun gear
3367 input shaft sun gear
3368 input shaft
3369 planetary gear
3370 planetary gear axis
3371 ring gear
3372 switching connecting rod system
3373 crosspiece
4008 conical friction-ring housing
4270 input cone
4271 output cone
4360 double planetary transmission
4362 conical friction-ring transmission
4363 input cone axis
4364 output cone axis
4365 output shaft
4366 output shaft gear wheel
4368 input shaft
4369 first planetary gear
4370 first planetary gear axis
4380 first output shaft sun gear
4381 second planetary gear
4382 second planetary gear axis
4383 planetary gear rack
4384 first switching connecting rod system
4385 second switching connecting rod system
4386 second output shaft sun gear
5002 cage
5011 axis of rotation
5014 axial guide device
5018 guide axle
5019 adjustment bridge
5021 friction ring
5022 first roll holder
5023 second roll holder
5390 eccentric motor
5391 link
5392 eccentric link rod
5393 cage link rod
5394 cage link rotation point
5395 overload security device
5396 positioning ball
5397 positioning spring
5398 accommodation
5399 positioning ball accommodation
5400 overload security device cover
5401 locking screw
5402 double arrow
6391 link
6394 cage link rotation point
6395 overload security device
6410 pressure element
6411 bearing ring
6412 tension element
6413 link pipe
6414 first pressure spring
6415 link pipe collar
6416 link pipe flange
6417 tension forces
6418 pressure forces
6419 second pressure spring
6420 locking ring
7430 failure security device
7431 cam disk
7432 cam follower
7433 cam follower pressing spring
7434 first drivers
7435 second drivers
7436 holder disk
7437 drive axis
7438 drive
7439 drive shaft
7440 double arrow
7441 holder disk spring
7442 release device
7443 release device piston
7444 direction
7445 pressing force
7446 countersunk region
7447 height profile

What is claimed is:

1. Friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially,
wherein a link of the adjustment bridge (19) or of a guide cage (2) of the adjustment bridge (19) is connected to interact with a drive on the one hand, and mounted in a link rotation point (5394) of the adjustment bridge (19) or of the guide cage (2), on the other hand, and the link (5391) has an overload security device (5395); and
wherein the drive is an eccentric motor (5390).

2. Friction-ring transmission according to claim 1, wherein the overload security device (6395) is disposed within the link (6391).

3. Friction-ring transmission according to claim 1, wherein the link (6391) has a pipe (6413) in which the overload security device (6395) is disposed.

4. Friction-ring transmission according to claim 1, wherein the overload security device (6395) has destruction-free overload security means.

5. Friction-ring transmission according to claim 1, wherein the overload security device (6395) has at least one pressure element (6412) and at least one tension element (6410).

6. Friction-ring transmission according to claim 5, wherein the pressure element (6412) and the tension element (6410) are disposed so as to be displaceable relative to one another.

7. Friction-ring transmission according to claim 5, wherein both the pressure element (6412) and the tension element (6410) are mounted to be displaceable relative to the link (6391).

8. Friction-ring transmission according to claim 5, wherein the pressure element (6412) and the tension element (6410) are biased with a spring element (6414, 6419), in each instance.

9. Friction-ring transmission according to claim 5, wherein the pressure element (6412) and the tension element (6410) are overload security means that act dynamically.

10. Friction-ring transmission according to claim 5, wherein the pressure element (6412) is mounted on the adjustment bridge (19) or on the guide cage (2) of the adjustment bridge (19).

11. Friction-ring transmission according to claim 1, wherein the overload security device (6395) has destructible overload security means (6420) as a planned breaking point.

12. Friction-ring transmission according to claim 11, wherein the planned breaking point is a statically acting overload security means.

13. Friction-ring transmission having two roller bodies spaced apart from one another by a gap, which correspond with one another, rotating on axial roller body axes, by way of a friction ring, in which the friction ring is disposed to be displaceable axially, along the gap, by an adjustment path, in an adjustment bridge that is freely displaceable axially,
    wherein an overload security device (6395) has at least one pressure element (6412) and/or at least one tension element (6410), and
    wherein the at least one pressure element (6412) and/or the at least one tension element (6410) is mounted on a drive of the adjustment bridge (19) or on a drive of a guide cage (2) of the adjustment bridge (19); and
    wherein the drive is an eccentric motor (5390).

\* \* \* \* \*